(12) United States Patent
Tominaga et al.

(10) Patent No.: US 11,964,712 B2
(45) Date of Patent: Apr. 23, 2024

(54) STEERING CONTROL DEVICE

(71) Applicant: Mitsubishi Electric Corporation, Tokyo (JP)

(72) Inventors: Kenta Tominaga, Tokyo (JP); Hiroyuki Kobayashi, Tokyo (JP); Michihiro Ogata, Tokyo (JP); Masaya Endo, Tokyo (JP); Hiroaki Kitano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 107 days.

(21) Appl. No.: 17/793,688

(22) PCT Filed: Feb. 27, 2020

(86) PCT No.: PCT/JP2020/007910
§ 371 (c)(1),
(2) Date: Jul. 19, 2022

(87) PCT Pub. No.: WO2021/171452
PCT Pub. Date: Sep. 2, 2021

(65) Prior Publication Data
US 2023/0068573 A1    Mar. 2, 2023

(51) Int. Cl.
*B62D 6/00*    (2006.01)
(52) U.S. Cl.
CPC ..................... *B62D 6/00* (2013.01)
(58) Field of Classification Search
CPC .......................................................... B62D 6/00
See application file for complete search history.

(56) References Cited

U.S. PATENT DOCUMENTS

| | | |
|---|---|---|
| 6,170,600 B1 | 1/2001 | Shimizu |
| 9,586,619 B1 | 3/2017 | Akatsuka et al. |
| 2003/0078712 A1 | 4/2003 | Shimakage et al. |

FOREIGN PATENT DOCUMENTS

| | | |
|---|---|---|
| JP | 10-076967 A | 3/1998 |
| JP | 2002-178943 A | 6/2002 |
| JP | 2015-20604 A | 2/2015 |

OTHER PUBLICATIONS

Office Action dated Dec. 7, 2022 issued by the Indian Patent Office in Indian Application No. 202227046160.

*Primary Examiner* — Mathew Franklin Gordon
(74) *Attorney, Agent, or Firm* — Sughrue Mion, PLLC; Richard C. Turner

(57) ABSTRACT

A steering control device is provided with at least one of a first torque correction computing part and a second torque correction computing part; wherein the first torque correction computing part is equipped with a weight computing part which computes an increment of weight based on a magnitude of the driver torque, and accumulates the increment of weight to generate a weight, a clip value computing part which computes an automatic driver torque clip value according to the weight, and a clip processing part which clip processes the automatic driver torque with the automatic driver torque clip value; and the second torque correction computing part is equipped with a gain computing part which computes an increment of gain according to the driver torque, and accumulates the increment of gain to generate a gain, and a gain processing part which outputs an automatic driver torque multiplied by the gain.

19 Claims, 36 Drawing Sheets

STEERING CONTROL DEVICE

CROSS REFERENCE TO RELATED APPLICATIONS

This application is a National Stage of International Application No. PCT/JP2020/007910, filed on Feb. 27, 2020.

FIELD OF THE INVENTION

The present application relates to the field of a steering control device.

BACKGROUND OF THE INVENTION

A steering control device which is equipped with a steering support device for reducing the steering force of a driver is proposed. Further, a steering control device which is equipped with, in addition to the steering support device, an automatic steering device that automatically steers based on the shape of a road is proposed.

For example, in a vehicle steering device that uses both of a power steering device and an automatic steering device which are disclosed in the Patent Document 1, when a driver carries out an override during the automatic steering operation, automatic steering control will deviate from a target value. Thereby, an electric motor is actuated so that the difference between a target value and an actual value may be reduced. In consequence, there is shown a problem that steering by a driver is hindered.

In order to solve this problem, in the Patent Document 1, a technology is proposed which is provided with a means to detect a driver torque by a driver and the shape of a road on which a vehicle travels, an electric motor which generates an additional driver torque, a means to determine a driver support torque according to the driver torque, a means to determine an automatic driver torque according to the shape of a road, a means to determine an amount of target state according to the shape of a road, a means to detect an amount of actual state, a means to estimate an amount of vehicle state by the automatic driver torque, a means to compute an amount of comparison state which is computed as a weighted average between the amount of actual state and the amount of estimated state, using a weight which is determined based on the driver torque, and a means to control the output of an electric motor based on the sum of the driver torque and the automatic driver torque, wherein the automatic driver torque is determined according to the deviation between the amount of target state and the amount of comparison state.

According to the contents which are proposed here, simultaneous operations in the steering support mode and the automatic steering mode can be achieved.

That is, in the Patent Document 1, there is disclosed a technology in which continuous switching is designed between the control of an electric power steering device and the control of an automatic steering device, according to the increase or decrease of the information on steering forces. As a result, when the steering force of a driver is applied, the control ratio of an electric power steering device will increase, and when the steering force of a driver decreases, the ratio of the automatic steering device will increase. Thereby, the shift between the electric power steering mode and the automatic steering mode will be achieved smoothly.

CITATION LIST

Patent Literature

Patent Document 1: Japanese Unexamined Patent Application Publication No. 10-076967

SUMMARY OF THE INVENTION

Technical Problem

In such a steering control device, while the lane keep assist system (LKAS) is in operation, if a driver carries out an override, for example, there occurs a subject that the steering control becomes unstable by the interference between the driver torque by a driver and the automatic driver torque. That is, because the gain of the automatic driver torque is directly computed based on the driver torque, the gain also changes suddenly, if the driver torque changes suddenly, and the automatic driver torque will also change suddenly. The sum of a driver torque, an automatic driver torque, and a driver support torque becomes an input driver torque, which is applied to the steering for the change of a rudder. Thereby, if the automatic driver torque changes suddenly, the driver torque will also change suddenly, for the purpose of compensating the sudden change. Therefore, if either the driver torque by a driver or the automatic driver torque changes suddenly, there occurs a problem that they interfere mutually and the steering control becomes unstable.

The present application is made in order to solve the above-mentioned problem, and aims at offering a stable steering control, even in a case where the driver torque by a driver or the automatic driver torque changes suddenly.

Solution to Problem

A steering control device according to the present application, includes;
a driver support torque computing part which computes a driver support torque according to a driver torque,
an automatic driver torque computing part which computes an automatic driver torque according to road condition, and
an additional driver torque computing part which computes an additional driver torque according to the driver support torque and the automatic driver torque,
wherein the additional driver torque computing part receives an output from at least one of a first torque correction computing part and a second torque correction computing part;
wherein the first torque correction computing part includes:
a weight computing part which computes an increment of weight based on a magnitude of the driver torque, and accumulates the increment of weight to generate a weight,
a clip value computing part which computes an automatic driver torque clip value according to the weight, and
a clip processing part which clip processes the automatic driver torque with the automatic driver torque clip value, to limit an upper limit value and a lower limit value thereof, and outputs a clip processed automatic driver torque, to the additional driver torque computing part, and
the second torque correction computing part includes:
a gain computing part which computes an increment of gain according to the driver torque, and accumulates the increment of gain to generate a gain, and a gain processing part which outputs an automatic driver torque multiplied by the gain, to the additional driver torque computing part.

Advantageous Effects of Invention

According to the present application, at least either the computation of an increment of weight based on the magnitude of the driver torque, or the computation of an increment of gain based on the driver torque, will be conducted. Thereby, the weight itself or the gain itself does not change suddenly, even though the driver torque changes suddenly, and then, it becomes possible to prevent the steering control from becoming unstable.

DESCRIPTION OF EMBODIMENTS

Embodiment 1

Figure 1:
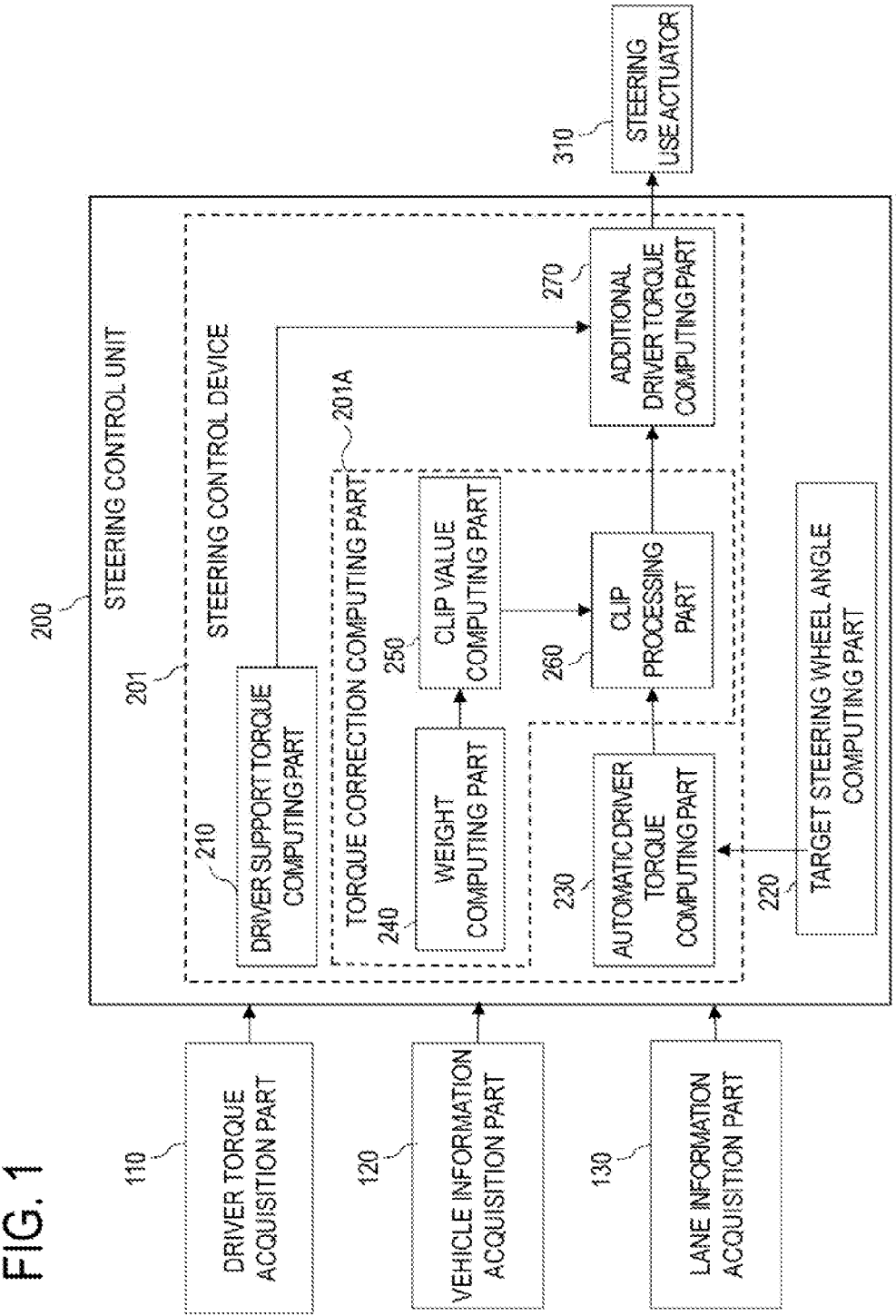
FIG. 1 is a block diagram which shows the schematic constitution of Embodiment 1.

FIG. 1 is a block diagram which shows the schematic constitution of a steering control system of the Embodiment 1. The present steering control system is mounted on a vehicle 1, and is equipped with a steering control unit 200, and a driver torque acquisition part 110 which is connected to the steering control unit, a vehicle information acquisition part 120, a lane information acquisition part 130, and a steering use actuator 310. The steering control unit 200 controls the steering of a vehicle 1 (henceforth referred to as "host vehicle") which is provided with the steering control system.

The steering control unit 200 is, for example, an electric power steering electronic control unit (EPS-ECU), and the like.

The driver torque acquisition part 110 acquires a driver torque by a driver of the host vehicle 1 (henceforth "driver torque by a driver" is referred to as "driver torque"). The driver torque acquisition part 110 is, for example, a driver torque sensor.

The vehicle information acquisition part 120 acquires vehicle information, including the speed of a host vehicle, acceleration, direction, angular velocity, and others. The vehicle information acquisition part 120 is, for example, a steering wheel angle sensor, a yaw rate sensor, a speed sensor, an acceleration sensor, and the like.

The lane information acquisition part 130 acquires lane information, which is the information on a lane on which the host vehicle 1 travels. It is assumed that the positions of left and right lane markings on a host vehicle driving lane, or information on the position of a lane center is included in the lane information. The lane information acquisition part 130 is, for example, a front camera. It is worth noticing that, the lane information acquisition part 130 can obtain lane information from the Global Navigation Satellite System (GNSS), and map data, or LiDAR and LiDAR use map data.

The steering control unit 200 is equipped with a steering control device 201 and a target steering wheel angle computing part 220.

Further, the steering control device 201 is equipped with a driver support torque computing part 210, an automatic driver torque computing part 230, a torque correction computing part 201A, and an additional driver torque computing part 270, and the torque correction computing part 201A is equipped with a weight computing part 240, a clip value computing part 250, and a clip processing part 260.

The driver support torque computing part 210 computes a driver support torque for supporting the steering by a driver, based on the information containing a driver torque from the driver torque acquisition part 110.

The target steering wheel angle computing part 220 computes a target steering wheel angle for maintaining the center of a host vehicle driving lane, based on the information from the lane information acquisition part 130. It is worth noticing that, instead of the lane center, it is allowed to produce a route with due consideration for obstacles and others, and to compute a target steering wheel angle for following the route.

The automatic driver torque computing part 230 computes an automatic driver torque for making a real steering wheel angle follow the target steering wheel angle which is computed in the target steering wheel angle computing part 220. It is worth noticing that, it is allowed to compute directly an automatic driver torque for maintaining the center of a host vehicle driving lane, without mounting the target steering wheel angle computing part 220.

The weight computing part 240 computes a weight based on the information which contains at least a driver torque. It is worth noticing that, here, the weight indicates a ratio of the maximum value of the automatic driver torque clip value (the automatic driver torque clip value which is determined for safety) and the minimum value (the override torque clip value). In the following explanation, the ratio of allocation will be explained as a weight.

The clip value computing part 250 computes an automatic driver torque clip value using the weight.

The clip processing part 260 clips an automatic driver torque with an automatic driver torque clip value, so that the upper limit and lower limit of the automatic driver torque may be limited by the automatic driver torque clip value.

The additional driver torque computing part 270 computes an additional driver torque based on a driver support torque and a clip processed automatic driver torque. And, the steering control device controls so that the steering use actuator 310 may generate the additional driver torque.

The steering use actuator 310 is an actuator to generate an additional driver torque which is computed in the additional driver torque computing part 270, and, for example, is an EPS motor (Electric Power Steering motor).

Figure 2:
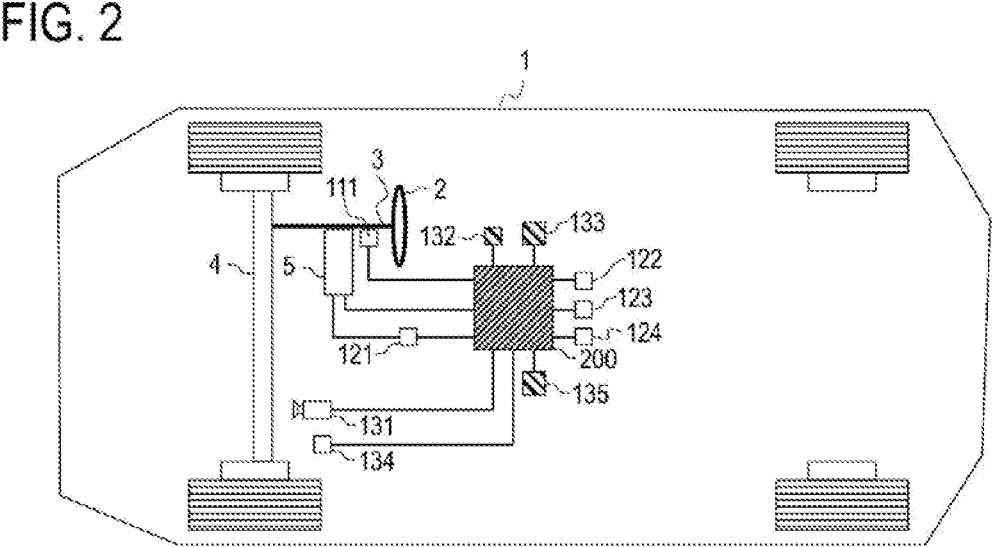
FIG. 2 is a system constitutional diagram which shows the Embodiment 1.

FIG. 2 is a constitutional diagram of a steering control system. The host vehicle 1, on which the steering control system is mounted, is equipped with a steering wheel 2, a steering axis 3, a steering unit 4, an EPS motor 5, a driver torque sensor 111, a steering wheel angle sensor 121, a yaw rate sensor 122, a speed sensor 123, an acceleration sensor 124, a front camera 131, a GNSS sensor 132, a navigation gear 133, a LiDAR 134, a LiDAR use map 135, and the steering control unit 200 which is shown in FIG. 1.

The steering wheel 2 is, so called, a handle, which is for a driver to operate the host vehicle 1. The steering wheel 2 is connected to the steering axis 3, and the steering unit 4 is in conjunction with the steering axis 3. The steering unit 4 supports front wheels as the steering wheel, with rotational movement freedom, and in addition, is supported by a body frame with steering freedom. Therefore, the driver torque, which is generated by the driver's operation of the steering wheel 2, rotates the steering axis 3, and the steering unit 4 changes the steering of the front wheels to a horizontal direction, according to the rotation of the steering axis 3. In consequence, the driver can operate the amount of horizontal movement of the host vehicle 1, at the time when the host vehicle 1 moves forward or backward.

It is worth noticing that, the steering axis 3 can be also rotated by the EPS motor 5. Controlling the current which flows into the EPS motor 5, the steering control unit 200 can change freely the steering of the front wheels, independently of the driver's operation of the steering wheel 2. The example of the front wheel steering is shown here. However, a driver and the steering control unit 200 may conduct the rear wheel steering or the steering of front wheels and rear wheels.

The steering control unit 200 is connected with the EPS motor 5, the driver torque sensor 111, the steering wheel angle sensor 121, the yaw rate sensor 122, the speed sensor 123, the acceleration sensor 124, the front camera 131, the GNSS sensor 132, the navigation gear 133, the LiDAR 134, and the LiDAR use map 135.

The driver torque sensor 111 detects the driver torque of the steering axis 3 by a driver. Here, it is assumed that the driver torque acquisition part 110 which is shown in FIG. 1 is constituted by the driver torque sensor 111.

The steering wheel angle sensor 121 detects the angle of the steering wheel 2. The yaw rate sensor 122 detects the yaw rate of the host vehicle 1. The speed sensor 123 detects the speed of the host vehicle 1. The acceleration sensor 124 detects the acceleration of the host vehicle 1. Here, it is assumed that the vehicle information acquisition part 120 is constituted by the steering wheel angle sensor 121, the yaw rate sensor 122, the speed sensor 123, and the acceleration sensor 124.

The front camera 131 is installed at a position where a lane marking ahead of the vehicle can be detected as a picture, and detects the front environment of the host vehicle, such as lane information and the position of an obstacle, based on picture information. Here is shown only a front camera which detects the front environment. However, a camera which detects the environment of the back or the side is also allowed to be installed in the host vehicle 1. Here, it is assumed that the lane information acquisition part 130 which is shown in FIG. 1 is constituted by the front camera 131.

The GNSS sensor 132 receives electric waves from positioning satellites by an antenna, and conducts the computation for positioning. Thereby, the GNSS sensor 132 outputs the absolute position and absolute direction of the host vehicle 1. The navigation gear 133 has the function to compute an optimal driving route to a place to go (a destination) which is set by a driver, and keeps in memory the map data including road information on respective roads which constitute a road network. The road information is map node data which represent road alignments. In addition, each of the map node data includes the absolute position (latitude, longitude, and altitude) of each node, lane width, Kant angle, tilt angle information, and the like. Here, it is assumed that the lane information acquisition part 130 which is shown in FIG. 1 is constituted by the GNSS sensor 132 and the navigation gear 133.

Figure 3:
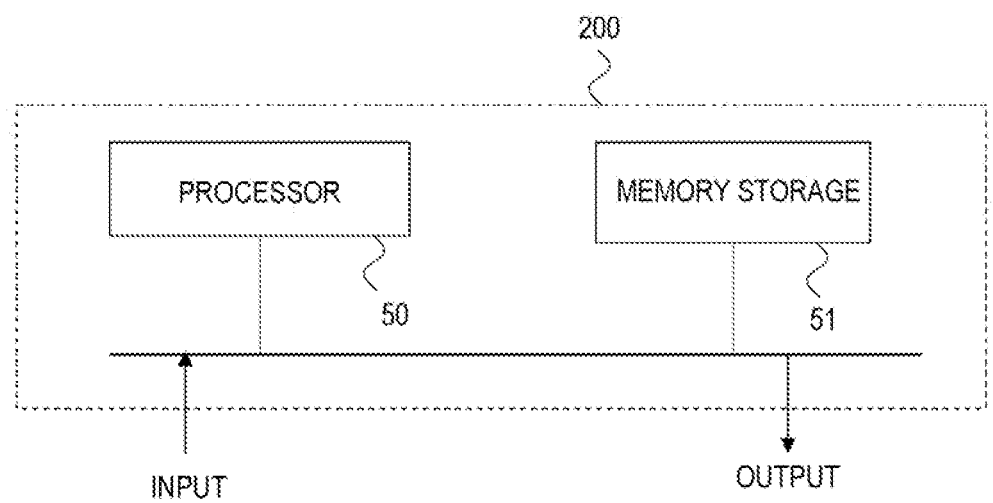
FIG. 3 is a constitutional diagram which shows an example of the hardware of the Embodiment 1.

The LiDAR 134 irradiates a laser, and detects the reflective wave, and thereby, detects a circumferential object, on the basis of the host vehicle 1. The LiDAR use map 135 is a map which is created based on the detection results of the LiDAR, and the estimation of a host position can be attained, by combining the map with the detection results of the LiDAR 134. Moreover, in the LiDAR use map 135, road information which is likely to be included in the navigation gear 133 is stored in memory, and the position of the host vehicle 1 within a driving lane can be acquired by combining the road information with the result of the host position estimation. Here, it is assumed that the lane information acquisition part 130 which is shown in FIG. 1 is constituted by the LiDAR 134 and the LiDAR use map 135. The steering control unit 200 is an integrated circuit, such as a microprocessor. As an example of the hardware is shown in FIG. 3, the steering control unit is equipped with a processor 50, such as an A-D conversion circuit, a D-A conversion circuit, and a central processing unit (CPU), and a memory storage 51, such as a Read Only Memory (ROM) and a Random Access Memory (RAM). The processor 50 performs processing on the information which is input from each of the sensors, according to the program which is stored in the memory storage 51. The processor 50 controls so that the EPS motor 5 may generate the additional driver torque. Although the contents of the memory storage 51 are not illustrated, the memory storage is equipped with volatile memory storages, such as random access memories, and non-volatile auxiliary memory storages, such as flash memories. Moreover, the memory storage can be equipped with auxiliary memory storages of hard disk type, instead of flash memories. The processor 50 achieves the execution of the program which is input from the memory storage 51. In this case, the program is input into the processor 50 from the auxiliary memory storages through the volatile memory storages. Moreover, the processor 50 may output the data of operation results and the like, to the volatile storages of the memory storage 51, and may save the data through the volatile storages in the auxiliary memory storage.

Figure 4:
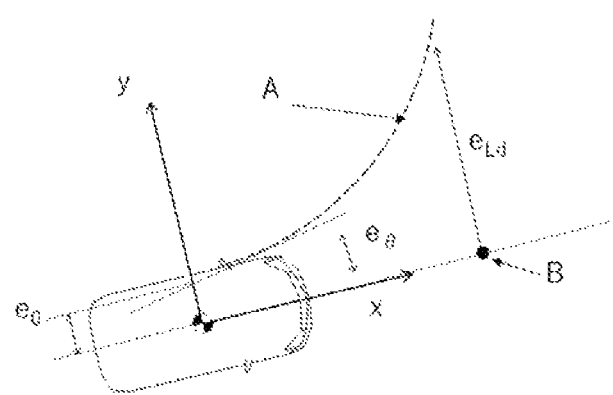
FIG. 4 is an explanatory diagram of the coordinate system of the Embodiment 1.

FIG. 4 is a drawing schematically showing a coordinate system which is used in the Embodiment 1. Symbols x and y of FIG. 4 are of a host vehicle coordinate system where the center of gravity of the host vehicle is set on the origin point, and the front of the host vehicle is taken as x-axis, and the left-hand direction is taken as y-axis. In this FIG. 4, the symbol $e_0$ indicates an angle (a directional error) between the lane center at a host vehicle position and the x-axis. The symbol $e_0$ indicates a distance from the lane center to the host vehicle (a lateral position at a host vehicle position), where the lane center is shown by the curve A. The symbol $e_{Ld}$ indicates a distance (a lateral position at a look-ahead distance) from the lane center to the look-ahead distance (Point B in the drawing). It is worth noticing that, when the steering control unit 200 is equipped with a route generation equipment, it is allowed to use a target route instead of the lane center.

Figure 5:
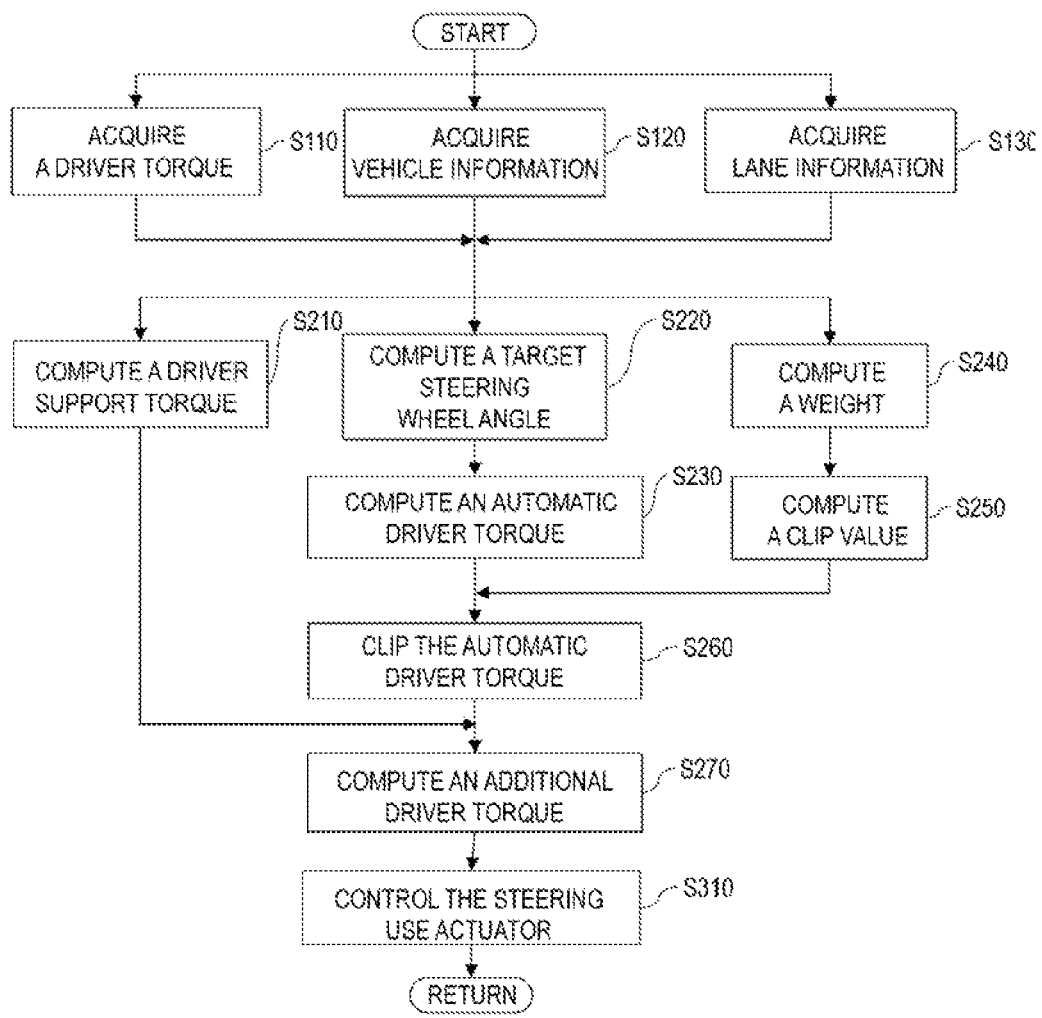
FIG. 5 is a flow chart which shows the Embodiment 1.

FIG. 5 is a flow chart which shows the procedure of the steering control device of the Embodiment 1.

In Step S110 of FIG. 5, a driver torque $T_{Driver}$ by a driver is acquired in the driver torque acquisition part 110.

In Step S120 of FIG. 5, vehicle information is acquired in the vehicle information acquisition part 120. The vehicle information is the information of steering wheel angle of a host vehicle, yaw rate, speed, acceleration, and the like. In the present Embodiment, steering wheel angle δ, yaw rate γ, speed V, and acceleration α are acquired.

In Step S130 of FIG. 5, lane information is acquired in the lane information acquisition part 130. The lane information is the information on the right and left lane markings of a lane, which a host vehicle should travel, and the information on a lane center. In the present Embodiment, coefficients at the time when the right and left lane markings are represented by a third-order polynomial equation in a host vehicle coordinate system will be acquired.

That is, with regard to the left lane marking, values of $C_{l0}$ to $C_{l3}$ of the following Equation 1 will be acquired.

[Equation 1]

Eq. 1

$$y = C_{l3}x^3 + C_{l2}x^2 + C_{l1}x + C_{l0} \tag{1}$$

With regard to the right lane marking, values of $C_{r0}$ to $C_{r3}$ of the following Equation 2 will be acquired.

[Equation 2]

Eq. 2

$$y = C_{r3}x^3 + C_{r2}x^2 + C_{r1}x + C_{r0} \tag{2}$$

At this time, with regard to the lane center, values of $C_{C0}$ to $C_{C3}$ of the following Equation 3 will be acquired.

[Equation 3]

Eq. 3

$$y = l(x) = C_{c3}x^3 + C_{c2}x^2 + C_{c1}x + C_{c0} \tag{3}$$

Here, the coefficients $C_{l3}$, $C_{r3}$, and $C_{C3}$ indicate the estimated curvature change rates of a route, and the coefficients $C_{l2}$, $C_{r2}$, and $C_{C2}$ indicate the curvature components of a route, and the coefficients $C_{l1}$, $C_{r1}$, and $C_{C1}$ indicate the yaw angle components of a route, with regard to a host vehicle, and the coefficients $C_{l0}$, $C_{r0}$, and $C_{C0}$ indicate the position components in the horizontal direction of a route, with regard to a host vehicle. And each of the coefficients satisfies the relation which is shown in the Equation 4.

[Equation 4]

Eq. 4

$$C_{ci} = \frac{(C_{li} + C_{ri})}{2} (i = 0, \cdots, 3) \quad (4)$$

At this time, the lateral position e o at a host vehicle position, the lateral position e La at a look-ahead distance, and the directional error $e_\theta$, which are shown in FIG. 4, are defined by the following equations respectively.

[Equation 5]

Eq. 5

$$e_0 = l(0) = C_{c0} \quad (5)$$

[Equation 6]

Eq. 6

$$e_{Ld} = l(L_d) = C_{c3}L_d^3 + C_{c2}L_d^2 + C_{c1}L_d + C_{c0} \quad (6)$$

[Equation 7]

Eq. 7

$$e_\theta = l'(0) = C_{c1} \quad (7)$$

However, a look-ahead distance is represented as L d. It is worth noticing that, information on lane markings is not limited to the third-order polynomial equation, and may be represented by any function.

Next, in Step S210 of FIG. 5, a driver support torque $T_{Assist}$ for assisting the steering of a driver is computed in the driver support torque computing part 210. To compute the driver support torque $T_{Assist}$, publicly known techniques will be used, where, for example, computations are performed based on the driver torque $T_{Driver}$ and the speed V of a host vehicle.

Next, in Step S220 of FIG. 5, a target steering wheel angle $\delta_{Ref}$ for making a host vehicle follow a lane center is computed in the target steering wheel angle computing part 220. Publicly known techniques, such as PID, linear secondary regulator, and model prediction control, will be used for the computation of the target steering wheel angle $\delta_{Ref}$.

It is worth noticing that, when the steering control unit 200 is equipped with a route generation part, it is allowed to compute a target steering wheel angle for following a target route. In this Embodiment 1, using the lateral position $e_{Ld}$ at a look-ahead distance (Point B) and the directional error $e_0$, like the Equation 8, the target steering wheel angle $\delta_{Ref}$ will be computed.

[Equation 8]

Eq. 8

$$\delta_{Ref}(t) = K_1 e_{Ld}(t) = K_2 e_\theta(t) = K_3 \int_0^t e_0(\tau) d\tau \quad (8)$$

Here, the symbol t is a variable indicating time.

Next, in Step S230 of FIG. 5, an automatic driver torque $T_{Auto}$ for making the steering wheel angle $\delta$ follow the target steering wheel angle $\delta_{Ref}$ is computed in the automatic driver torque computing part 230.

For the operation of the automatic driver torque, publicly known techniques, such as PID, linear secondary regulator, and model prediction control, will be used. In this Embodiment 1, using the steering wheel angle $\delta$ and the target steering wheel angle $\delta_{Ref}$, like the Equation 9, the automatic driver torque $T_{Auto}$ will be computed.

[Equation 9]

Eq. 9

$$T_{Auto}(t) = K_4(\delta_{Ref}(t) - \delta(t)) = K_5 \int_0^t (\delta_{Ref}(\tau) - \delta(\tau)) d\tau \quad (9)$$

When a driver is driving a vehicle and is releasing his hands from the steering wheel, it is desirable that the steering wheel angle follows the target steering wheel angle with sufficient accuracy. Therefore, a proportionality gain $K_4$ is set usually as a large value (for example, 10 Nm/deg or so).

Next, in Step S240 of FIG. 5, a weight w is computed in the weight computing part 240.

In the case where the smaller the weight w is, the smaller the automatic driver torque clip value $T_{Clip, Auto}$ becomes, an increment of weight $\Delta w$ will be computed, so that, if the magnitude of the driver torque $|T_{Driver}|$ is smaller than a predetermined first threshold $\theta$ w (for example, 0.5 Nm or so), the increment of weight $\Delta w$ may become positive, and, if the magnitude of the driver torque $|T_{Driver}|$ is larger than a first threshold $\theta$ w, the increment of weight $\Delta w$ may become negative. Regarding the computation of the increment of weight $\Delta w$, it is allowed to use a map which is in accordance with the magnitude of the driver torque $|T_{Driver}|$, or to use a constant value.

For example, when computing $\Delta w$ with a map M w ($|T_{Driver}|$) of $|T_{Driver}|$, the weight w will be computed like the following Equations.

[Equation 10]

Eq. 10

$$\Delta w = M_w(|T_{Driver}|) \quad (10)$$

[Equation 11]

Eq. 11

$$w(k) = w(k-1) + \Delta w \cdot t_{samp} \quad (11)$$

[Equation 12]

Eq. 12

$$w = \max(\min(w, 1), 0) \quad (12)$$

Here, the symbol k is a variable which represents a discretized time, and the symbol $t_{samp}$ is a computation cycle of the weight w. It is worth noticing that, in the case where the larger the weight w is, the automatic driver torque clip value $T_{Clip, Auto}$ becomes smaller, the increment of weight $\Delta w$ will be computed so that, if the magnitude of driver torque $|T_{Driver}|$ is smaller than the first threshold $\theta$ w, the increment of weight $\Delta w$ may become negative, and if the magnitude of driver torque $|T_{Driver}|$ is larger than the first threshold $\theta$ w, the increment of weight $\Delta w$ may become positive. In the present Embodiment, it is assumed that, the smaller the weight w is, the smaller the automatic driver torque clip value $T_{Clip, Auto}$ becomes. Moreover, the range of the weight w is restricted so that w∈ [0, 1] may be satisfied in the Equation 12, however, this range may not be [0, 1].

In this way, the weight w is computed through the computation of the increment of weight $\Delta w$. Thereby, comparing the case where the weight w is computed directly from the magnitude of the driver torque $|T_{Driver}|$, the weight w is less likely to change suddenly, even when the magnitude of the driver torque $|T_{Driver}|$ changes suddenly. In addition, it is possible to prevent the steering control from becoming unstable.

Moreover, by setting a small increment of weight $\Delta w$ near the first threshold $\theta w$, the weight w and the automatic driver torque clip value $T_{Clip, Auto}$ become less likely to carry out hunting, at the time when the magnitude of the driver torque $|T_{Driver}|$ is near the first threshold $\theta w$. In addition, the benefit obtained here is that the steering control is less likely to become unstable. It is worth noticing that, the first threshold $\theta w$ is not a fixed value, and may be a variable value.

Next, in Step S250 of FIG. 5, the automatic driver torque clip value $T_{Clip, Auto}$ is computed in the clip value computing part 250. For example, the automatic driver torque clip value $T_{Clip, Auto}$ is computed as a weighted average of two kinds of clip values, using the weight w, as follows.

[Equation 13]

Eq. 13

$$T_{Clip,Auto} = w \cdot T_{Clip,LKAS} + (1-w) \cdot T_{Clip,OVR} \quad (13)$$

Here, the symbol $T_{Clip\ and\ LKAS}$ ($>T_{Clip, OVR}$) is a LKAS torque clip value, which is set for safety in LKAS. Usually, in order to enable the driving even on a sharp curve, the LKAS torque clip value is set to be about 10 times larger value (for example, 20 Nm or so), compared with the driver torque, which a driver can generate. The symbol $T_{Clip, OVR}$ ($\geq 0$) is an override torque clip value, and is set as a value (for example, 1 Nm or so) whose magnitude is almost as large as a driver torque, which a driver can generate.

By computing the automatic driver torque clip value $T_{Clip, Auto}$ in this way, the automatic driver torque clip value $T_{Clip, Auto}$ becomes equal to the LKAS torque clip value $T_{Clip, LKAS}$, when the weight w is a maximum value. In addition, when the weight w is a minimum value, the automatic driver torque clip value $T_{Clip, Auto}$ becomes equal to the override torque clip value $T_{Clip, OVR}$.

That is, it can be said that, the LKAS torque clip value $T_{Clip, LKAS}$ is a parameter which defines the maximum value of the automatic driver torque clip value $T_{Clip, Auto}$, and in addition, the override torque clip value $T_{Clip, OVR}$ is a parameter which defines the minimum value of the automatic driver torque clip value $T_{Clip, Auto}$.

And, when a driver is releasing his hands from the steering wheel, an autonomous driving system can generate an automatic driver torque which is required for the lane keeping. In addition, the benefit obtained here is that the autonomous driving system can restrict the automatic driver torque, to such an extent that the steering of a driver may not be disturbed during an override. It is worth noticing that, concerning the method of computing the automatic driver torque clip value $T_{Clip, Auto}$, it becomes unnecessary to compute the automatic driver torque clip value $T_{Clip, Auto}$ as a weighted average, if the automatic driver torque clip value $T_{Clip, Auto}$ is computed so that, when the weight w is a maximum value, the automatic driver torque clip value $T_{Clip, Auto}$ may become equal to the LKAS torque clip value $T_{Clip, LKAS}$; and when the weight w is a minimum value, the automatic driver torque clip value $T_{Clip, Auto}$ may become equal to the override torque clip values $T_{Clip, OVR}$; and when the weight w is a value other than those values, the automatic driver torque clip value $T_{Clip, Auto}$ may decrease monotonically.

Next, in Step S260 of FIG. 5, a clip processing of the automatic driver torque $T_{Auto}$ is performed in the clip processing part 260. The clip processing is performed as follows, using the automatic driver torque clip value $T_{Clip, Auto}$.

[Equation 14]

Eq. 14

$$T_{Auto} = \max(\min(T_{Auto}, T_{Clip,Auto})) - T_{Clip,Auto}) \quad (14)$$

Next, in Step S270 of FIG. 5, an additional driver torque $T_{EPS}$ is computed in the additional driver torque computing part 270. For example, the additional driver torque $T_{EPS}$ is computed as the sum of the automatic driver torque $T_{Auto}$ and the support driver torque $T_{Assist}$, like the following.

[Equation 15]

Eq. 15

$$T_{EPS} = T_{Auto} + T_{Assist} \quad (15)$$

Or, using the weight w, the additional driver torque $T_{EPS}$ may be computed as a weighted average, as follows.

[Equation 16]

Eq. 16

$$T_{EPS} = w \cdot T_{Auto} + (1-w) \cdot T_{Assist} \quad (16)$$

Or, in addition to these methods, as long as based on the automatic driver torque $T_{Auto}$ and the support driver torque $T_{Assist}$, any method can be applied to compute the additional driver torque $T_{EPS}$.

Next, in Step S310 of FIG. 5, the steering control device controls so that the steering use actuator 310 may generate the additional driver torque $T_{EPS}$. Publicly known techniques are used for the control of the steering use actuator.

Figure 6:
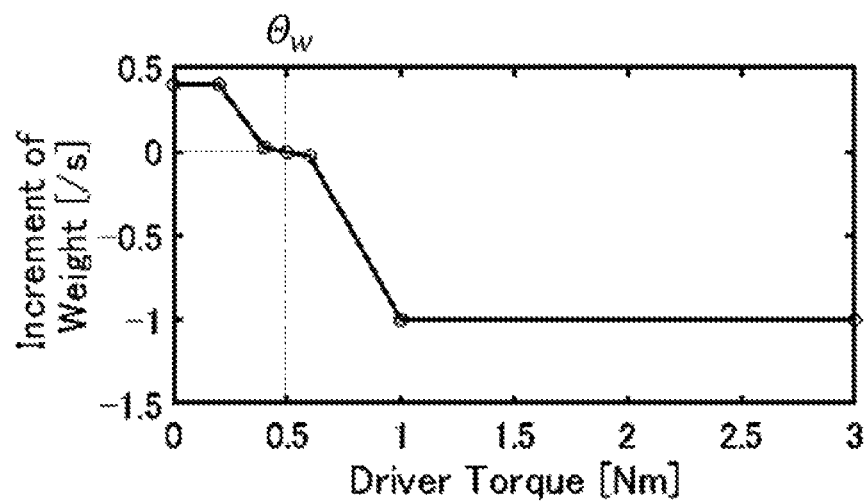
FIG. 6 is an explanatory diagram of a map for computing an increment of weight from a driver torque, in the Embodiment 1.

FIG. 6 is a drawing which shows an example of a map M w, for computing the increment of weight $\Delta w$ in the weight computing part 240. The map is designed so that, when the magnitude of the driver torque $|T_{Driver}|$ is smaller than the first threshold $\theta w$, the increment of weight $\Delta w$ may become positive, and when $|T_{Driver}|$ is larger than the first threshold $\theta w$, $\Delta w$ may become negative.

The reduction amount is made larger than the increase amount. Thus, the benefit obtained here is that when a driver carries out an override, the automatic driver torque clip value can be decreased quickly. Moreover, the absolute value of the increment of weight $\Delta w$ is made small near the first threshold $\theta w$. Thus, the benefit obtained here is that when $|T_{Driver}|$ is near the first threshold $\theta w$, the weight w and the automatic driver torque clip value $T_{Clip, Auto}$ become less likely to carry out hunting.

Figure 7:
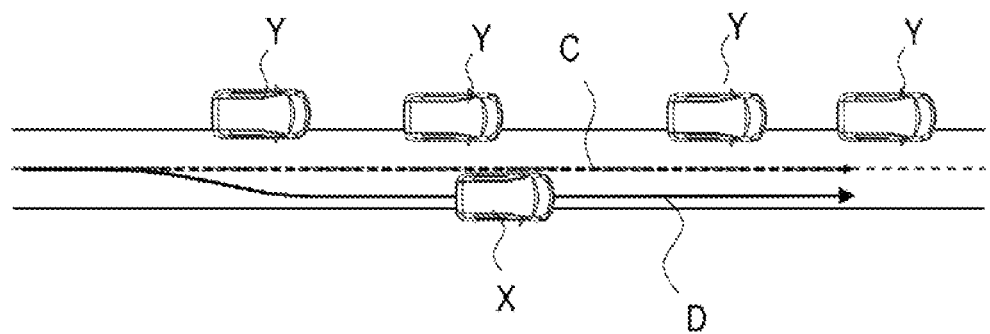
FIG. 7 is a schematic view of the scene of the steering control.

FIG. 7 is a schematic view which shows an example of the scene in which the steering control is likely to become unstable. A host vehicle X is travelling on a straight road, and LKAS is in operation. For that reason, the autonomous driving system is performing the steering control so that the vehicle may travel on a lane center. And, vehicles Y parked on a street are lined up on the left front all the way for about 100 m, and it is assumed that an autonomous driving system cannot recognize vehicles Y parked on a street. In that case, a driver carries out an override, and tries to drive with an offset of about 1 m on the right side of a driving lane. In FIG. 7, the dashed line C shows the target route of autonomous driving, and the solid line D shows the target route of the driver.

Figure 8:
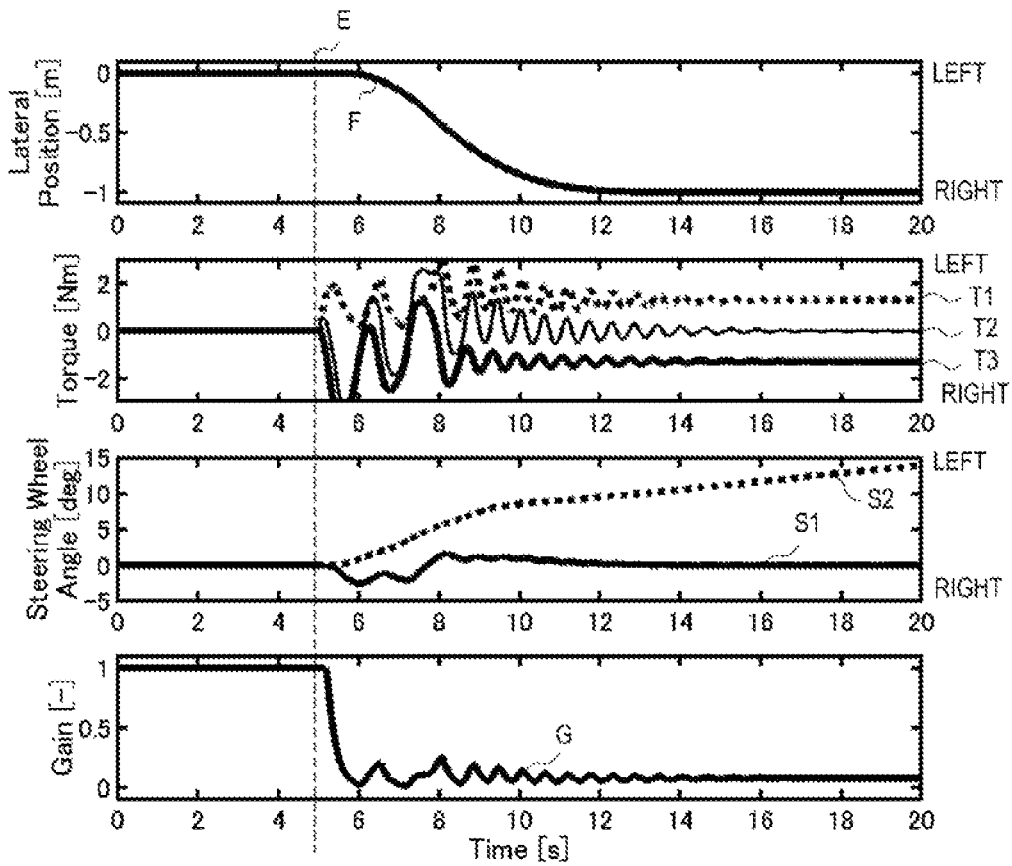
FIG. 8 is a schematic view which shows the mechanism of the steering control.
Figure 9:
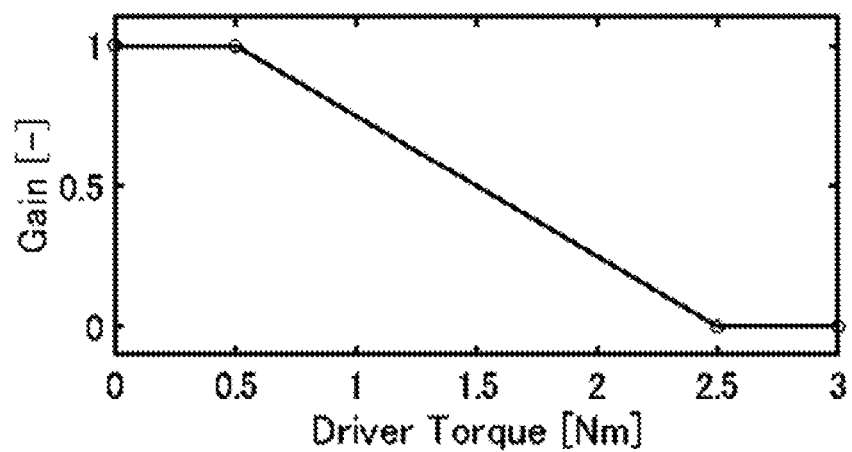
FIG. 9 is an explanatory diagram which shows a map for performing a gain computation from the driver torque.

FIG. 8 is a schematic view which shows a phenomenon in which, when the gain K of the automatic driver torque is directly adjusted according to the driver torque $T_{Driver}$, the steering control becomes unstable in the scene of FIG. 7. The relationship among the lateral position, the torque, the steering wheel angle, and the gain is represented in this FIG. 8. It is worth noticing that, in the drawing showing the relationship of torques, the dashed line T1 shows an automatic driver torque, the solid line T2 shows an input torque, and the solid line T3 shows a driver torque by a driver. Moreover, in the drawing showing the steering wheel angle, the solid line S1 shows a steering wheel angle, and the dashed line S2 shows a target steering wheel angle. Moreover, in the drawing showing the gain, the solid line G represents the change state of the gain. Here, a case can be considered in which, when the driver torque $T_{Driver}$ increases, the gain K decreases as shown in FIG. 9. It is worth noticing that, in the following explanation, it is simply assumed that the support driver torque $T_{Assist}$ is 0 Nm at any time. Therefore, the additional driver torque $T_{EPS}$ becomes equal to the product of the gain K and the automatic driver torque $T_{Auto}$. In addition, the input torque $T_{Input}$ which is applied to a steering axis for the change of a rudder becomes the sum of the driver torque $T_{Driver}$ and the product of the gain K and the automatic driver torque $T_{Auto}$. That is, the following equation 17 is satisfied.

[Equation 17]

Eq. 17

$$T_{Input} = T_{Driver} + T_{EPS} = T_{Driver} = K \cdot T_{Auto} + T_{Assist} = T_{Driver} = K \cdot T_{Auto} \quad (17)$$

Next, explanation will be made about the mechanism by which the steering control becomes unstable in FIG. 8. First, in the vicinity of 5 s (at Time E) of the time axis of FIG. 8, a driver carries out an override, and, in order to move a vehicle to the right side of a driving lane, the driver torque of a right direction is generated. Then, because the steering wheel rotates to the right, the autonomous driving system generates an automatic driver torque of the left direction, in order to return to the left. However, because the gain decreases by the increase of the driver torque, the automatic driver torque also decreases. After that, as the vehicle approaches straight going, a driver reduces the driver torque, in order to return the steering wheel to 0 deg. However, since the driver torque decreases, the gain increases.

At this time, the gain is raised by the amount equal to the decreased driver torque. Thereby, if the reduction amount of the driver torque is large, the increase amount of the gain will also become large. Due to the rapid increase of the gain, influence of the automatic driver torque, which returns a vehicle to a lane center, increases sharply. Then, the driver, who wishes to maintain an offset drive at Time F, increases the driver torque rapidly, in order to cancel the automatic driver torque. Then, since the automatic driver torque decreases rapidly again, the driver torque which is required to cancel it also increases sharply. Henceforth, the automatic driver torque and the driver torque will repeat a rapid increase and a rapid decrease. Thereby, as shown by G in FIG. 8, the driver torque, the gain, and the automatic driver torque perform vibrational behaviors, and the steering control becomes unstable. In this way, one of the causes which induce unstable steering control is the direct computation of the gain which is conducted based on the driver torque.

It is difficult to solve this subject by parameter tuning. That is, when a driver is releasing his hands from the steering wheel, the autonomous driving system needs to generate an automatic driver torque which is required for the lane keeping, and, during an override, the autonomous driving system tries to decrease the gain of the automatic driver torque, to such an extent that the gain may not interfere with the steering of a driver. In this case, it is necessary to set the gain as 1 at 0 Nm, like the map of FIG. 9, and to decrease the gain to near zero, at a driver torque whose magnitude is easy for a driver to generate (for example, 2.5 Nm). Usually, in order to enable the lane keeping even at a sharp curve, the maximum value of the automatic driver torque (for example, 50 Nm) is about 10 times as large as the maximum value of the driver torque which a driver can generate (for example, 5 Nm). For that reason, the fluctuation range of the automatic driver torque due to the fluctuation of the gain is much larger than the fluctuation range of the driver torque. No matter how the shape of the map of FIG. 9 is changed, a vibration phenomenon among the driver torque and the gain and the automatic driver torque, like the one described above, cannot be avoided.

As a comparative example, FIG. 9 is a drawing which shows an example of the map which will be used when the gain of the automatic driver torque is directly adjusted according to the driver torque. In FIG. 9, when the driver torque is 0.5 Nm or less, the gain is 1. After that, the gain decreases monotonously until the driver torque is up to 2.5 Nm, and when the driver torque is 2.5 Nm or more, the gain becomes 0.

Figure 10:
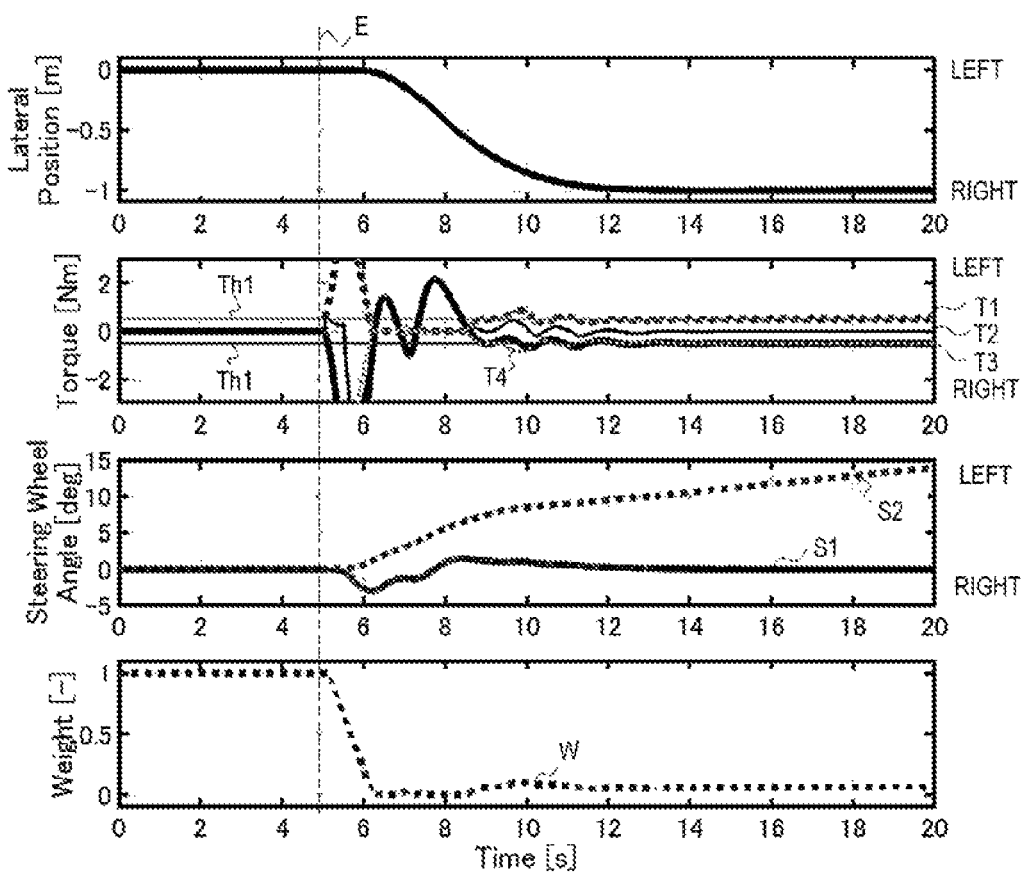
FIG. 10 is a schematic view which shows the mechanism by which the steering control becomes stable in the Embodiment 1.

FIG. 10 is a schematic view which shows that the steering control can be stabilized in the scene of FIG. 7. For confirmation, it is assumed that the first threshold θ w=0.5 Nm, the LKAS torque clip value $T_{Clip, LKAS}$=20 Nm, and the override torque clip value $T_{Clip, OVR}$=0.0 Nm. That is, if the magnitude of the driver torque exceeds 0.5 Nm, the weight decreases from 1 to 0, by the Equations 10, 11, and 12, and the automatic driver torque clip value also decreases from 50 Nm to 0.0 Nm. Moreover, if the magnitude of the driver torque becomes less than 0.5 Nm, the weight increases from 0 to 1, and the automatic driver torque clip value also increases from 1.0 Nm to 50 Nm. Moreover, also in FIG. 10, it is assumed that the driver support torque is 0 Nm at any time.

It is worth noticing that, in the drawing showing the relationship of torques, the dashed line T1 shows an automatic driver torque, the solid line T2 shows an input torque, the solid line T3 shows a driver torque by a driver, the fine dashed line T4 shows an automatic driver torque clip value, and the symbol Th1 shows a first threshold θ w. Moreover, in the drawing showing steering wheel angles, the solid line S1 shows a steering wheel angle, and the dashed line S2 shows a target steering wheel angle. Moreover, in the drawing showing the weight, the dashed line W represents the change state of the weight.

Next, explanation will be made about the mechanism by which the steering control is unlikely to become be unstable in FIG. 10. First, in FIG. 10, like in FIG. 8, in the vicinity of 5 s (at Time E) of the time axis, the driver torque of right direction is generated, in order that a driver may move a vehicle to the right side of a driving lane. Then, when the driver torque exceeds the first threshold of 0.5 Nm, the weight decreases from 1 to 0. At the same time, the automatic driver torque clip value decreases from 50 Nm to 0.0 Nm. As a result, the automatic driver torque is also clipped at 1.0 Nm. After that, as the vehicle approaches straight going, a driver reduces the driver torque, in order to return the steering wheel to 0 deg.

At this time, even though the driver torque becomes less than the first threshold of 0.5 Nm, as long as the increment of weight is set small as shown in FIG. 6, the weight will not increase rapidly. Thereby, the automatic driver torque clip value does not increase rapidly, nor does the clipped automatic driver torque increase rapidly. After that, when going straight ahead, in order to maintain the steering wheel at 0 deg, a driver generates a driver torque so that the automatic driver torque may be cancelled. However, as shown in FIG. 10, the automatic driver torque converges to a fixed value. And, when an override torque clip value is larger than a first threshold θ w which is determined beforehand, the convergence value becomes a value equal to an override torque clip value. In addition, when the override torque clip value is smaller than the predetermined first threshold θ w, the convergence value becomes a value equal to the predetermined first threshold θ w.

In the below, the reason is explained. Since the steering control device needs to maintain the steering wheel at 0 deg during the offset driving of a straight road, the sum of the driver torque and the automatic driver torque is 0 Nm, when the support driver torque is 0 Nm. For that reason, in order to have a converged driver torque, the automatic driver torque also needs to be converged. Supposing that the automatic driver torque is clipped at the automatic driver torque clip value, both of the automatic driver torque clip value and the weight need to be converged. There are three kinds of patterns in which the weight converges. The first kind is a pattern in which the increment of weight is positive, and the weight converges to 1, the second kind is a pattern in which the increment of weight is negative and the weight converges to 0, and the third kind is a pattern in which the increment of weight is 0, and the weight converges to a suitable value. Since the weight must be on the decrease during an override, patterns of the second kind or the third kind can be considered.

Since the increment of weight needs to be 0 in order to have a convergence by the pattern of third kind, the driver torque needs to become equal to a predetermined first threshold θ w. Therefore, the convergence value of the driver torque becomes a value which is equal to the predetermined first threshold θ w. However, when the override torque clip value is larger than the predetermined first threshold θ w, the automatic driver torque is converged to an override torque clip value which is larger than the predetermined first threshold θ w. Since cancellation of this automatic driver torque requires a driver torque which is larger than the predetermined first threshold, the increment of weight becomes negative and the convergence occurs by the pattern of second kind.

That is, the weight is converged to 0. From the reason mentioned above, when an override torque clip value is larger than a predetermined first threshold θ w, the convergence value of the driver torque during an offset driving becomes a value which is equal to an override torque clip value. In addition, when the override torque clip value is smaller than the predetermined first threshold θ w, the convergence value becomes a value which is equal to the predetermined first threshold θ w. In this way, according to the constitution of the present Embodiment, it becomes possible to predict the convergence value of the driver torque during an offset driving. Thereby, the benefit obtained here is that it is easy to adjust the reaction force which a driver receives from the steering wheel.

In this way, according to the constitution of the Embodiment 1, since the weight is computed through the increment of weight, the weight itself does not change suddenly, even though the driver torque changes suddenly. Therefore, since the automatic driver torque clip value also does not change suddenly, the automatic driver torque also does not change suddenly. Then the benefit obtained here is that it is possible to prevent the steering control from becoming unstable. Moreover, the convergence value of the driver torque during an offset driving can be predicted according to the magnitude relationship of the override torque clip value and the first threshold θ w which is determined beforehand. Therefore, the benefit obtained here is that it is easy to adjust the reaction force which a driver receives from the steering wheel.

It is worth noticing that, although the LKAS is assumed in the Embodiment 1, it is allowed to employ Lane Departure Prevention System (LDPS), instead of the LKAS.

Moreover, the increment of weight is computed based on the driver torque, and a clip value is changed in the Embodiment 1. However, if the increment of gain is computed instead of the increment of weight and the gain of the automatic driver torque is changed, the sudden change of the automatic driver torque can be prevented at the time when the driver torque changes suddenly. Then, the benefit obtained here is that it is possible to prevent the steering control from becoming unstable. Or, it is allowed to use both the change of a clip value by the weight and the change of the gain. As a result, the wider range of tuning becomes available.

Embodiment 2

In the Embodiment 1, set is only the condition that the override torque clip value (the minimum value of the automatic driver torque clip value) is smaller than the LKAS torque clip value (the maximum value of the automatic driver torque clip value).

However, it is allowed to add the condition that the override torque clip value is larger than the maximum value of the predetermined first threshold θ w. As a result, the driver torque during an offset driving is converged to a value which is larger than the predetermined first threshold θ w, the weight is converged to a minimum value, and the automatic driver torque is converged to the minimum value of the automatic driver torque clip value. Therefore, the convergence of the driver torque, the weight, and the automatic driver torque is accelerated, and the stability of the steering control can be improved.

In the below, explanation will be made about the Embodiment 2. Explanation which overlaps with the Embodiment 1 is omitted here.

In the Embodiment 2, the override torque clip value is set to be larger than the maximum value of the first threshold θ w, which is determined beforehand. When the override torque clip value is smaller than the first threshold θ w, the driver torque is converged to the first threshold θ w, as explained in the Embodiment 1. At this time, the increment of weight may carry out hunting between the positive and the negative, in the vicinity of the first threshold θ w, the weight also changes and the convergence becomes slower. On the other hand, by setting the override torque clip value to be larger than the maximum value of the first threshold θ w, the driver torque is converged, during an offset driving, to a value which is larger than the first threshold θ w. Therefore, the increment of weight becomes always negative, and the weight does not change, and the convergence becomes faster.

Figure 11:
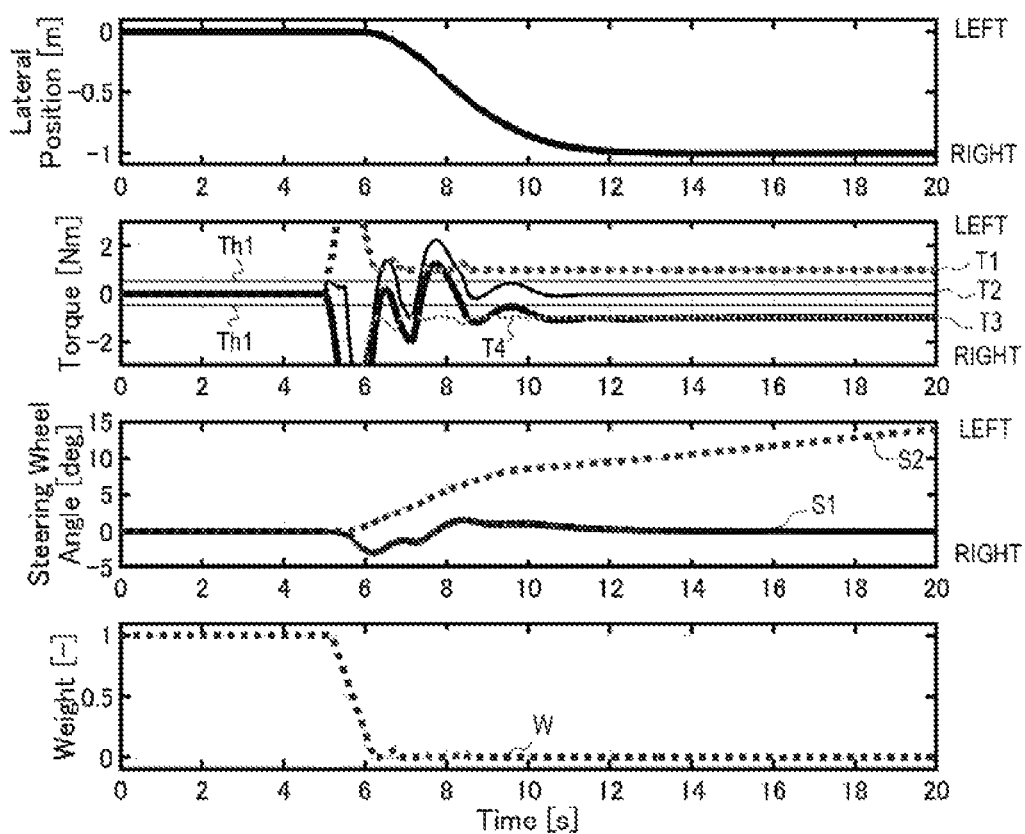
FIG. 11 is a schematic view which shows the mechanism by which the hunting of the weight is reduced in Embodiment 2.

FIG. 11 is a schematic view which shows that, in the scene which is shown in FIG. 7, the convergence of the driver torque becomes faster in the Embodiment 2. It is assumed that, the first threshold θ w=0.5 Nm, the LKAS torque clip value $T_{Clip, LKAS}$=20 Nm, and the override torque clip value $T_{Clip, OVR}$=1.0 Nm.

It is worth noticing that, in the drawing which shows the relationship of torques, the dashed line T1 shows an automatic driver torque, the solid line T2 shows an input torque, the solid line T3 shows a driver torque by a driver, the fine dashed line T4 shows an automatic driver torque clip value, and the symbol Th1 shows a first threshold θ w. Moreover, in the drawing showing steering wheel angles, the solid line S1 shows a steering wheel angle, and the dashed line S2 shows a target steering wheel angle. Moreover, in the drawing showing the weight, the dashed line W represents the change state of the weight.

In FIG. 11, the driver torque is converged to the minimum value of the automatic driver torque clip value, i.e., an override torque clip value. Since the override torque clip value is over the predetermined first threshold θ w, the increment of weight becomes always negative and the weight converges to 0. Compared with FIG. 10 in which the increment of weight carries out hunting between the positive and the negative and the weight fluctuates, the convergence of the weight becomes faster.

In this way, it is not a mere change of the design to set an override torque clip value which is larger than the maximum value of the first threshold θ w. It is a necessary condition for the convergence value of the weight to be converged to 0 at the time of an offset driving.

It is worth noticing that, in FIG. 10, it is assumed that the driver support torque is 0 Nm at any time. However, the driver support torque is not 0 Nm, in fact. For that reason, the driver torque which is required for the cancellation of the automatic driver torque becomes lower by the amount equal to the driver support torque. Therefore, in order to make a weight and an automatic driver torque clip value converge to a minimum value during an offset driving, the influence of the driver support torque also needs to be taken into consideration, and it is required that the minimum value of the automatic driver torque clip value is made larger than the predetermined first threshold, with a margin between the two.

In this way, according to the constitution of the Embodiment 2, the driver torque during an offset driving is converged to a value which is larger than the predetermined first threshold, the weight is converged to a minimum value, and the automatic driver torque is converged to the minimum value of the automatic driver torque clip value. Thereby, the convergence of the driver torque, the weight, and the automatic driver torque is accelerated, and the benefit obtained here is that the stability of the steering control can be improved.

Embodiment 3

In the Embodiment 2, a condition is added that the override torque clip value (the minimum value of the automatic driver torque clip value) is larger than the maximum value of the first threshold, which is determined beforehand. Instead, it is allowed to add a condition that the override torque clip value is smaller than the minimum value of the first threshold θ w. As a result, since the driver torque during an offset driving is converged to the first threshold θ w, regardless of the curvature of a driving lane, the reaction force which is applied to a driver can be made constant, regardless of the curvature.

In the below, explanation will be made about the Embodiment 3. Explanation which overlaps with the Embodiments 1 and 2 is omitted here.

Figure 12:
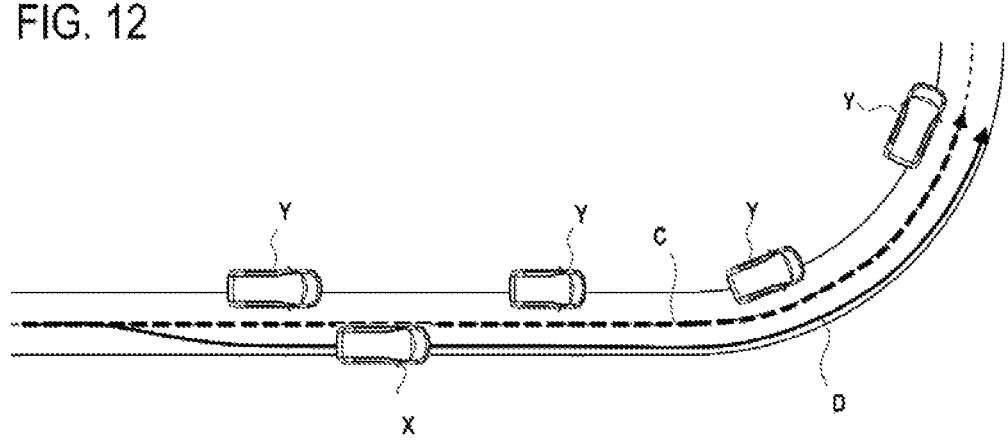
FIG. 12 is a schematic view of a scene in which the driver torque converges regardless of the curvature of a driving lane in Embodiment 3.

FIG. 12 is a schematic view which shows an example of a scene in which, in the present Embodiment, the driver torque is likely to converge to a predetermined first threshold θ w, regardless of the curvature of a driving lane. The host vehicle X is travelling on a straight road which is connected to a left curve, and the LKAS is in operation. For that reason, the autonomous driving system is performing steering control so that the vehicle may travel on a lane center. And, vehicles Y parked on a street are lined up all the way from a straight road to the left curve at a left front, and it is assumed that the autonomous driving system cannot recognize vehicles parked on a street. At this time, a driver carries out an override, and tries to drive the host vehicle X with an offset of about 1 m on the right side of a driving lane. It is worth noticing that, in FIG. 12, the dashed line C shows the target route of the autonomous driving, and the solid line D shows the target route of a driver.

Figure 13:
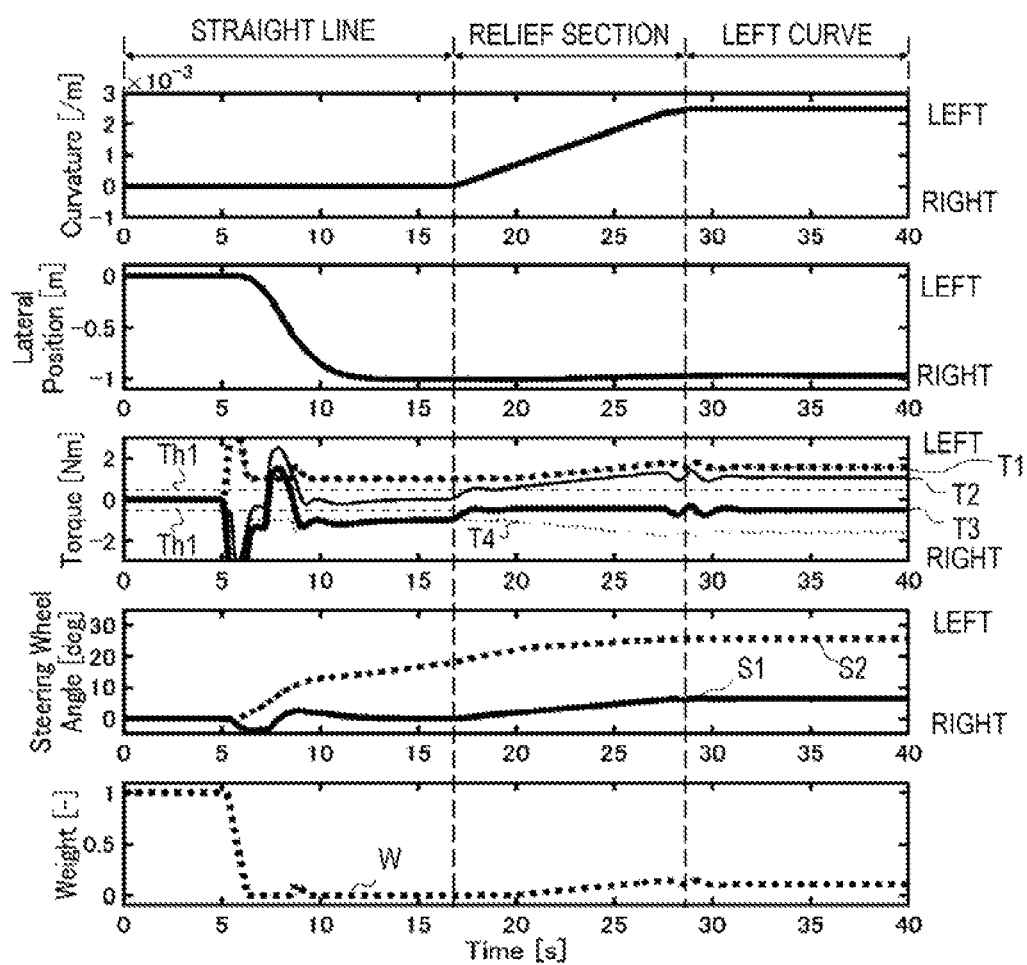
FIG. 13 is a schematic view which shows that the reaction force which is applied to a driver is changed, depending on the curvature in the Embodiment 2.

FIG. 13 is a schematic view which shows that, in the scene of FIG. 12, when the override torque clip value is not set to be smaller than the minimum value of the first threshold θ w, which is determined beforehand, the reaction force which is applied to a driver depends on the curvature. For confirmation, it is assumed that the predetermined first threshold θ w=0.5 Nm, the LKAS torque clip value $T_{Clip, LKAS}$=20 Nm, and the override torque clip value $T_{Clip, OVR}$=1.0 Nm. In FIG. 13, for the same reason as in FIG. 11, the driver torque is converged, in the straight section, to the minimum value of the automatic driver torque clip value, i.e., the override torque clip value. When a vehicle enters a relief section toward a left curve, the input torque T2 needs to be raised by the amount equal to a self aligning torque. However, since the automatic driver torque T1 cannot be increased due to a clip, the driver torque T3 is instead raised in a left direction.

It is worth noticing that, in the drawing showing the relationship of torques, the dashed line T1 shows an automatic driver torque, the solid line T2 shows an input torque, the solid line T3 shows a driver torque by a driver, the fine dashed line T4 shows an automatic driver torque clip value, and the symbol Th1 shows a first threshold θ w. Moreover, in the drawing showing steering wheel angles, the solid line S1 shows a steering wheel angle, and the dashed line S2 shows a target steering wheel angle. Moreover, in the drawing showing the weight, the dashed line W represents the change state of the weight.

When the driver torque reaches the first threshold θ w, the weight will increase. Thereby, both of the automatic driver torque clip value and the automatic driver torque also will increase. As a result, the input torque is raised by the amount equal to the increased self aligning torque. After that, the driver torque is converged to the first threshold θ w, also in the left curve section. In this way, when the override torque clip value $T_{Clip, OVR}$ is set to be larger than the maximum value of the predetermined first threshold θ w, the convergence value of the driver torque will change depending on the curvature, and the reaction force which is applied to a driver will also change depending on the curvature.

Figure 14:
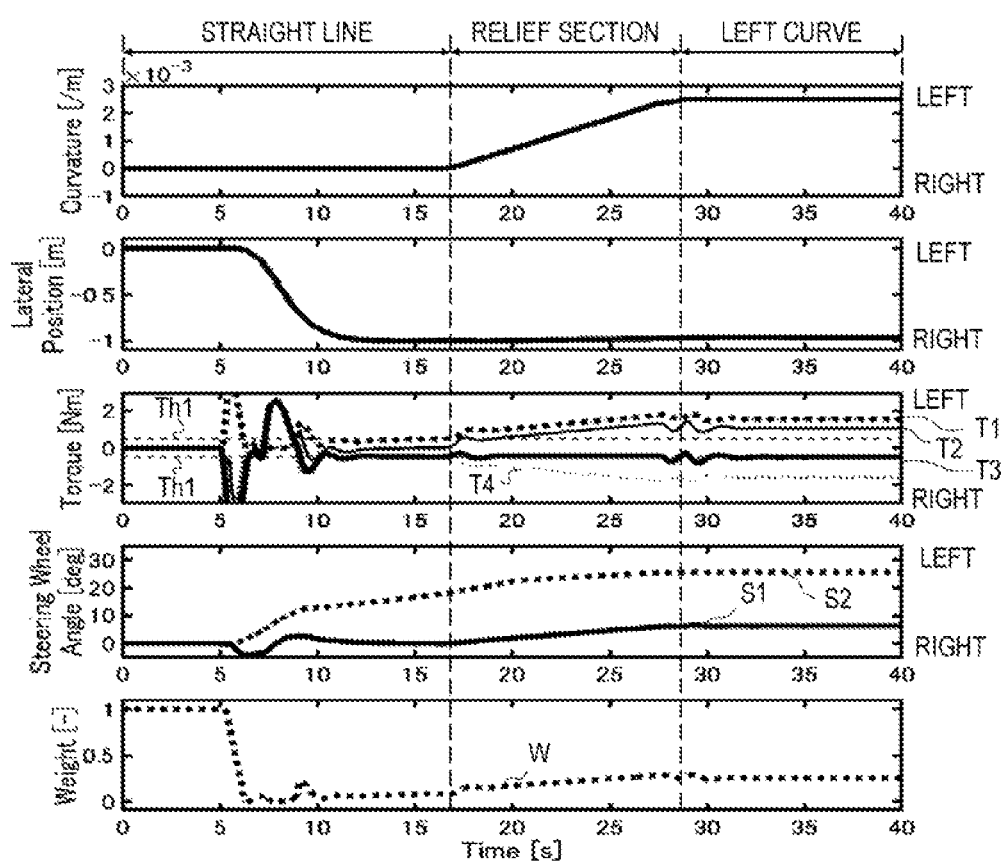
FIG. 14 is a schematic view which shows that the reaction force which is applied to a driver becomes constant, regardless of the curvature in the Embodiment 3.

FIG. 14 is a schematic view which shows that, in the scene of FIG. 12, a case where the override torque clip value is set to be smaller than the minimum value of the predetermined first threshold θ w, in other words, in the present Embodiment, the reaction force which is applied to a driver does not depend on the curvature. For confirmation, it is assumed that the predetermined first threshold θ w=0.5 Nm, the LKAS torque clip value $T_{Clip,\ LKAS}$=20 Nm, and the override torque clip value $T_{Clip,\ OVR}$=0.0 Nm.

It is worth noticing that, in the drawing which shows the relationship of torques, the dashed line T1 shows an automatic driver torque, the solid line T2 shows an input torque, the solid line T3 shows a driver torque by a driver, the fine dashed line T4 shows an automatic driver torque clip value, and the symbol Th1 shows a first threshold θ w. Moreover, in the drawing showing steering wheel angles, the solid line S1 shows a steering wheel angle, and the dashed line S2 shows a target steering wheel angle. Moreover, in the drawing showing the weight, the dashed line W represents the change state of the weight.

In FIG. 14, the driver torque is converged to a first threshold θ w, in a straight section, for the same reason as in FIG. 10. After that, when the vehicle enters a relief section or a left curve, the input torque needs to be raised by the amount equal to the self aligning torque. However, when the driver torque becomes even slightly smaller than the first threshold θ w, the weight will increase. In addition, since the automatic driver torque clip value and the automatic driver torque also increase, the input torque is on the increase, while the driver torque is converged to the first threshold θ w. In this way, when the override torque clip value is set to be smaller than the minimum value of the predetermined first threshold θ w, the driver torque converges to the first threshold θ w, regardless of the curvature. Therefore, the benefit obtained here is that the reaction force which is applied to a driver also can be made constant, regardless of the curvature.

In this way, it is not a mere change of the design to set an override torque clip value which is smaller than the minimum value of the first threshold θ w. In addition, it is a necessary condition for the driver torque to converge to the first threshold θ w at the time of an offset driving. It is worth noticing that, in FIG. 14, the driver support torque is set to 0 Nm at any time. However, the driver support torque is not 0 Nm, in fact. For that reason, the driver torque which is required for the cancellation of the automatic driver torque is reduced by the amount equal to the driver support torque.

Therefore, in order to have a driver torque which is converged to the first threshold θ w during an offset driving, the influence of the driver support torque also needs to be taken into consideration, and it is required that the minimum value of the automatic driver torque clip value is made larger than the predetermined first threshold θ w, with a margin between the two. In this way, according to the constitution of the present Embodiment, the driver torque converges to the predetermined first threshold θ w during an offset driving, regardless of the curvature of a driving lane. Therefore, the benefit obtained here is that the reaction force which is applied to a driver can be made constant, regardless of the curvature.

Embodiment 4

In the Embodiment 3, added is the condition that the override torque clip value $T_{Clip,\ OVR}$ is smaller than the minimum value of the predetermined first threshold θ w. However, it is allowed further to employ a larger first threshold θ w, according to the magnitude of the degree of a first deviation. The driver torque during an offset driving converges to a first threshold θ w. Thereby, as the degree of the first deviation becomes larger, a larger convergence value of the driver torque can be obtained. That is, the reaction force which is applied to a driver can be increased, and the risk of deviating from a lane during an override can be reduced.

In the below, explanation will be made about the Embodiment 4. Explanation which overlaps with the Embodiments 1, 2, and 3 is omitted here.

Figure 15:
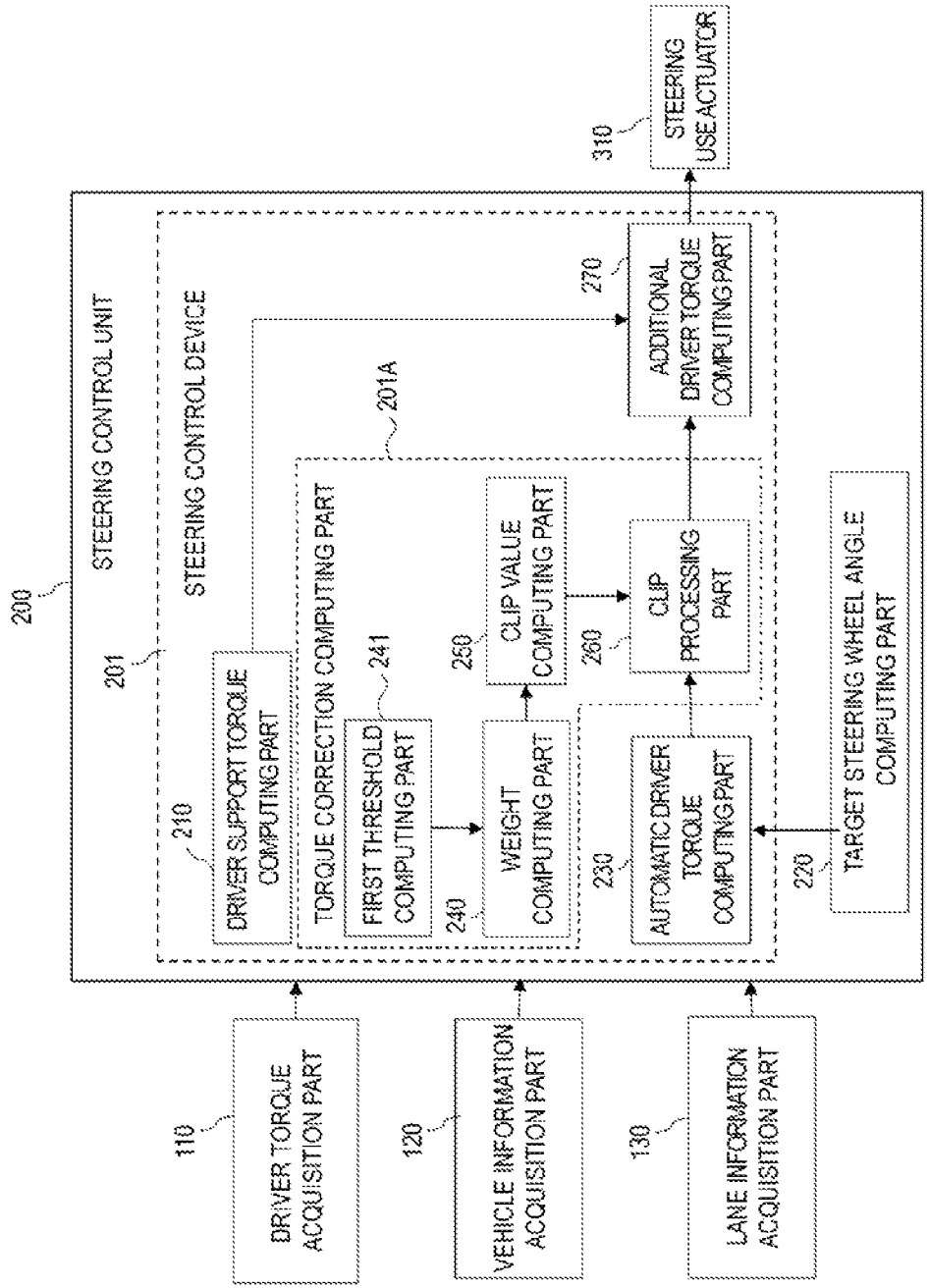
FIG. 15 is a block diagram which shows the constitution of Embodiment 4.

FIG. 15 is a block diagram which shows the schematic constitution of the steering control system of the Embodiment 4. Explanation about portions which are common to FIG. 1 will be omitted.

The difference from FIG. 1 is that the torque correction computing part 201A is equipped with a first threshold computing part 241. The first threshold computing part 241 computes a first threshold θ w based on the degree of a first deviation. Here, the degree of the first deviation is a lateral position at a host vehicle position, for example. Or, the degree of the first deviation is a lateral position at a look-ahead distance, a distance to the lane marking of a host vehicle driving lane at a host vehicle position, a distance to the lane marking of a host vehicle driving lane at a look-ahead distance, and a time until a host vehicle crosses the lane marking of a host vehicle driving lane. In addition, any variable which indicates the degree of the deviation of a host vehicle may be used.

The weight computing part 240 computes a weight based on the first threshold which is computed in the first threshold computing part 241.

Figure 16:
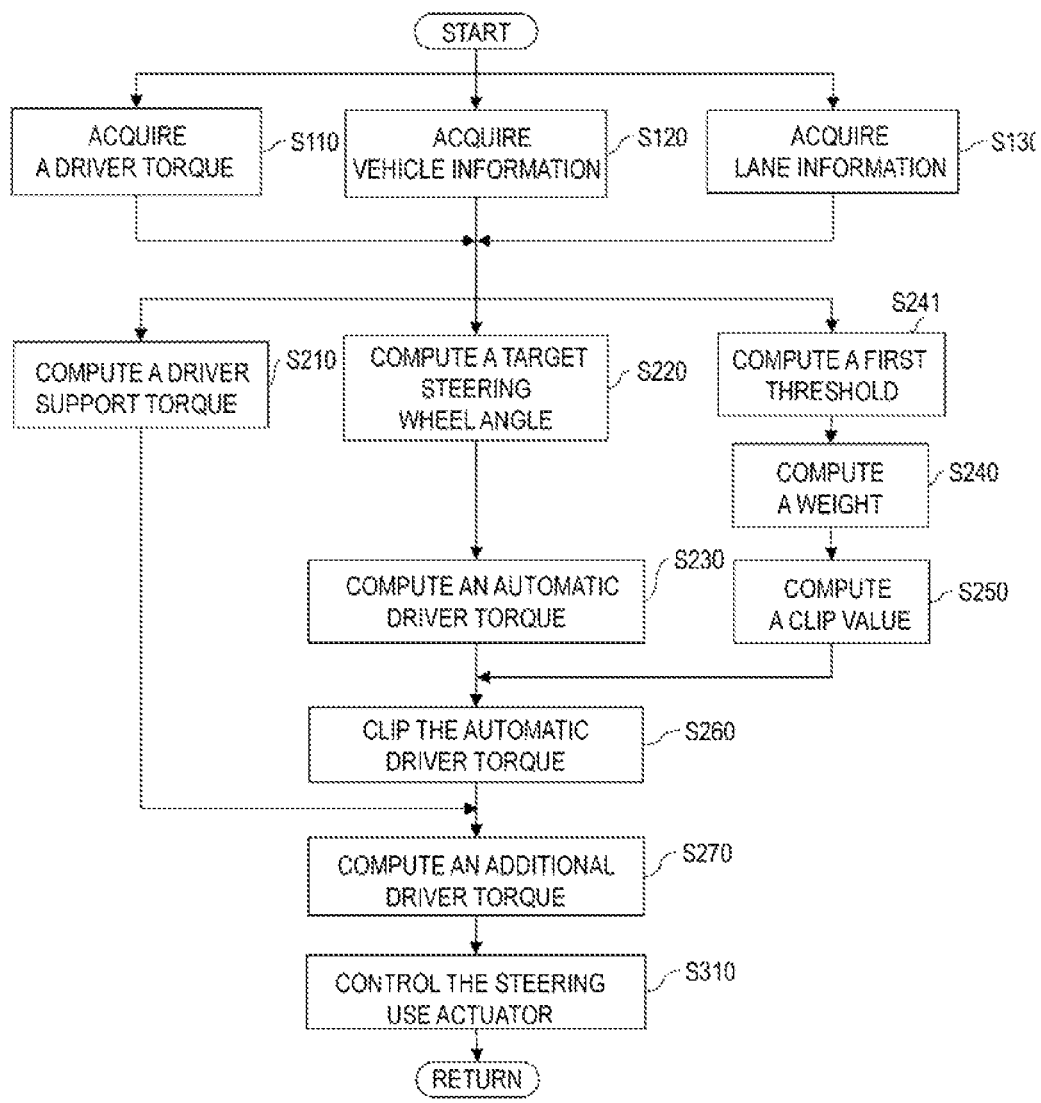
FIG. 16 is a flow chart which shows the operation of the Embodiment 4.

FIG. 16 is a flow chart which shows the procedure of the steering control device of the Embodiment 4. Explanation about portions which are common to FIG. 5 will be omitted.

In Step S241 of FIG. 16, a first threshold θ w is computed in the first threshold computing part 241. Computation is conducted so that the first threshold θ w may become larger, as the degree of the deviation becomes larger. For the computation of the first threshold θ w, a map may be used, or a suitable monotonically increasing function may be used.

Next, in Step S240 of FIG. 16, a weight is computed in the weight computing part 240. Except that, the first threshold θ w which is computed in the first threshold computing part 241 is used for the computation of the weight, the weight is computed in the same procedure as the Step S240 of FIG. 5.

Figure 17:
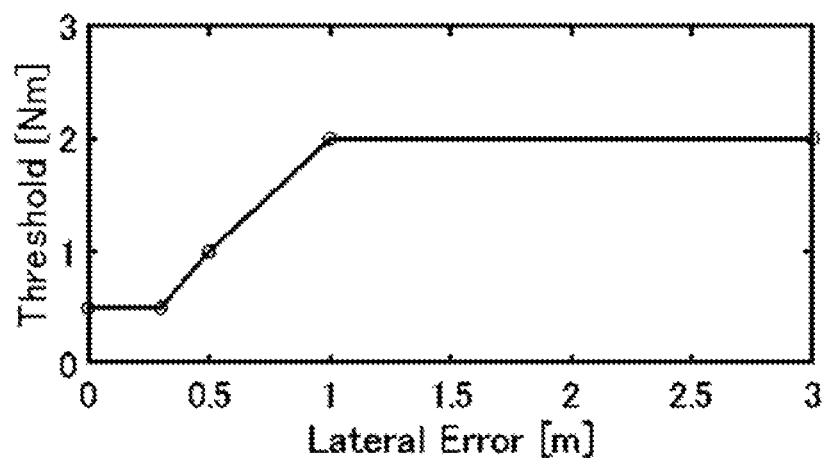
FIG. 17 is an explanatory diagram of a map for computing a first threshold, from the degree of a first deviation in the Embodiment 4.

FIG. 17 is a drawing which shows an example of the map $M_{θW}$, for the computation of the first threshold θ w, based on the degree of the first deviation in the first threshold computing part 241. Here, it is assumed that the absolute value of a lateral position $|e_0|$ at a host vehicle position is the degree of a first deviation. This map is designed so that the first threshold θ w may monotonically increase, according to the absolute value of a lateral position $|e_0|$. Since the driver torque during an offset driving converges to the first threshold θ w, a larger convergence value of the driver torque can be obtained, as the degree of the first deviation becomes larger. That is, the reaction force which is applied to a driver can be increased, and the benefit obtained here is that the risk of deviating from a lane during an override is reduced.

It is worth noticing that, as explained in the Embodiments 1 and 3, in order to make the driver torque during an offset driving converge to the first threshold θ w, the override torque clip value $T_{Clip,\ OVR}$ needs to be smaller than the minimum value of the predetermined first threshold θ w. Therefore, the map $M_{θW}$ is designed so that the first threshold θ w may always become larger than the override torque clip value $T_{Clip,\ OVR}$.

Moreover, in the present Embodiment, the absolute value of a lateral position $|e_0|$ is used as the input of the map. However, it is allowed to use $|e_0|$ which is multiplied by a coefficient, where the coefficient becomes 1 at the outer side of a curve, and −1 at the inner side of a curve. And, when the Map $M_{\theta W}$ includes a horizontal axis which is designed to a negative domain, it becomes possible to change convergence values of the driver torque at the outer side and inner side of a curve.

Figure 18:
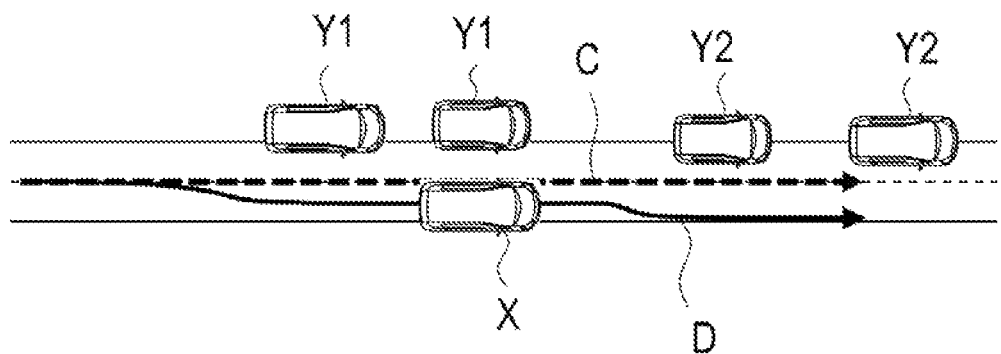
FIG. 18 is a schematic view of a scene in the Embodiment 4, where a larger reaction force which is applied to a driver can be obtained, as the degree of the first deviation becomes larger.

FIG. 18 is a schematic view of the present Embodiment 4 which shows an example of a scene where, as the lateral position at a host vehicle position is larger, the reaction force which is applied to a driver is likely to become larger. The host vehicle X is travelling on s straight road, and LKAS is in operation. For that reason, the autonomous driving system is performing the steering control so that the host vehicle may travel on a lane center. And, the vehicle group Y1 which is parked on a street is lined up on the left front all the way for about 100 m, and it is assumed that the autonomous driving system cannot recognize the vehicle group Y1 which is parked on a street. At this time, a driver carries out an override, and drives the host vehicle, at first, with an offset of about 0.5 m on the right side of the driving lane. From the middle of the way, corresponding to the vehicle group Y2 which is parked on a street, the driver tries to drive with an offset of about 1 m. It is worth noticing that, in FIG. 18, the dashed line C shows the target route of the autonomous driving, and the solid line D shows the target route of the driver.

Figure 19:
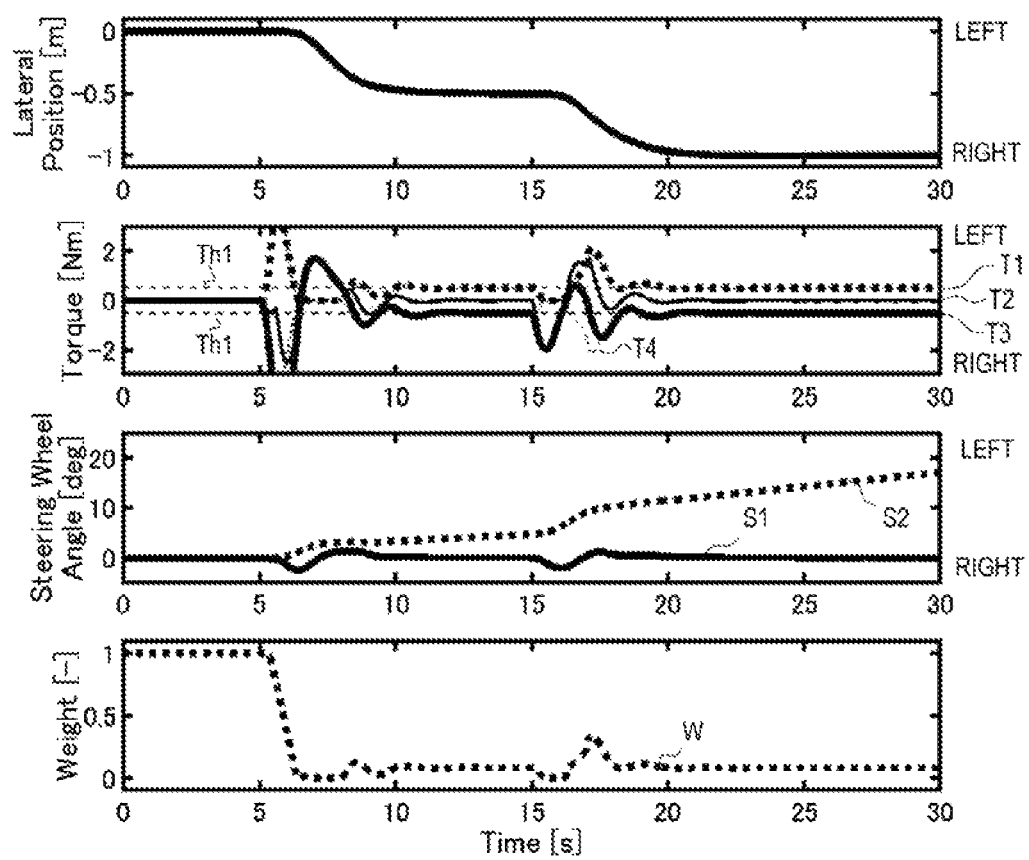
FIG. 19 is a schematic view which shows that, even though the degree of the first deviation increases, the reaction force which is applied to a driver does not increase, in the Embodiment 4.

FIG. 19 is a schematic view which shows that, when the first threshold θ w is a fixed value in the scene of FIG. 18, the reaction force which is applied to a driver does not change, even though the lateral position at a host vehicle position is increased. For confirmation, it is assumed that the predetermined first threshold θ w=0.5 Nm, the LKAS torque clip value $T_{Clip, LKAS}$=20 Nm, and the override torque clip value $T_{Clip, OVR}$=0.0 Nm.

It is worth noticing that, in the drawing showing the relationship of torques, the dashed line T1 shows an automatic driver torque, the solid line T2 shows an input torque, the solid line T3 shows a driver torque by a driver, the fine dashed line T4 shows an automatic driver torque clip value, and the symbol Th1 shows a first threshold θ w. Moreover, in the drawing showing steering wheel angles, the solid line S1 shows a steering wheel angle, and the dashed line S2 shows a target steering wheel angle. Moreover, in the drawing showing the weight, the dashed line W represents the change state of the weight.

A driver carries out an override at around 7 s of the time axis of FIG. 19, and the lateral position is increased to 0.5 m or so. At this time, since the driver torque is converged to 0.5 Nm of the first threshold θ w, the reaction force which is applied to a driver becomes 0.5 Nm. After that, the driver carries out steering again at around 17 s, and the lateral position is increased to 1 m or so. However, since the first threshold θ w is fixed at 0.5 Nm, the driver torque converges to 0.5 Nm, and the reaction force which is applied to a driver remains at 0.5 Nm. In this way, when the first threshold θ w is a fixed value, the reaction force which is applied to a driver does not increase, even though a lateral position is increased. Then, the driver cannot perceive, through the reaction force, that the degree of the deviation is on the increase.

Figure 20:
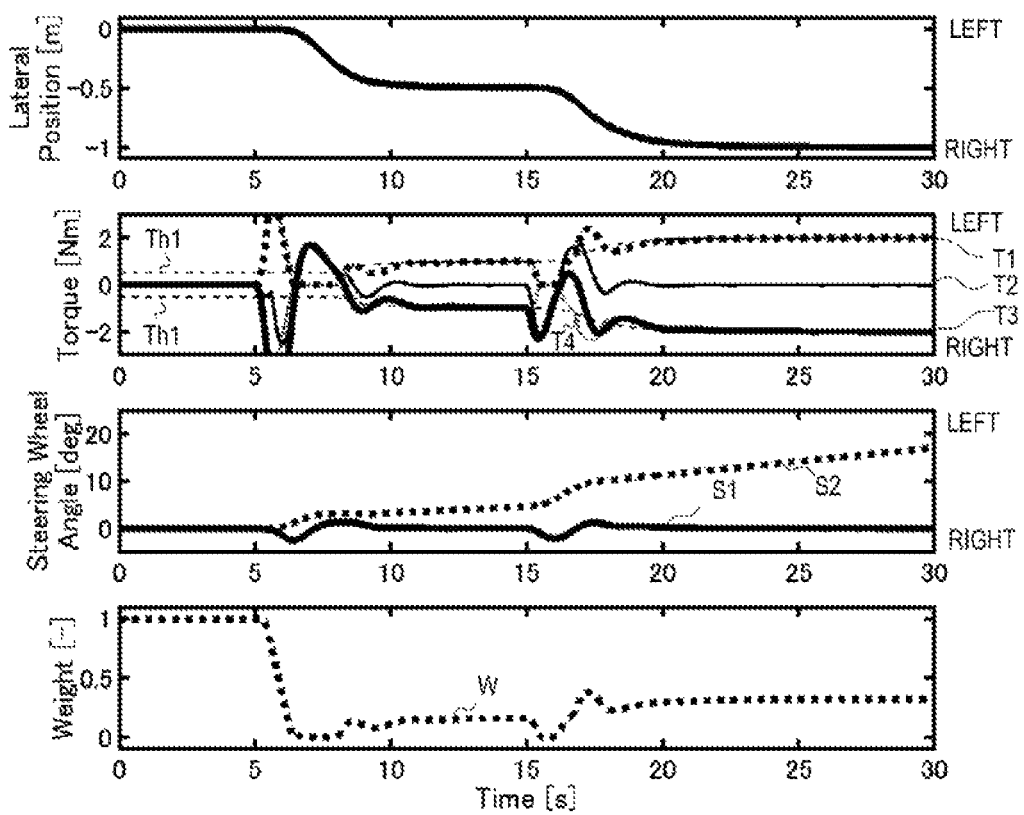
FIG. 20 is a schematic view of the Embodiment 4 which shows that a larger reaction force which is applied to a driver can be obtained, as the degree of the first deviation becomes larger.

FIG. 20 is a schematic view which shows that, when a larger first threshold θ w is employed according to the magnitude of the degree of the first deviation in the scene of FIG. 18, the reaction force which is applied to a driver is increased, if the lateral position at a host vehicle position is increased. For confirmation, it is assumed that the predetermined first threshold θ w is computed using the map of FIG. 17. Moreover, it is assumed that the LKAS torque clip value $T_{Clip, LKAS}$=50 Nm, and the override torque clip value $T_{Clip, OVR}$=0.0 Nm.

It is worth noticing that, in the drawing showing the relationship of torques, the dashed line T1 shows an automatic driver torque, the solid line T2 shows an input torque, the solid line T3 shows a driver torque by driver, the fine dashed line T4 shows an automatic driver torque clip value, and the symbol Th1 shows a first threshold θ w. Moreover, in the drawing showing steering wheel angles, the solid line S1 shows a steering wheel angle, and the dashed line S2 shows a target steering wheel angle. Moreover, in the drawing showing the weight, the dashed line W represents the change state of the weight.

In FIG. 20, it can be seen that the first threshold θ w is increasing, with the increase of the lateral position. As a result, while the driver torque is converged to 1 Nm or so, when a lateral position is 0.5 m, the driver torque is converged to 2 Nm, when the lateral position is 1 m. That is, when the lateral position increases, the reaction force which is applied to a driver will also increase. As a result, the driver can perceive, through the reaction force, that the degree of the deviation is on the increase. For that reason, the risk of deviating from a lane during an override can be reduced.

In this way, according to the constitution of the Embodiment 4, the first threshold θ w changes depending on the degree of the first deviation. Since the driver torque during an offset driving is converged to the first threshold θ w, a larger convergence value of the driver torque can be obtained, as the degree of the first deviation becomes larger. That is, the reaction force which is applied to a driver can be increased, and the risk of deviating from a lane during an override can be reduced.

Embodiment 5

In the Embodiment 1, the clip value of the automatic driver torque is changed according to the driver torque. However, it is allowed to change a gain, instead of the clip value. At this time, like the computation of the weight, a gain is computed through the increment of gain. Thereby, even though the driver torque changes suddenly, the gain itself does not change suddenly, and the stability of the steering control can be improved. Moreover, when computing the automatic driver torque based on the deviation of a steering wheel angle and a target steering wheel angle, sudden change of the automatic driver torque can be prevented, when the positive or negative of the deviation of a steering wheel angle is reversed, and the stability of the steering control improves.

In the below, explanation will be made about the Embodiment 5. Explanation which overlaps in the Embodiments 1-4 is omitted here.

In the Embodiment 5, a gain is computed, according to the magnitude of the driver torque, based on the automatic driver torque, and a final automatic driver torque is computed by multiplying the automatic driver torque by the gain. Here, for the computation of a gain, a second threshold is determined beforehand. When the driver torque is small with respect to this second threshold, computation will be performed so that the increment of gain may become positive. In addition, when the driver torque is larger than the predetermined second threshold, computation will be performed so that the increment of gain may become negative.

As a result, since the gain becomes small during an override, the automatic driver torque can be decreased to such an extent that the steering of a driver may not be interfered during an override. Further, the benefit obtained here is that the autonomous driving system can generate the automatic driver torque which is required for the lane keeping, when the driver is releasing his hands from the steering wheel. Moreover, like the computation of the weight, by computing a gain through the increment of gain, the gain itself does not change suddenly, even though the driver torque changes suddenly. Therefore, the automatic driver torque does not change suddenly, and the benefit obtained here is that it is possible to prevent the steering control from becoming unstable. Moreover, while the processing for clipping the automatic driver torque is non-linear transformation, the processing for multiplying a gain is linear transformation. Thereby, the time differentiation value of the automatic driver torque is also subject to the influence of a gain. As a result, when the gain is small, the time differentiation value of the automatic driver torque also becomes small. In addition, the benefit obtained here is that, when the magnitude relationship between the steering wheel angle and the target steering wheel angle is reversed, sudden change of the automatic driver torque can be prevented.

Figure 21:
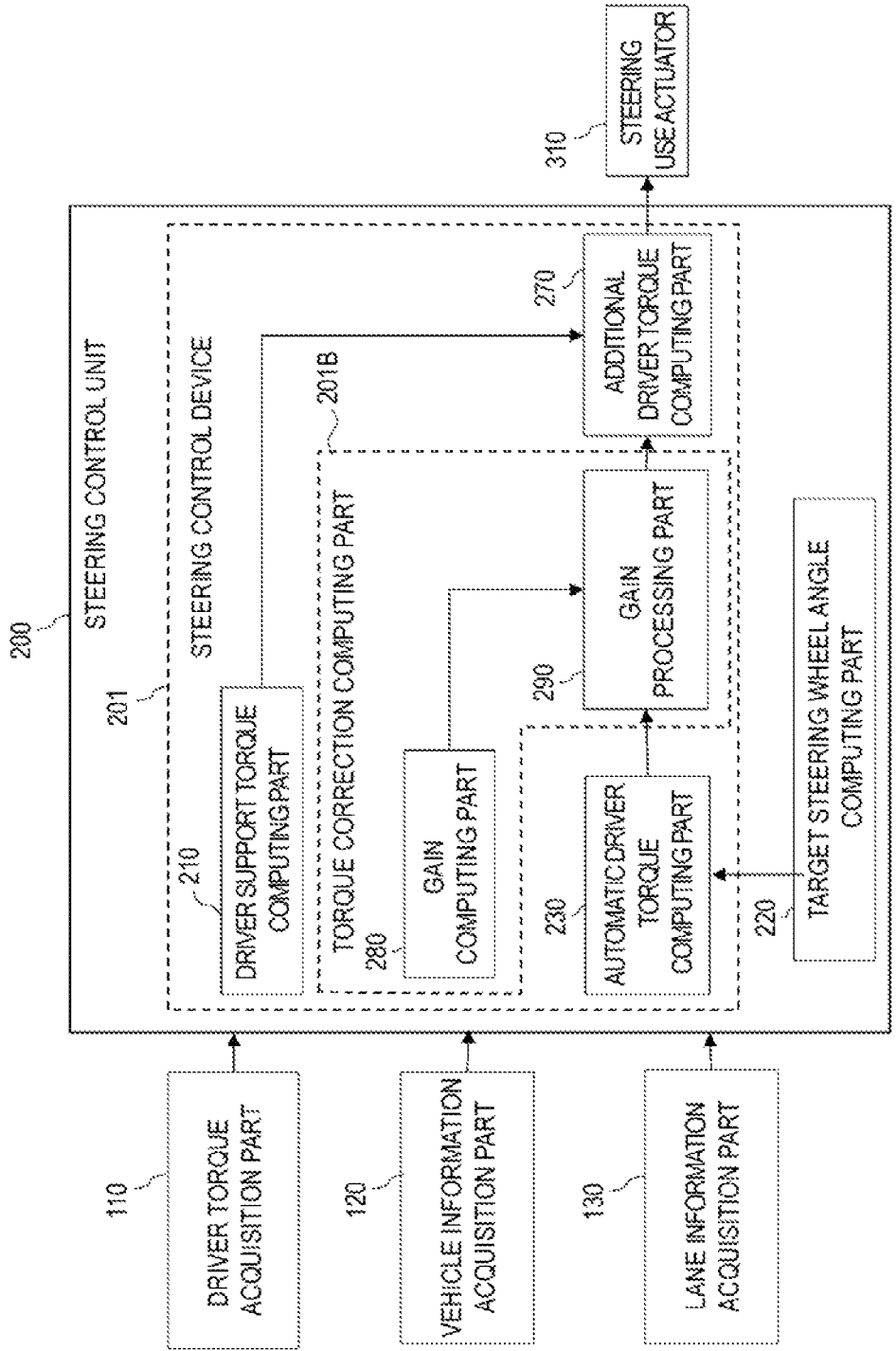
FIG. 21 is a block diagram which shows the constitution of Embodiment 5.

FIG. 21 is a block diagram which shows the schematic constitution of the steering control system of the Embodiment 5. Explanation about portions which are common to FIG. 1 will be omitted.

The difference from FIG. 1 is the constitution of the torque correction computing part 201B, and the torque correction computing part 201B is equipped with a gain computing part 280 and a gain processing part 290.

The gain computing part 280 computes a gain based on the information which contains at least a driver torque.

The gain processing part 290 multiplies the automatic driver torque by the gain.

The additional driver torque computing part 270 computes an additional driver torque based on a driver support torque and the gain processed driver torque. And, the steering control device controls so that the steering use actuator 310 may generate the additional driver torque.

Figure 22:
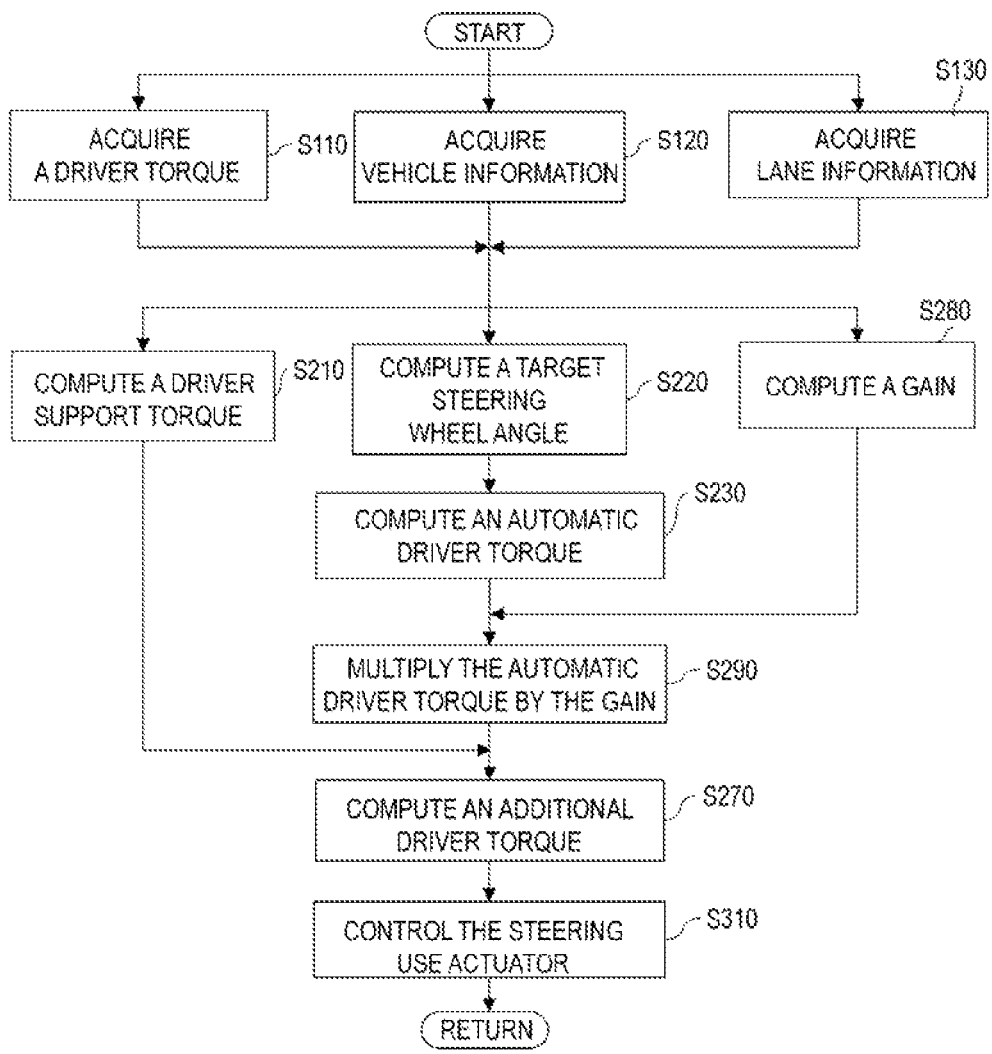
FIG. 22 is a flow chart which shows the operation of the Embodiment 5.

FIG. 22 is a flow chart which shows the procedure of the steering control device of the Embodiment 5. Explanation about portions which are common to FIG. 5 will be omitted.

In Step S280 of FIG. 22, a gain K is computed in the gain computing part 280. The method of computing the gain K is the same as that for the weight. When the magnitude of the driver torque $|T_{Driver}|$ is smaller than a second threshold $\theta_K$ (for example, 0.5 Nm or so), an increment ΔK is computed so that the increment of gain ΔK may become positive. In addition, when the magnitude of the driver torque $|T_{Driver}|$ is larger than the second threshold $\theta_K$, an increment ΔK is computed so that the increment of gain ΔK may become negative. Regarding the computation of the increment ΔK, it is allowed to use a map which corresponds to the magnitude of the driver torque $|T_{Driver}|$, or to use a constant value.

For example, when computing the increment ΔK with the map $M_K(|T_{Driver}|)$ of the magnitude $|T_{Driver}|$ of the driver torque, the gain K is computed as follows.

[Equation 18]

Eq. 18

$$\Delta K = M_K(|T_{Driver}|) \tag{18}$$

[Equation 19]

Eq. 19

$$K(k) = K(k-1) + \Delta K \cdot t_{samp} \tag{19}$$

[Equation 20]

Eq. 20

$$K = \max(\min(K,1),0) \tag{20}$$

In the Equation 20, the range of the gain K is restricted so that K∈[0, 1] may be satisfied, however, this range may not be [0, 1].

In this way, the gain K is computed through the computation of the increment of gain ΔK. Thereby, even when the magnitude of the driver torque $|T_{Driver}|$ changes suddenly, the gain K becomes less likely to change suddenly, comparing the case, where the gain K is computed directly from the magnitude of the driver torque $|T_{Driver}|$. The benefit obtained here is that it is possible to prevent the steering control from becoming unstable. Moreover, a small increment of gain ΔK is set near the second threshold $\theta_K$. Thereby, when the magnitude of the driver torque $|T_{Driver}|$ is near the second threshold $\theta_K$, a possibility that a gain will carry out hunting can be reduced. In addition, the benefit obtained here is that steering control is less likely to become unstable. It is worth noticing that, the second threshold $\theta_K$ is not a fixed value, and may be a variable value.

In Step S290 of FIG. 22, the automatic driver torque is multiplied by again, in the gain computing part 280.

Figure 23:
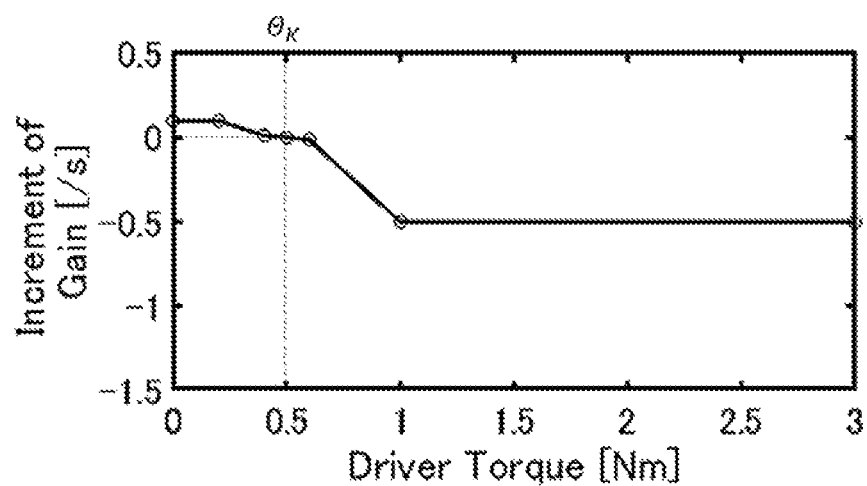
FIG. 23 is an explanatory diagram of a map for computing an increment of gain from the driver torque in the Embodiment 5.

FIG. 23 is a drawing which shows an example of the map $M_K$ for computing the increment of gain in the gain computing part 280. Here, the map $M_K$ is designed so that, when the magnitude of the driver torque $|T_{Driver}|$ is smaller than the second threshold $\theta_K$, the increment of gain ΔK may become positive, and in addition, when the magnitude of the driver torque $|T_{Driver}|$ is larger than the second threshold $\theta_K$, the increment of gain ΔK may become negative.

The benefit obtained here is that, by having a decrease amount which is larger than an increase amount, a decreased gain will be obtained quickly, when a driver carries out an override. Moreover, at the time when the magnitude of the driver torque $|T_{Driver}|$ is near the second threshold $\theta_K$, the increment of gain ΔK is made small. Thereby, a benefit obtained here is that the gain K is less likely to carry out hunting, at the time when the magnitude of the driver torque $|T_{Driver}|$ is near the second threshold $\theta_K$.

Figure 24:
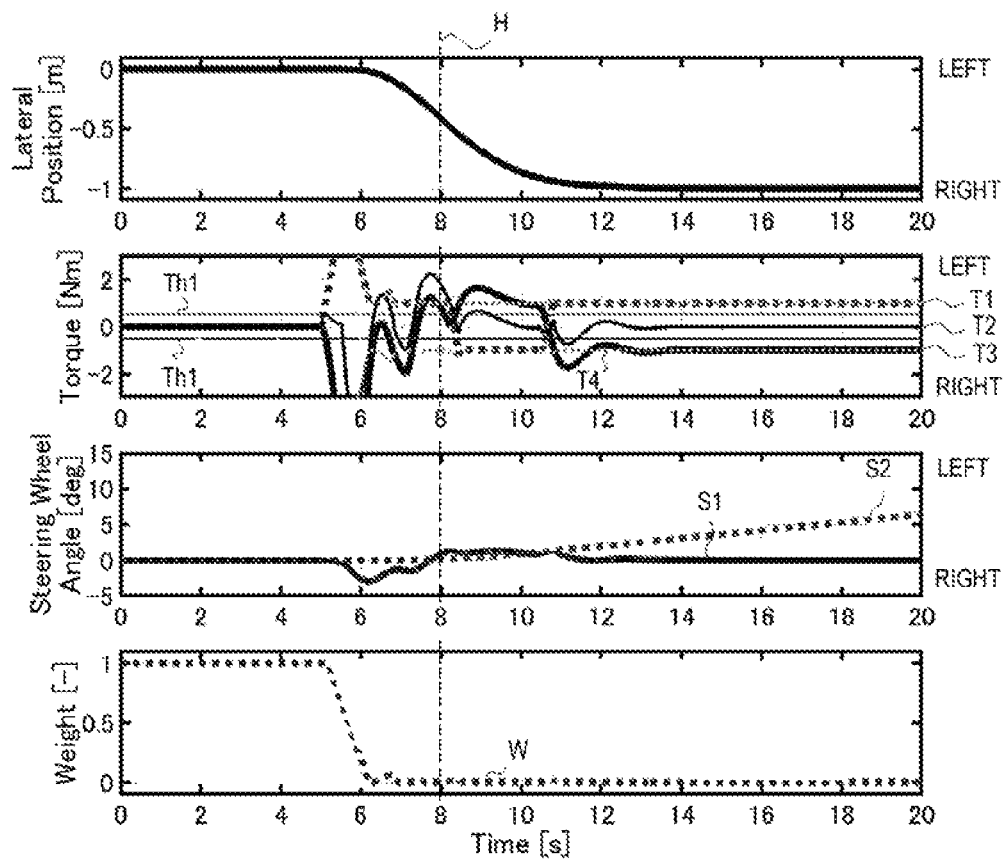
FIG. 24 is a schematic view which shows that, when the magnitude relationship between a steering wheel angle and a target steering wheel angle is reversed, the automatic driver torque changes suddenly.

FIG. 24 is a schematic view which shows that, when the magnitude relationship between a steering wheel angle and a real steering wheel angle is reversed in the scene of FIG. 7, the automatic driver torque changes suddenly. For confirmation, it is assumed that the predetermined first threshold θ w=0.5 Nm, the LKAS torque clip value $T_{Clip,\ LKAS}$=20 Nm, and the override torque clip value $T_{Clip,\ OVR}$=1.0 Nm.

It is worth noticing that, in the drawing showing the relationship of torques, the dashed line T1 shows an automatic driver torque, the solid line T2 shows an input torque, the solid line T3 shows a driver torque by a driver, the fine dashed line T4 shows an automatic driver torque clip value, and the symbol Th1 shows a first threshold θ w. Moreover, in the drawing showing steering wheel angles, the solid line S1 shows a steering wheel angle, and the dashed line S2 shows a target steering wheel angle. Moreover, in the drawing showing the weight, the dashed line W represents the change state of the weight.

In FIG. 24, the magnitude relationship between a steering wheel angle and a target steering wheel angle is reversed in the vicinity of 8 s (at Time H) of the time axis. The automatic driver torque is computed by the Equation 9. Since the proportionality gain is set as a large value, the automatic driver torque changes suddenly from the maximum value to the minimum value of the automatic driver torque clip value, immediately after the magnitude relationship between the steering wheel angle and the target steering wheel angle is reversed. In this way, when the automatic driver torque is clipped, the sudden change of the automatic driver torque cannot be prevented within the range of a clip.

Figure 25:
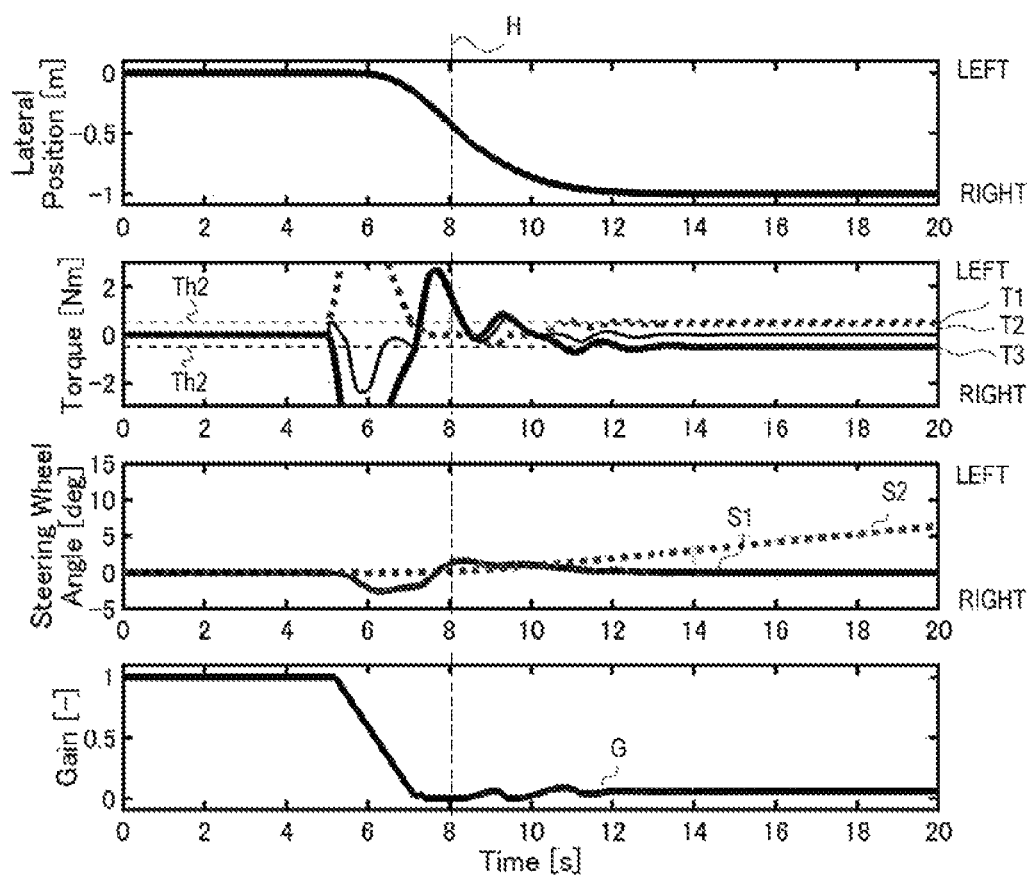
FIG. 25 is a schematic view which shows that, when the magnitude relationship between a steering wheel angle and a target steering wheel angle is reversed, the automatic driver torque does not change suddenly.

FIG. 25 is a schematic view which shows that, even though the magnitude relationship between the steering wheel angle and the real steering wheel angle is reversed, the automatic driver torque does not change suddenly in the Embodiment 5. For confirmation, it is assumed that the predetermined second threshold $\theta_K$=0.5 Nm. Moreover, it is assumed that the LKAS torque clip value $T_{Clip, LKAS}$=20 Nm is set for safety.

It is worth noticing that, in the drawing showing the relationship of torques, the dashed line T1 shows an automatic driver torque, the solid line T2 shows an input torque, the solid line T3 shows a driver torque by a driver, and the symbol Th2 shows a second threshold $\theta_K$. Moreover, in the drawing showing steering wheel angles, the solid line S1 shows a steering wheel angle, and the dashed line S2 shows a target steering wheel angle. Moreover, in the drawing showing the gain, the solid line G represents the change state of the gain.

In FIG. 25, the magnitude relationship between the steering wheel angle and the target steering wheel angle is reversed in the vicinity of 8 s (at Time H) of the time axis. However, since the gain is on the decrease, the time differentiation value of the automatic driver torque also decreases, and the automatic driver torque does not change suddenly. In this way, by decreasing the gain of the automatic driver torque, sudden change of the automatic driver torque can be prevented, at the time when the magnitude relationship between the steering wheel angle and the target steering wheel angle is reversed, and the stability of steering control improves.

In FIG. 25, when going straight ahead, the driver torque is converged to a fixed value. And, for the same reason as in the case of clip processing, when the product of the maximum value of the automatic driver torque and the minimum value of the gain is smaller than the minimum value of the second threshold $\theta_K$, the convergence value becomes a value which is equal to the second threshold $\theta_K$. In the below, explanation will be made about the reason. Since it is necessary to maintain the steering wheel at 0 deg, when the vehicle is during an offset driving on a straight road, the sum of the driver torque and the automatic driver torque is 0 Nm, when the support driver torque is 0 Nm. For that reason, when a driver torque is converged, the gain is also converged.

There are three kinds of patterns in which the gain converges. The first kind is a pattern in which the increment of gain is positive, and the gain converges to a maximum value, the second kind is a pattern in which the increment of gain is negative and the gain converges to a minimum value, and the third kind is a pattern in which the increment of gain is 0 and the gain converges to a suitable value. Since the gain must be on the decrease during an override, it is considered that the candidate is the second kind pattern or the third kind pattern. Since the increment of gain needs to be 0 in order to converge by the third kind pattern, the driver torque needs to be equal to the second threshold. Therefore, the convergence value of the driver torque becomes a value which is equal to the predetermined second threshold.

However, when the product of the automatic driver torque and the minimum value of the gain is larger than the minimum value of the second threshold $\theta_K$, the automatic driver torque converges to a value which is larger than the predetermined second threshold $\theta_K$. Since a driver torque which is larger than the second threshold $\theta_K$ is needed for the cancellation of this automatic driver torque, the increment of gain becomes negative and convergence is produced by the second kind pattern. That is, the gain is converged to a minimum value. In order to secure the convergence by the third kind pattern, the product of the maximum value of the automatic driver torque and the minimum value of the gain needs to be smaller than the second threshold $\theta_K$.

From the above, when the product of the maximum value of the automatic driver torque and the minimum value of the gain is smaller than the second threshold $\theta_K$, the convergence value of the driver torque during an offset driving becomes a value which is equal to the second threshold $\theta_K$, regardless of the curvature. In this way, according to the constitution of the Embodiment 5, the convergence value of the driver torque during an offset driving can be predicted. Thereby, the benefit obtained here is that it becomes easy to adjust the reaction force which a driver receives from the steering wheel.

In this way, according to the constitution of the Embodiment 5, by computing a gain through the increment of gain, even though the driver torque changes suddenly, the gain itself does not change suddenly, and the stability of the steering control can be improved. Moreover, when computing the automatic driver torque based on the deviation of a steering wheel angle and a target steering wheel angle, sudden change of the automatic driver torque can be prevented, at the time when the positive or negative of the deviation of a steering wheel angle is reversed, and the stability of the steering control improves. Moreover, the minimum value of a gain and the minimum value of the second threshold $\theta_K$ are designed so that the product of the maximum value of the automatic driver torque and the minimum value of the gain may become smaller than the minimum value of the second threshold $\theta_K$. Thereby, during an offset driving, the driver torque converges to the predetermined second threshold $\theta_K$, regardless of the curvature of a driving lane. Then, the benefit obtained here is that the reaction force which is applied to a driver can be made constant, regardless of the curvature.

Embodiment 6

In the Embodiment 5, the gain of the automatic driver torque is changed according to the driver torque. In addition, it is allowed to have a larger second threshold $\theta_K$, according to the magnitude of the degree of the first deviation. Since the driver torque during an offset driving converges to the second threshold $\theta_K$, a larger convergence value of the driver torque can be obtained, as the degree of the first deviation becomes larger. That is, the reaction force which is applied to a driver can be increased, and the risk of deviating from the lane during an override can be reduced.

In the below, explanation will be made about the Embodiment 6. Explanation which overlaps with the Embodiments 1-5 is omitted here.

Figure 26:
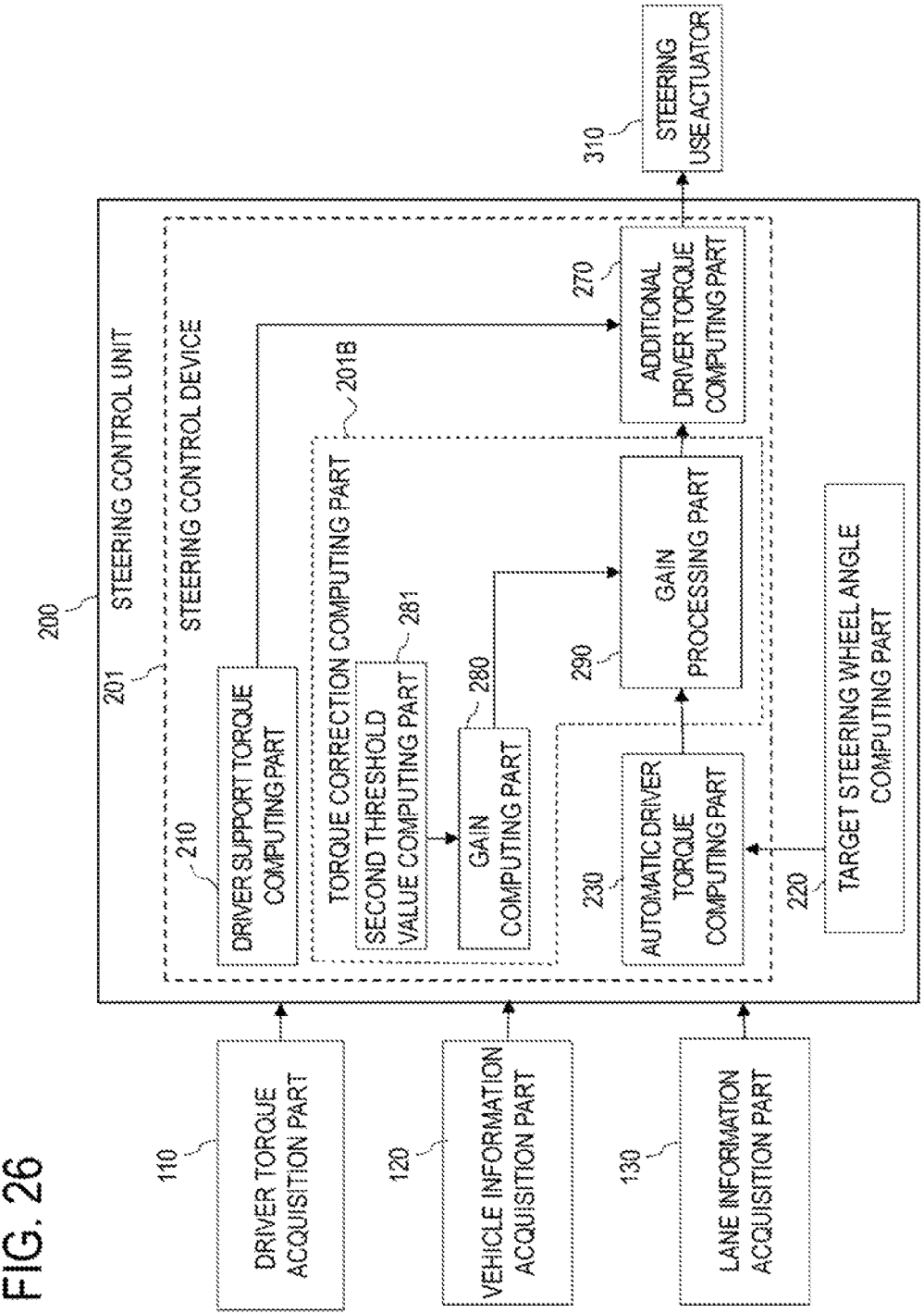
FIG. 26 is a block diagram which shows the constitution of the Embodiment 6.

FIG. 26 is a block diagram which shows the schematic constitution of the steering control system of the Embodiment 6. Explanation about portions which are common to FIG. 1 and FIG. 21 will be omitted.

The difference from FIG. 21 is that the torque correction computing part 201B is equipped with a second threshold computing part 281. The second threshold computing part 281 computes a second threshold $\theta_K$, based on the degree of a first deviation. Here, the degree of the first deviation is a lateral position at a host vehicle position, for example. Or, the degree of the first deviation is a lateral position at a look-ahead distance, a distance to the lane marking of a host vehicle driving lane at a host vehicle position, a distance to the lane marking of a host vehicle driving lane at a look-ahead distance, or a time until a host vehicle crosses the lane marking of a host vehicle driving lane. In addition, any variable which represents the degree of the deviation of a host vehicle may be used.

The gain computing part 280 computes the weight based on the second threshold $\theta_K$ which is computed in the second threshold computing part 281.

Figure 27:
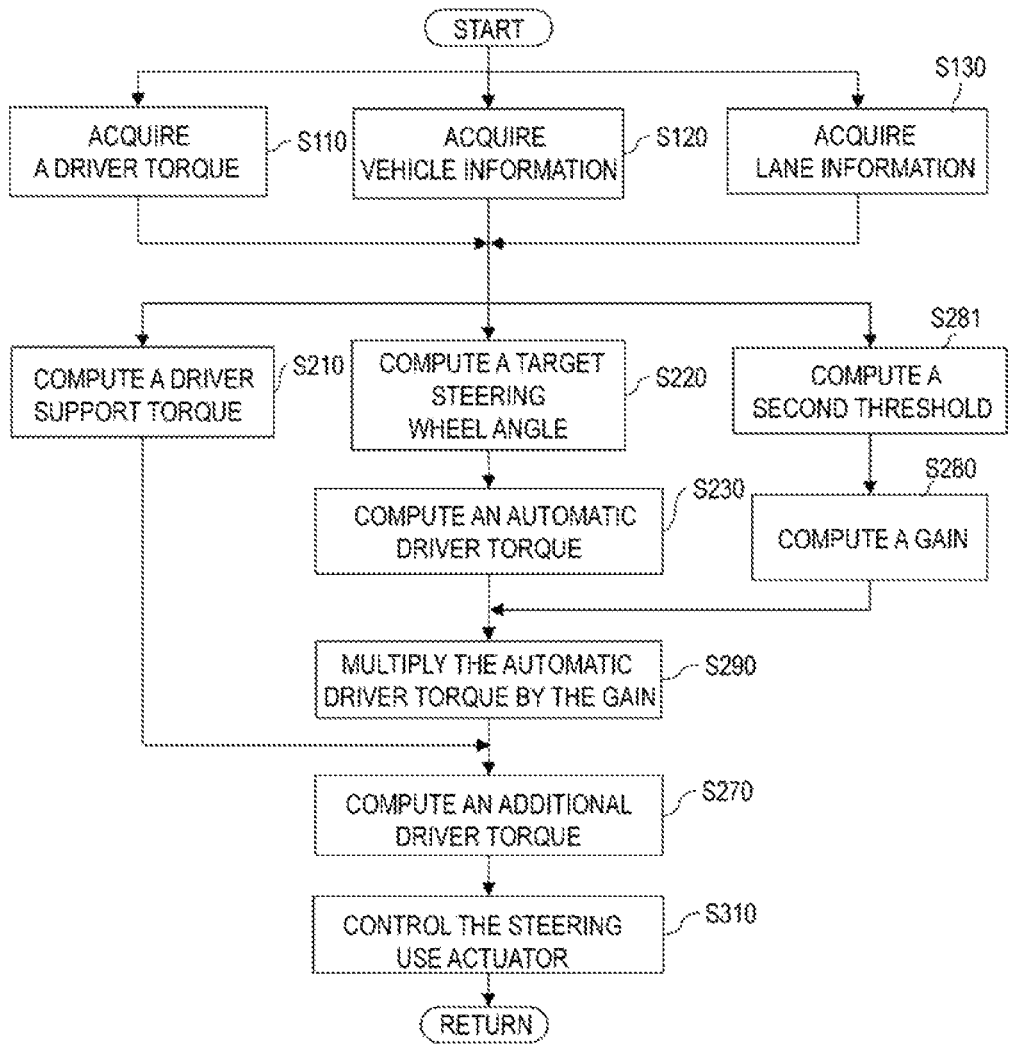
FIG. 27 is a flow chart which shows the operation of the Embodiment 6.

FIG. 27 is a flow chart which shows the procedure of a steering control device of the Embodiment 6. Explanation about portions which are common to FIG. 5 and FIG. 22 will be omitted.

In Step S281 of FIG. 27, a second threshold $\theta_K$ is computed in the second threshold computing part 281. Computation is conducted so that the second threshold $\theta_K$ may become larger, as the degree of the deviation becomes larger. For the computation of the second threshold $\theta_K$, a map may be used, or a suitable monotonically increasing function may be used.

Next, in Step S280 of FIG. 27, a gain K is computed in the gain computing part 280. The gain is computed in the same procedure as Step S280 of FIG. 22, except that the second threshold $\theta_K$, which is computed in the second threshold computing part 281, is used for the computation of the gain K.

Figure 28:
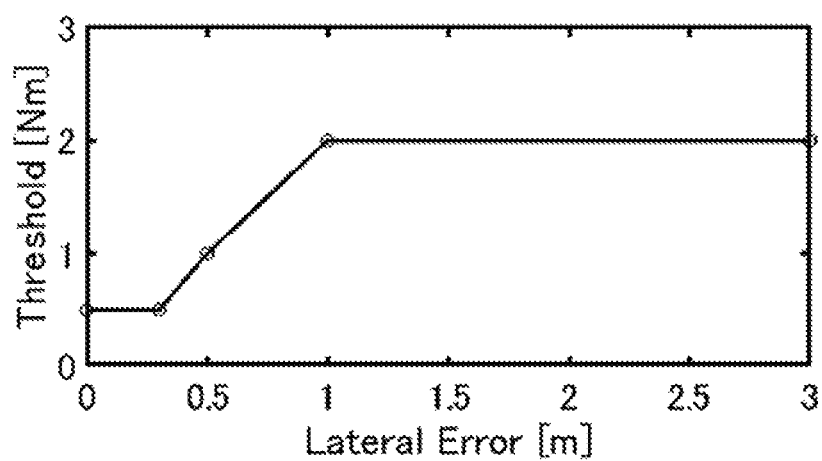
FIG. 28 is an explanatory diagram of a map for computing a first threshold from the degree of the first deviation, in the Embodiment 6.

FIG. 28 is a drawing which shows an example of the map $M_{\theta K}$ for computing the second threshold $\theta_K$ based on the degree of the first deviation in the second threshold computing part 281. Here, it is assumed that the absolute value of a lateral position $|e_0|$ at a host vehicle position is the degree of a first deviation. This map is designed so that the second threshold $\theta_K$ may monotonically increase, according the absolute value of a lateral position $|e_0|$. Since the driver torque during an offset driving converges to the second threshold, a larger convergence value of the driver torque can be obtained, as the degree of the first deviation becomes larger. That is, a large reaction force which is applied to a driver can be obtained and the benefit obtained here is that the risk of deviating from a lane during an override can be reduced.

It is worth noticing that, as explained in the Embodiment 5, in order to make the driver torque during an offset driving converge on the second threshold $\theta_K$, the product of the maximum value of the automatic driver torque and the minimum value of the gain needs to be smaller than the minimum value of the predetermined second threshold $\theta_K$. Therefore, it is necessary to design a Map $M_{\theta K}$ so that the second threshold $\theta_K$ may always become larger than the maximum value of the automatic driver torque and the minimum value of the gain.

Moreover, in the present Embodiment, the absolute value of a lateral position $|e_0|$ is used to the input of a map. However, it is allowed to use $|e_0|$ which is multiplied by a coefficient, where the coefficient becomes 1 at the outer side of a curve and −1 at the inner side of a curve. As a result, the convergence value of the driver torque can be changed at the outer side and inner side of a curve.

In this way, according to the constitution of the Embodiment 6, the second threshold $\theta_K$ changes according to the degree of the first deviation. Since the driver torque during an offset driving converges to the second threshold $\theta_K$, a larger convergence value of the driver torque can be obtained, as the degree of the first deviation becomes larger. That is, a large reaction force which is applied to a driver is obtained, and the risk of deviating from a lane during an override can be reduced.

Embodiment 7

In the Embodiment 1, the increment of weight is computed based on the driver torque, and the weight and the automatic driver torque clip value are changed. In the Embodiment 5, the increment of gain is computed based on the driver torque and the gain of the automatic driver torque is changed. However, it is allowed to combine the weight and the gain. By combining these, the convergence speed of the driver torque during an offset driving can be accelerated. For example, in the case where only one of the two, weight or gain, is used, and in the case where a LKAS torque clip value is very large (for example, 50 Nm or so), the automatic driver torque will change greatly, even when the weight or the gain changes slightly.

For that reason, the speed at which the driver torque converges during an offset driving to the first threshold $\theta$ w, or to the second threshold $\theta_K$ becomes slower. On the other hand, when the weight and the gain are combined, the convergence speed of the driver torque can be accelerated.

In the below, explanation will be made about the Embodiment 7. Explanation which overlaps with the Embodiments 1-6 is omitted here.

Figure 29:
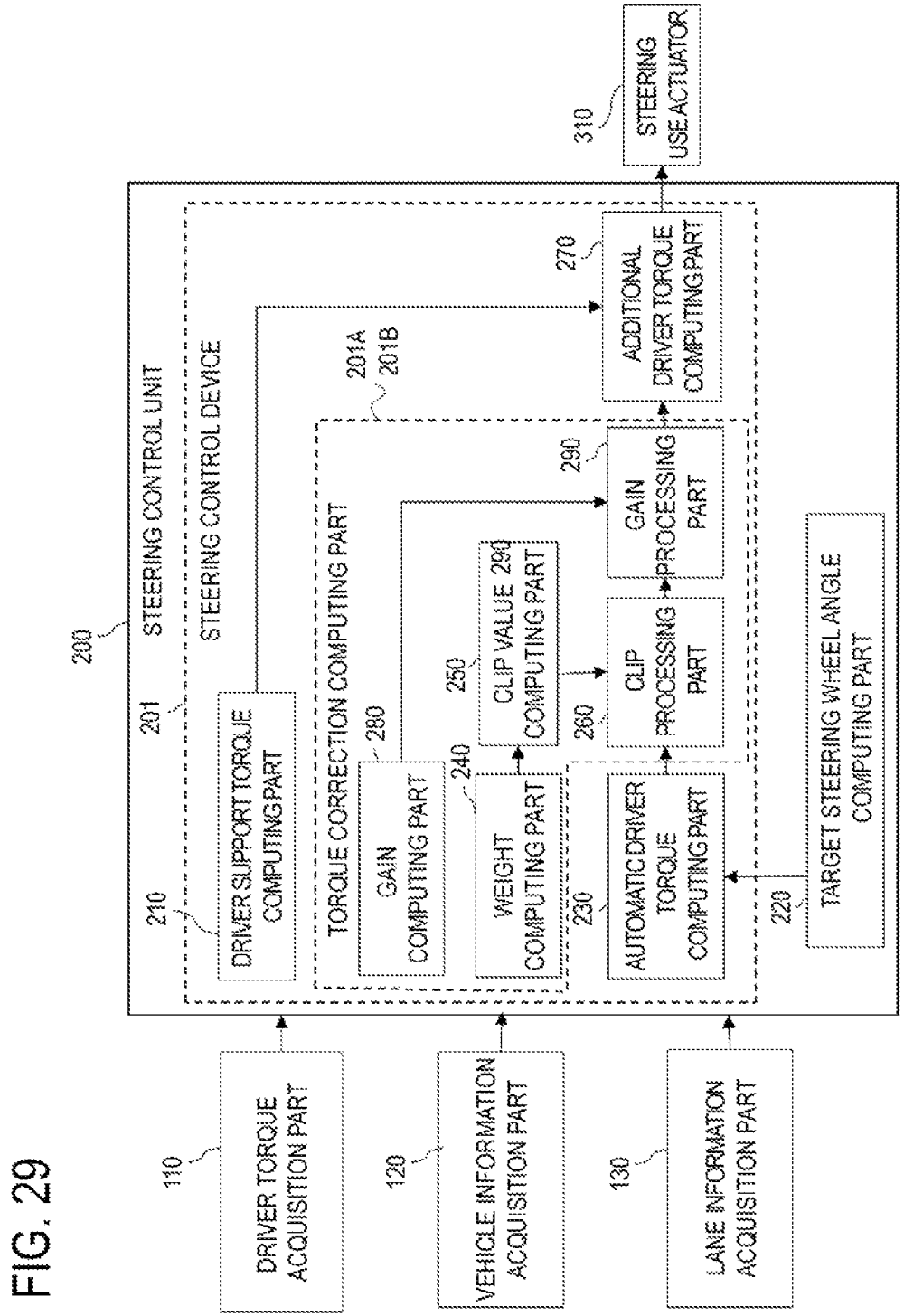
FIG. 29 is a block diagram which shows the constitution of Embodiment 7.

FIG. 29 is a block diagram showing the schematic constitution of a steering control system of the Embodiment 7. Explanation about portions which are common to FIG. 1 and FIG. 21 will be omitted. The difference from FIG. 1 and FIG. 21 is the constitution of the torque correction computing parts 201A and 201B. In this Embodiment 7, the steering control device is configured so that both the gain computation and the weight computation may be conducted.

The gain processing part 290 multiplies an automatic driver torque by a gain, where the automatic driver torque is clip processed in the clip processing part 260.

Figure 30:
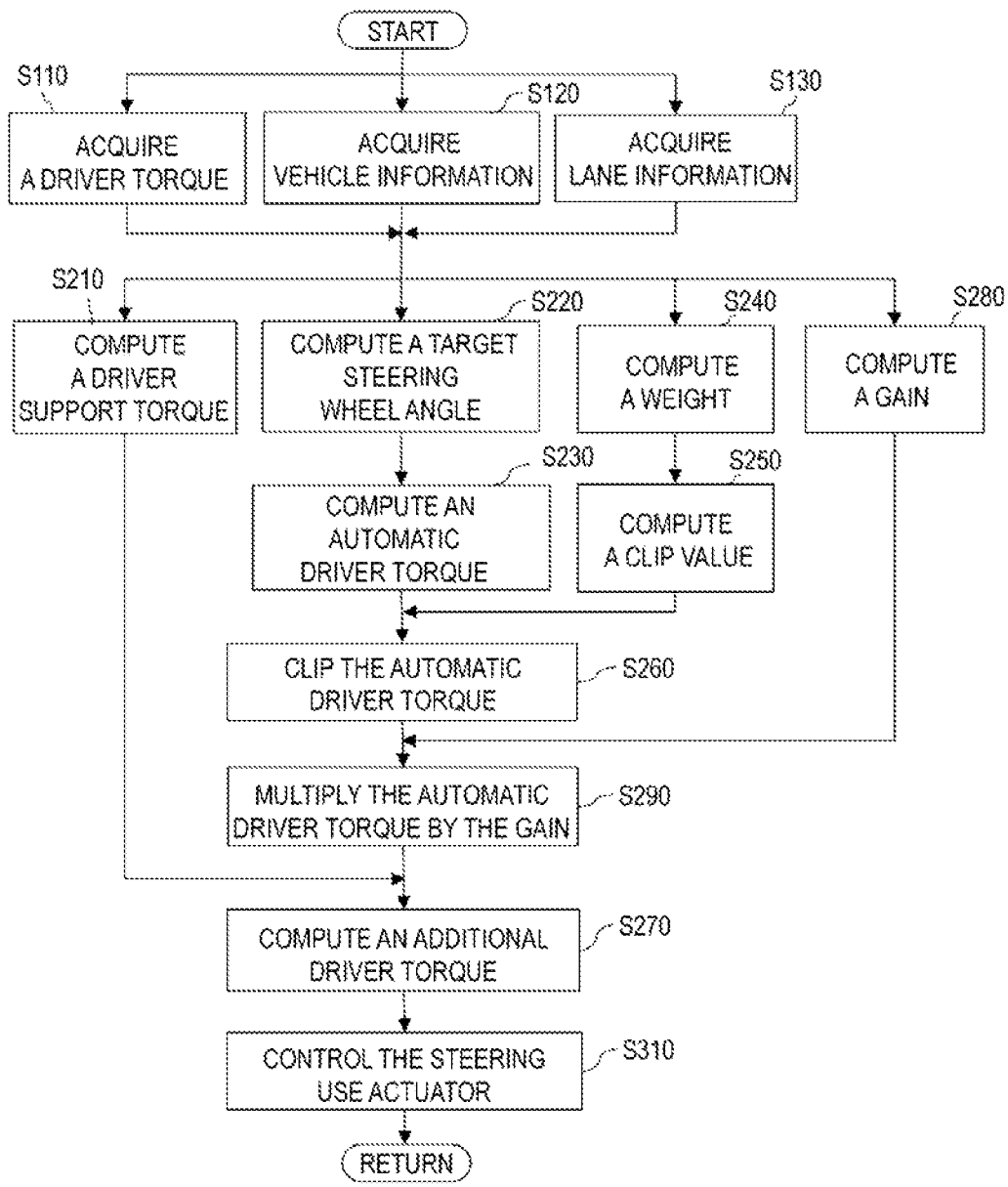
FIG. 30 is a flow chart which shows the operation of the Embodiment 7.

FIG. 30 is a flow chart which shows the procedure of the steering control device of the Embodiment 7. Explanation about portions which are common to FIG. 5 and FIG. 22 will be omitted.

In Step S290 of FIG. 30, a clip processed automatic driver torque is multiplied by a gain, in the gain processing part 290. In the gain processing part 290, the minimum value of the automatic driver torque clip value, the minimum value of the gain, the minimum value of the first threshold $\theta$ w, and the minimum value of the second threshold $\theta_K$ are set, so that the product of the minimum value of the automatic driver torque clip value and the minimum value of the gain may become smaller than the minimum value of the first threshold $\theta$ w and the minimum value of the second threshold OK.

Figure 31:
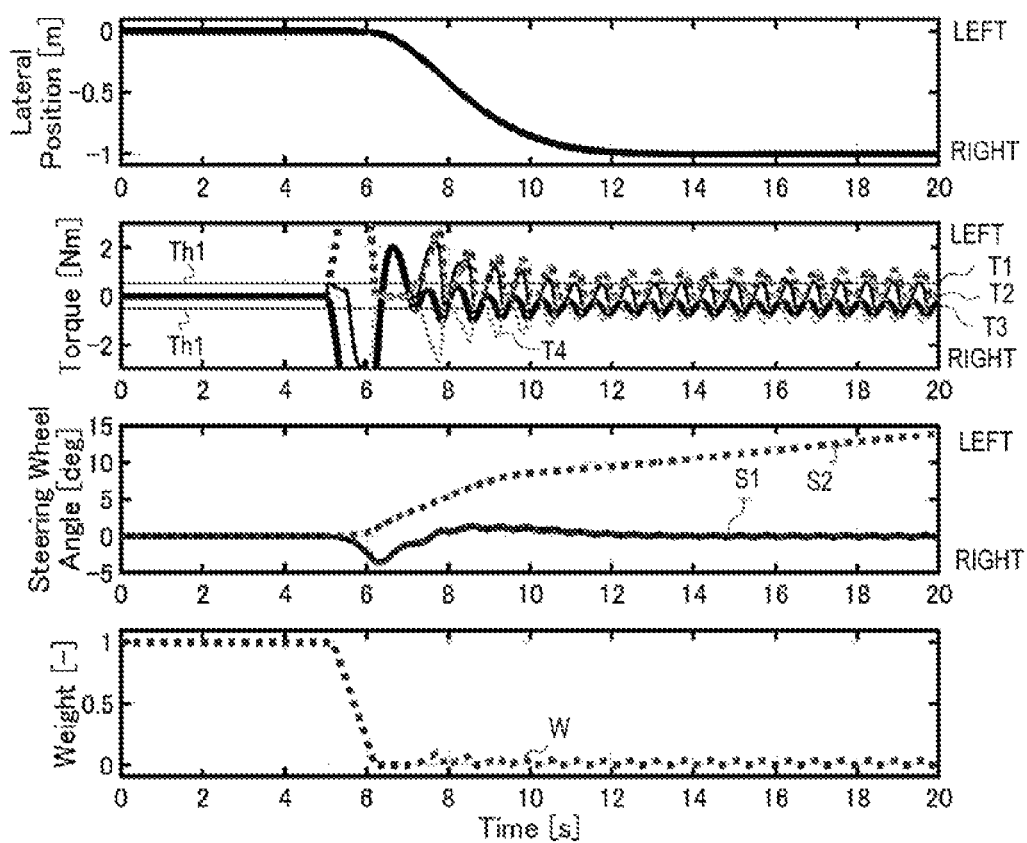
FIG. 31 is a schematic view which shows that, when a LKAS torque clip value is large, the convergence of the driver torque is slow.

FIG. 31 is a schematic view which shows that, when a LKAS torque clip value is very large (for example, 50 Nm or so) in the scene of FIG. 7, the convergence of the driver torque is slow. For confirmation, it is assumed that the first threshold $\theta$ w=0.5 Nm, the LKAS torque clip value $T_{Clip, LKAS}$=50 Nm, and the override torque clip value $T_{Clip, OVR}$=0.0 Nm.

It is worth noticing that, in the drawing showing the relationship of torques, the dashed line T1 shows an automatic driver torque, the solid line T2 shows an input torque, the solid line T3 shows a driver torque by a driver, the fine dashed line T4 shows an automatic driver torque clip value, and the symbol Th1 shows a first threshold $\theta$ w. Moreover, in the drawing showing steering wheel angles, the solid line S1 shows a steering wheel angle, and the dashed line S2 shows a target steering wheel angle. Moreover, in the drawing showing the weight, the dashed line W represents the change state of the weight.

In FIG. 31, as the dashed line W shows in the drawing for showing the relationship of the weight, the weight fluctuates slightly even after 10 s on the time axis. Even though the fluctuation of the weight is slight, the automatic driver torque clip value T4 fluctuates sharply. This is because the automatic driver torque clip value is computed by the weighted average of a LKAS torque clip value and an override torque clip value, as shown in the Equation 13. In this way, by the use of the weight only, it is likely that the convergency of the driver torque may deteriorate, when the LKAS torque clip value is large. This is also the same, when using the gain only.

Figure 32:
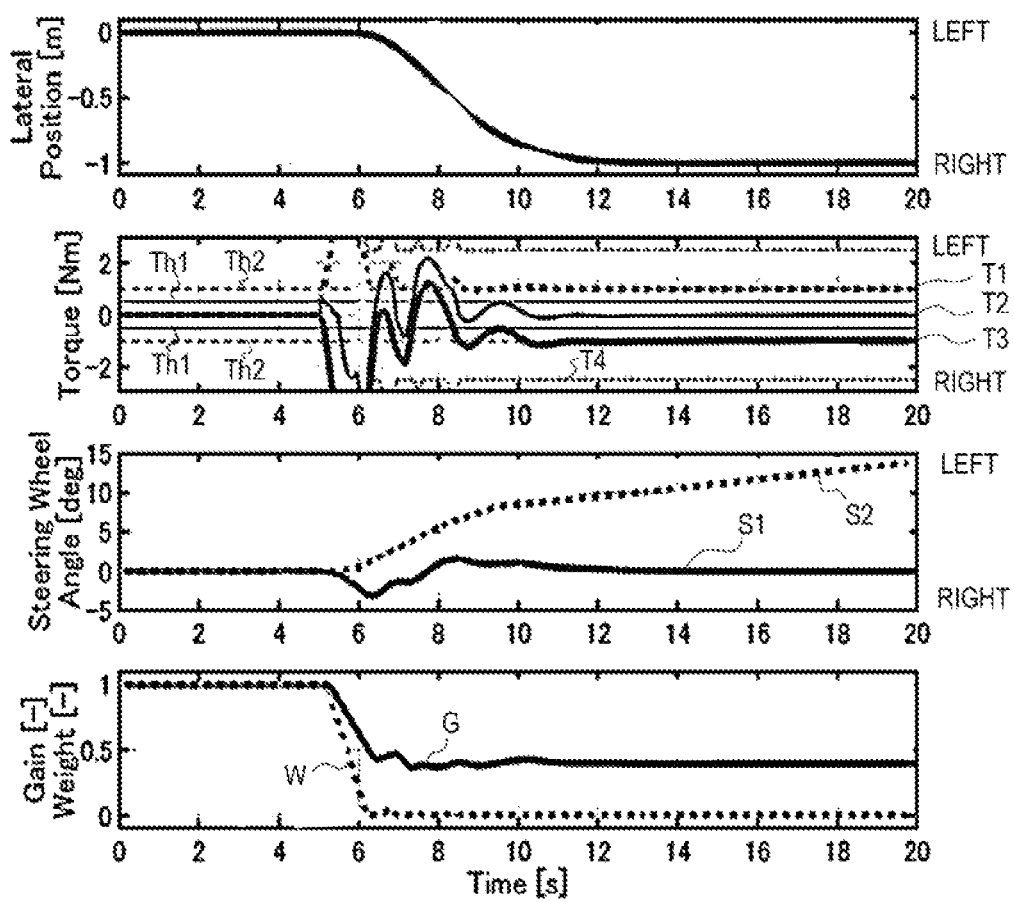
FIG. 32 is a schematic view which shows that, when a LKAS torque clip value is large, the convergence of the driver torque is fast.

FIG. 32 is a schematic view which shows that, even when the LKAS torque clip value is very large (for example, 50 Nm or so) in the scene of FIG. 7, the convergence of the driver torque is quick in the present Embodiment 7. For confirmation, it is assumed that the predetermined first threshold $\theta_w = 0.5$ Nm, the predetermined second threshold $\theta_K = 1.0$ Nm, the LKAS torque clip value $T_{Clip, LKAS} = 50$ Nm, and the override torque clip values $T_{Clip, OVR} = 2.5$ Nm.

It is worth noticing that, in the drawing showing the relationship of torques, the dashed line T1 shows an automatic driver torque, the solid line T2 shows an input torque, the solid line T3 shows a driver torque by a driver, and the fine dashed line T4 shows an automatic driver torque clip value. The symbol Th1 shows a first threshold $\theta_w$ and the symbol Th2 shows a second threshold $\theta_K$. Moreover, in the drawing showing steering wheel angles, the solid line S1 shows a steering wheel angle, and the dashed line S2 shows a target steering wheel angle. Moreover, in the drawing showing the gain and weight, the solid line G represents the change state of the gain, and the dashed line W represents the change state of the weight.

In FIG. 32, it can be seen that the weight is converged immediately to 0. By the convergence of the weight to 0, the automatic driver torque clip value is immediately converged to a minimum value. By the immediate convergence of the automatic driver torque clip value to a minimum value, even though the gain fluctuates somewhat, the automatic driver torque does not fluctuate sharply. As a result, the driver torque is quickly converged to a second threshold $\theta_K$. In this way, by combining the weight and the gain, the convergence speed of the driver torque can be accelerated, even when the LKAS torque clip value is very large.

It is worth noticing that, in FIG. 32, a condition is set to satisfy the formula: the override torque clip value $T_{Clip, OVR} \geq$ the second threshold $\theta_K \geq$ the first threshold $\theta_w$. However, by setting the condition which satisfies the formula: $T_{Clip, OVR} \times \min K \leq \min \theta_w$, and $T_{Clip, OVR} \times \min K \leq \min \theta_K$, the reaction force which is applied to a driver can be made constant during an offset driving, regardless of the curvature, like the Embodiments 3 and 5. Further, like the Embodiments 4 and 6, the first threshold $\theta_w$ and the second threshold $\theta_K$ are changed, according to the degree of the first deviation. As a result, the reaction force which is applied to a driver can be increased according to the degree of the first deviation. Then, the risk of deviating from a lane during an override can be reduced.

In this way, according to the constitution of the present Embodiment, the convergence speed of the driver torque during an offset driving can be accelerated by combining the weight and the gain.

Embodiment 8

In the Embodiment 1, the increment of weight is computed based on the driver torque. However, it is allowed further to change the increment of weight, according to the degree of a second deviation. As a result, for example, as the degree of the second deviation becomes larger, a larger increase rate of an automatic driver torque clip value can be obtained. Thereby, when a driver is releasing his hands from the steering wheel after an override, the risk of the deviation at the time of taking his hands off can be decreased. Or, as the degree of the second deviation is smaller, a smaller increase rate of an automatic driver torque clip value can be obtained. Thereby, when the risk of the deviation is low and a driver is releasing his hands from the steering wheel, sudden steering can be avoided, and riding quality can be improved.

In the below, explanation will be made about the Embodiment 8. Explanation which overlaps with the Embodiments 1-7 is omitted here.

In the Embodiment 8, the increment of weight is changed according to the degree of the second deviation. For example, when the driver torque is less than a predetermined third threshold $\theta_{Trq}$, the increment of weight is multiplied by an increment adjustment coefficient, whose value becomes larger, as the degree of the second deviation is larger. As a result, when a driver is releasing his hands from a steering wheel after an override, the increase rate of an automatic driver torque clip value increases, and the risk of the deviation can be decreased. Here, the degree of the second deviation is a lateral position at a look-ahead distance, for example. Or, the degree of the second deviation is a lateral position at a host vehicle position, a distance to the lane marking of a host vehicle driving lane at a host vehicle position, a distance to the lane marking of a host vehicle driving lane at a look-ahead distance, a speed (a deviation speed) of a host vehicle in a direction perpendicular to the direction of a host vehicle driving lane, a value which is the product of a deviation speed and a predetermined time, and a time until a host vehicle crosses the lane marking of a host vehicle driving lane. In addition, any variable which represents the degree of the deviation of a host vehicle may be used. Moreover, it is allowed to use the maximum value of the two or more variables, or the minimum value. By using a maximum value, the increment adjustment coefficient becomes likely to increase, and thereby, the risk of the deviation can be reduced further. By using a minimum value, the increment adjustment coefficient becomes unlikely to increase on an unnecessary scene, and thereby, sudden steering can be avoided and riding quality can be improved.

Figure 33:
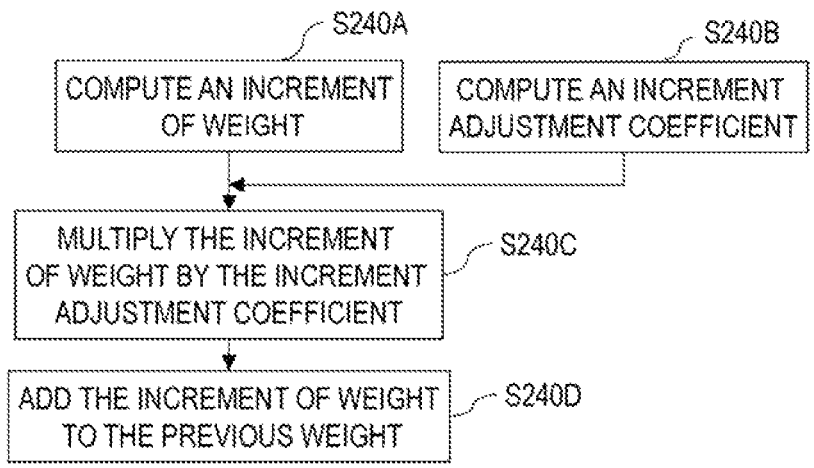
FIG. 33 is a flow chart which shows the processing of a weight computing part in Embodiment 8.

FIG. 33 is a flow chart which shows the procedure of computing the weight in Step S240 of FIG. 5. As shown in FIG. 33, in Step S240A, the increment of weight Δw is computed by the Equation 11. Moreover, an increment adjustment coefficient $C_{Adj}$ is computed in Step S240B. The purpose of computing the increment adjustment coefficient $C_{Adj}$ is to increase the increase rate of the weight and to reduce the risk of the deviation. For that reason, computation is conducted so that only the increase rate of the weight may be increased. For example, as shown in the Equation 21, the increment adjustment coefficient $C_{Adj}$ is computed according to the magnitude relationship between a driver torque $T_{Driver}$ by a driver, and a predetermined third threshold $\theta_{Trq}$.

[Equation 21]

Eq. 21

$$C_{Adj} = \begin{cases} M_C(|e_{Ld}|) & (|T_{Driver}| < \Theta_{Trq}) \\ 1 & (|T_{Driver}| \geq \Theta_{Trq}) \end{cases} \quad (21)$$

Here, the symbol $M_C$ is a map which computes the increment adjustment coefficient $C_{Adj}$ according to the degree of the second deviation, and the symbol $e_{Ld}$ is a lateral position at a look-ahead distance. Moreover, the third threshold $\theta_{Trq}$ is, for example, set to the same value as the predetermined first threshold θ w, or the worst value of the offset of a torque sensor, or the like.

In Step S240C of FIG. 33, the product of an increment of weight Δw multiplied by the increment adjustment coefficient $C_{Adj}$ is defined as a new increment of weight Δw. And, in Step S240D, the previous weight is accumulated by the increment of weight Δw, like the Equation 11 and the Equation 12.

By computing the weight in this way, only the increase rate of the weight can be adjusted, according to the degree of the second deviation.

Figure 34:
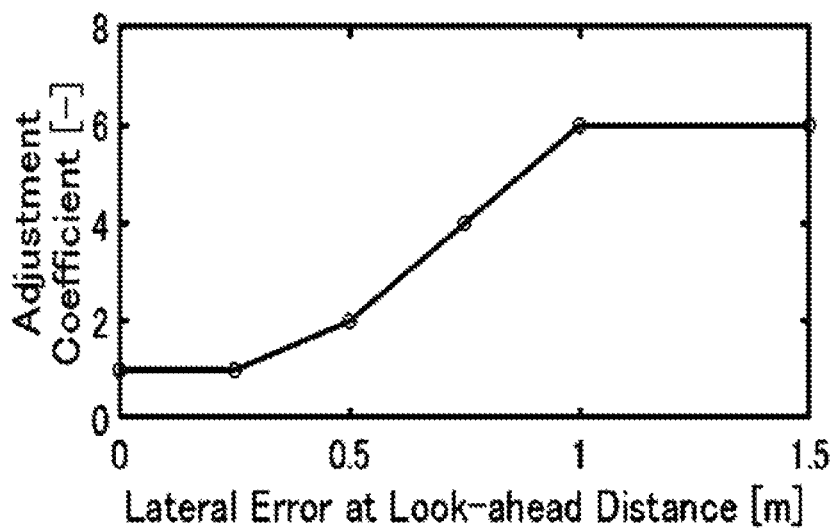
FIG. 34 is an explanatory diagram of a map for computing an increment adjustment coefficient from the degree of a second deviation in the Embodiment 8.

FIG. 34 is a drawing which shows an example of the map $M_C$ for computing the increment adjustment coefficient $C_{Adj}$ in Step S240B. The map is designed so that, as the degree of the second deviation (here, the lateral position at a look-ahead distance) is larger, the increment adjustment coefficient $C_{Adj}$ may become larger.

In this way, according to the constitution of the present Embodiment 8, as the degree of the second deviation becomes larger, a larger increase rate of the weight can be obtained. Thereby, when a driver is releasing his hands from a steering wheel after an override, the risk of the deviation at the time of taking his hands off can be reduced. Or, as the degree of the second deviation is smaller, a smaller increase rate of an automatic driver torque clip value can be obtained. Thereby, when a driver is releasing his hands from a steering wheel at the time of low deviation risk, sudden steering can be avoided, and riding quality can be improved.

It is worth noticing that, in the Embodiment 8, an increment of weight is changed by multiplying the increment of weight and the increment adjustment coefficient together, which is computed from the degree of the second deviation. However, it is allowed to compute the increment of weight by the map of two variables, that is, the driver torque and the degree of the second deviation. In addition, as long as based on the driver torque and the degree of the second deviation, any computation method may be used.

Moreover, it is allowed similarly to change also the increment of gain, according to the degree of the second deviation. As a result, the same effect as when the increment of weight Δw is changed according to the degree of the second deviation can be obtained.

Embodiment 9

In the Embodiment 1, the increment of weight is computed based on the driver torque. In addition, when the directions of the automatic driver torque and the driver torque are the same, the increment of weight will be computed so that the automatic driver torque clip value may increase. According to the present Embodiment 9, the convergence point of the driver torque can be determined uniquely, during an offset driving at a curve, and the reaction force which is applied to a driver can be unique.

In the below, explanation will be made about the Embodiment 9. Explanation which overlaps with the Embodiments 1-8 is omitted here.

In the Embodiment 3, the minimum value of the automatic driver torque clip value and the minimum value of the first threshold θ w are designed so that the minimum value of the automatic driver torque clip value may become smaller than the minimum value of the first threshold θ w, which is determined beforehand. It is explained that, by doing this way, the driver torque is converged to the first threshold θ w. However, there is an exception. When the driver torque, not the automatic driver torque, provides a self aligning torque, and in addition, when the driver torque is over the first threshold θ w, there arises a case where the driver torque does not converge to the first threshold θ w.

Figure 35:
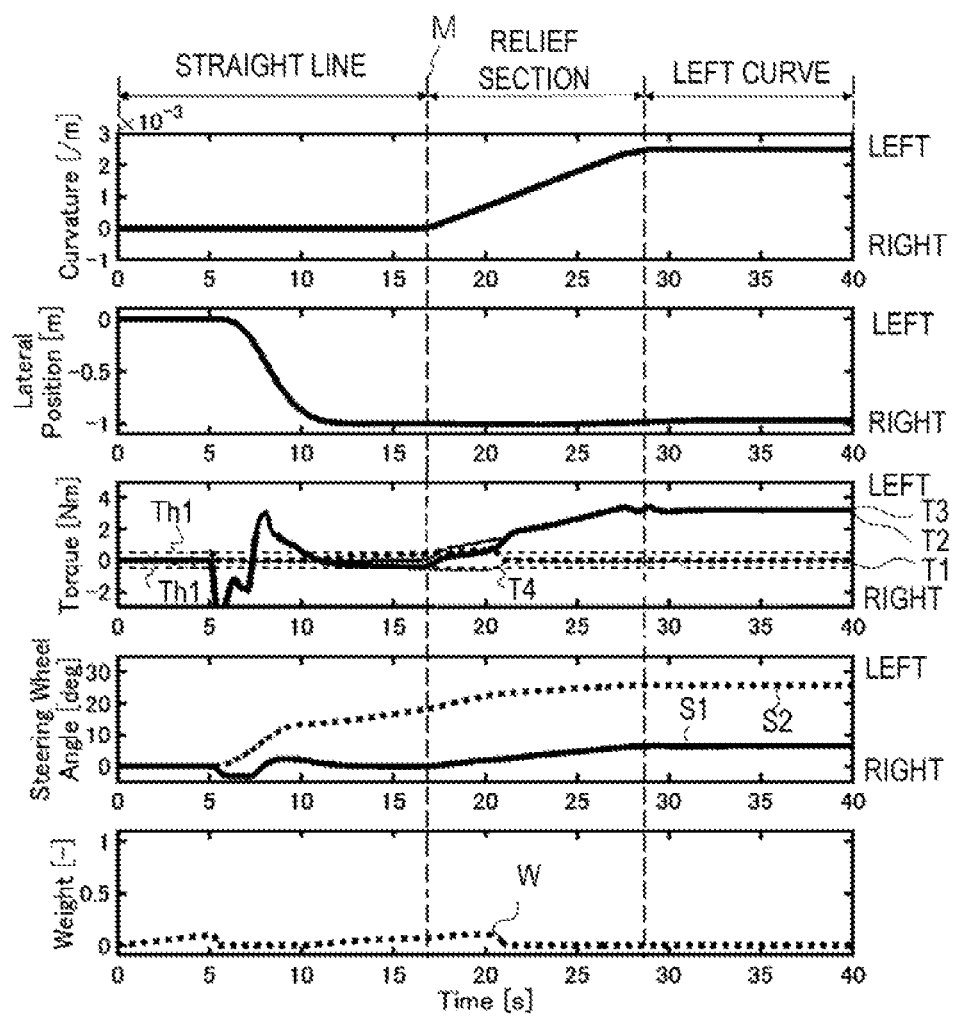
FIG. 35 is an explanatory diagram which shows that the driver torque does not converge to a predetermined first threshold in the Embodiment 9.

FIG. 35 is a schematic view which shows that, in the scene of FIG. 12, when the driver torque provides a self aligning torque, and in addition, when the driver torque is over the first threshold θ w, the driver torque does not converge to the first threshold θ w. For confirmation, it is assumed that the first threshold θ w=0.5 Nm, the LKAS torque clip value $T_{Clip, LKAS}$=20 Nm, and the override torque clip value $T_{Clip, OVR}$=0.0 Nm.

It is worth noticing that, in the drawing showing the relationship of torques, the dashed line T1 shows an automatic driver torque, the solid line T2 shows an input torque, the solid line T3 shows a driver torque by a driver, the fine dashed line T4 shows an automatic driver torque clip value, and the symbol Th1 shows a first threshold θ w. Moreover, in the drawing showing steering wheel angles, the solid line S1 shows a steering wheel angle, and the dashed line S2 shows a target steering wheel angle. Moreover, in the drawing showing the weight, the dashed line W represents the change state of the weight.

In the vicinity of 16 s (at Time M) of the time axis of FIG. 35, a vehicle enters a relief section, and since the self aligning torque is on the increase, it is necessary to increase an input torque.

However, the increase rate of the weight is small and the self aligning torque cannot be provided by the automatic driver torque alone, and thereby, the driver torque is also on the increase. After that, the driver torque is over the predetermined first threshold θ w, and thereby, the weight is on the decrease and the automatic driver torque clip value is also on the decrease. From here on, the driver torque does not fall below the predetermined first threshold θ w. Thereby, the weight is not increased and the automatic driver torque clip value cannot be increased, either. As a result, the driver torque cannot be converged to the predetermined first threshold θ w.

Figure 36:
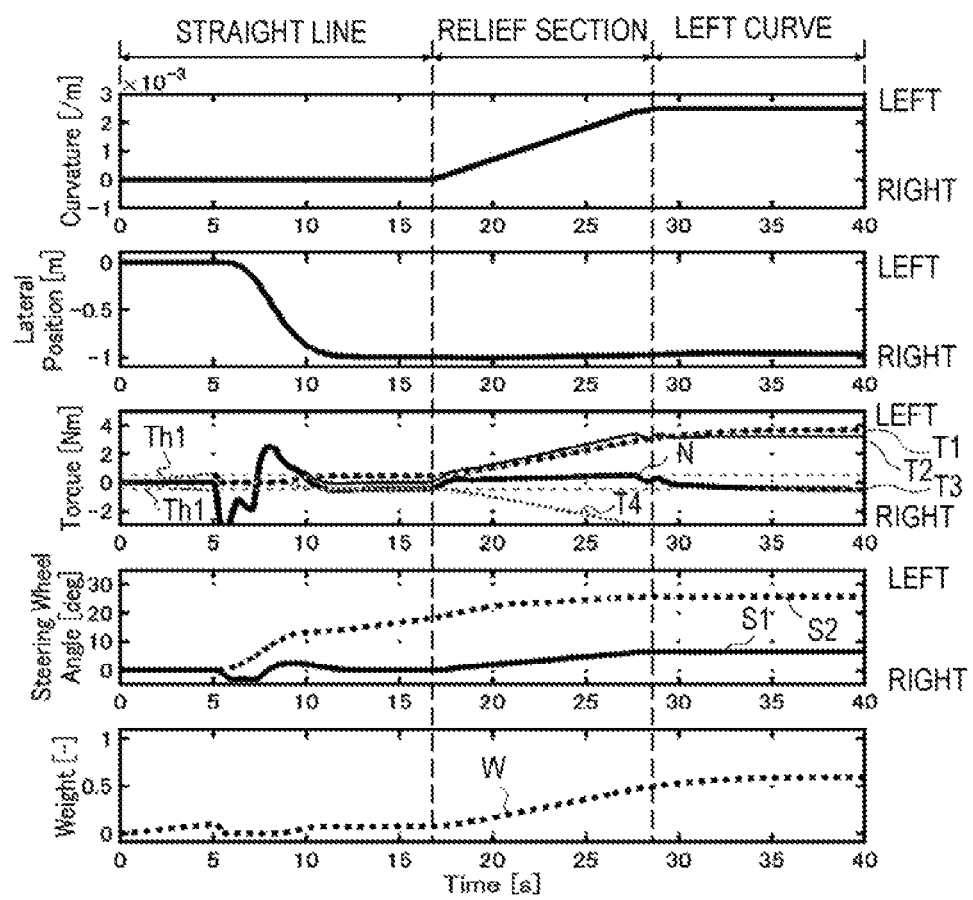
FIG. 36 is an explanatory diagram which shows that the driver torque converges to a predetermined first threshold in the Embodiment 9.

FIG. 36 is a schematic view which shows that, in the same scene settings as in FIG. 35, when the directions of the automatic driver torque and the driver torque are the same, and if the processing for increasing the weight at a constant rate (at a rate of 0.05 per second) is added in a weight computing part, the driver torque converges to the predetermined first threshold θ w. For confirmation, it is assumed that, like in FIG. 35, the predetermined first threshold θ w=0.5 Nm, the LKAS torque clip value $T_{Clip, LKAS}$=20 Nm, and the override torque clip value $T_{Clip, OVR}$=0.0 Nm.

It is worth noticing that, in the drawing showing the relationship of torques, the dashed line T1 shows an automatic driver torque, the solid line T2 shows an input torque, the solid line T3 shows a driver torque by a driver, the fine dashed line T4 shows an automatic driver torque clip value, and the symbol Th1 shows a first threshold θ w. Moreover, in the drawing showing steering wheel angles, the solid line S1 shows a steering wheel angle, and the dashed line S2 shows a target steering wheel angle. Moreover, in the drawing showing the weight, the dashed line W represents the change state of the weight.

Although the driver torque is over the redetermined first threshold θ w at around 27 s (at Time N) of the time axis of FIG. 36, since the directions of the automatic driver torque and the driver torque are the same, the weight is on the increase at a constant rate. And, finally, the driver torque is converged to the predetermined first threshold θ w.

In this way, when the directions of the automatic driver torque and the driver torque are the same, the weight is computed so that the automatic driver torque clip value may increase. Thereby, during an offset driving at a curve, the driver torque can be without fail converged to the predetermined first threshold θ w.

It is worth noticing that, when the directions of the automatic driver torque and the driver torque are the same, the method of computing the increment of weight so that the automatic driver torque clip value may increase, may change the weight at a constant rate, or may change the change rate according to the degree of the deviation. Moreover, explanation is made about a case where the directions of the automatic driver torque and the driver torque are the same. However, it is also allowed to employ a case where the direction of a driver torque is the same as the direction of a difference (a steering wheel angle deviation) between a target steering wheel angle and a real steering wheel angle.

Embodiment 10.

In the Embodiment 9, when the directions of the automatic driver torque and the driver torque are the same, the increment of weight is computed so that the automatic driver torque clip value may be increased. However, it is allowed to perform the same processing, also in the case of a gain. According to this Embodiment 10, the convergence point of the driver torque can be determined uniquely, during an offset driving at a curve, and the reaction force which is applied to a driver can be unique.

In the below, explanation will be made about the Embodiment 10. Explanation which overlaps with the Embodiments 1-8 is omitted here.

In the Embodiment 7, it is explained that, when the minimum value of the gain and the minimum value of the predetermined second threshold $θ_K$ are designed, so that the product of the maximum value of the automatic driver torque and the minimum value of the gain may become smaller than the minimum value of the predetermined second threshold $θ_K$, the driver torque is converged to the predetermined second threshold $θ_K$. However, there is an exception, like in the Embodiment 9. When the driver torque, not the automatic driver torque, provides a self aligning torque, and in addition, when the driver torque is over the predetermined second threshold $θ_K$, the driver torque is not converged to the predetermined second threshold $θ_K$.

Figure 37:
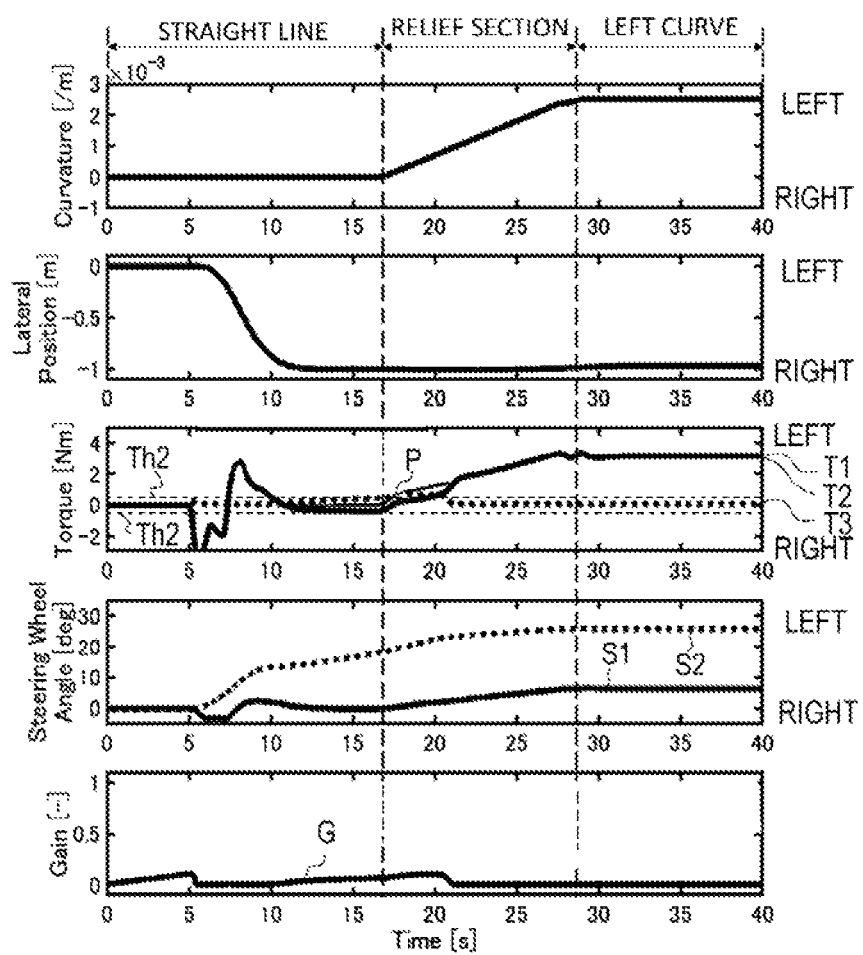
FIG. 37 is an explanatory diagram which shows that the driver torque does not converge to a predetermined second threshold in the Embodiment 7.

FIG. 37 is a schematic view which shows that, in the scene of FIG. 12, when the driver torque provides a self aligning torque, and in addition, when the driver torque is over the predetermined second threshold, the driver torque is not converged to the predetermined second threshold $θ_K$. For confirmation, it is assumed that the predetermined second threshold $θ_K$=0.5 Nm. Moreover, it is assumed that the LKAS torque clip value $T_{Clip, LKAS}$=20 Nm is set for safety.

It is worth noticing that, in the drawing showing the relationship of torques, the dashed line T1 shows an automatic driver torque, the solid line T2 shows an input torque, the solid line T3 shows a driver torque by a driver, and the symbol Th2 shows a second threshold $θ_K$. Moreover, in the drawing showing steering wheel angles, the solid line S1 shows a steering wheel angle, and the dashed line S2 shows a target steering wheel angle. Moreover, in the drawing showing the gain, the solid line G represents the change state of the gain.

At around 16 s (at Time P) of FIG. 37, a vehicle enters a relief section, and since the self aligning torque is on the increase, it is necessary to increase an input torque. However, the increase rate of the gain is small and the self aligning torque cannot be provided by the automatic driver torque alone, and thereby, the driver torque is also on the increase. After that, the driver torque is over the predetermined second threshold $θ_K$, and thereby, the gain is on the decrease and the automatic driver torque is on the decrease. From here on, since the driver torque does not fall below the predetermined second threshold $θ_K$, the gain is not increased and the automatic driver torque cannot be increased, either. As a result, the driver torque cannot be converged to the second threshold $θ_K$.

Figure 38:
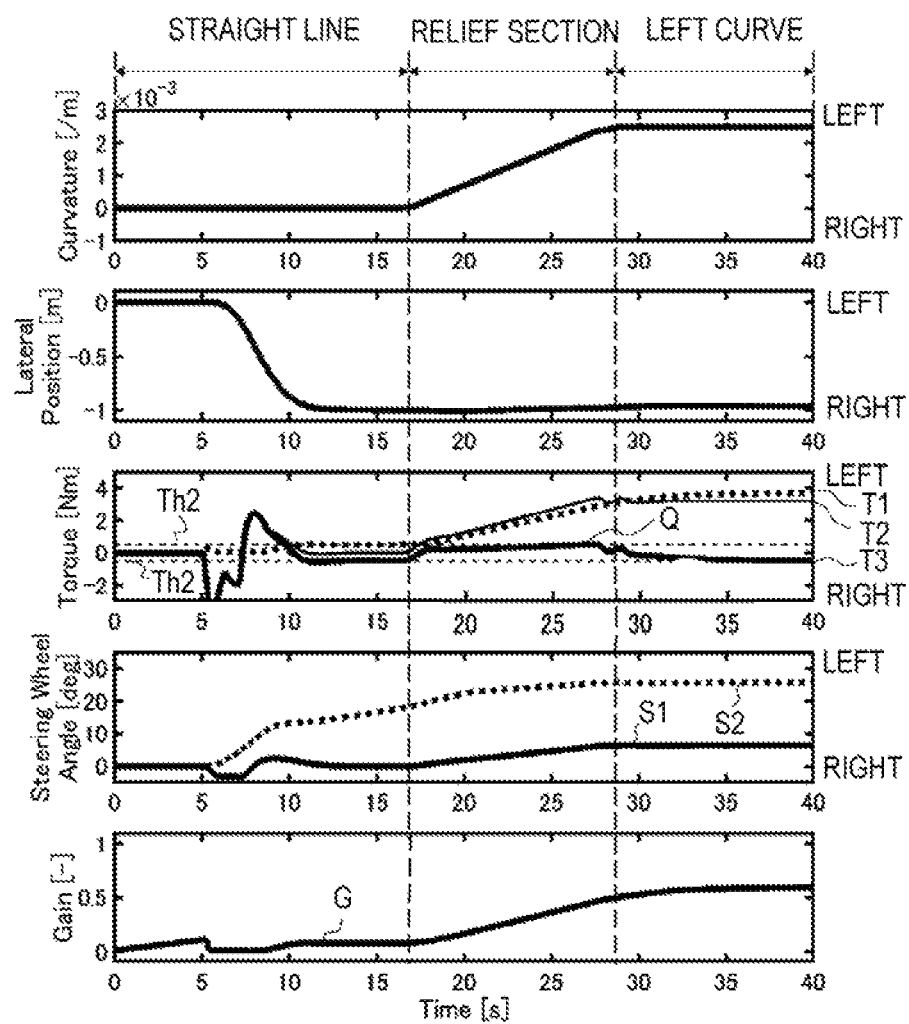
FIG. 38 is an explanatory diagram which shows that the driver torque converges to a predetermined second threshold in the Embodiment 10.

FIG. 38 is a schematic view which shows that, in the same scene settings as FIG. 37, when the directions of the automatic driver torque and the driver torque are the same, and if the processing for increasing a gain at a constant rate (at a rate of 0.05 per second) is added in a gain computing part, the driver torque is converged to the predetermined second threshold $θ_K$. For confirmation, like in FIG. 37, it is assumed that the predetermined second threshold $θ_K$=0.5 Nm. Moreover, it is assumed that the LKAS torque clip value $T_{Clip, LKAS}$=20 Nm is set for safety.

It is worth noticing that, in the drawing showing the relationship of torques, the dashed line T1 shows an automatic driver torque, the solid line T2 shows an input torque, the solid line T3 shows a driver torque by a driver, and Th2 shows a second threshold $θ_K$. Moreover, in the drawing showing steering wheel angles, the solid line S1 shows a steering wheel angle, and the dashed line S2 shows a target steering wheel angle. Moreover, in the drawing showing the gain, the solid line G represents the change state of the gain.

Although the driver torque is over the predetermined second threshold $θ_K$ at around 27 s (at Time Q) of FIG. 38, since the directions of the automatic driver torque and the driver torque are the same, the gain is on the increase at a constant rate. And, finally, the driver torque is converged to the predetermined second threshold $θ_K$.

In this way, when the directions of the automatic driver torque and the driver torque are the same, a gain is computed so that the gain may increase. Thereby, during an offset driving at a curve, the driver torque can be, without fail, converged to the predetermined second threshold $θ_K$.

It is worth noticing that, when the directions of the automatic driver torque and the driver torque are the same, the method of computing the increment of gain so that the gain may increase, may increase a gain at a constant rate, or may change the increase rate according to the degree of the deviation.

Embodiment 11

As another modification, the steering control device may be further provided with a curvature compensation torque computing part, which computes a curvature compensation torque, based on the curvature of the driving lane of a host vehicle, and the speed of the host vehicle, where the curvature compensation torque is required in order to make a steady circular turn at the speed mentioned above and at the curvature mentioned above. In addition, the steering control device may compute an additional driver torque, based on the driver support torque, the automatic driver torque, and the curvature compensation torque. As a result, when the curvature of a driving lane is constant, the reaction force which is applied to a driver can be made constant, regardless of the curvature.

In the below, explanation will be made about the Embodiment 11. Explanation which overlaps with the Embodiments 1-10 is omitted here.

Figure 39:
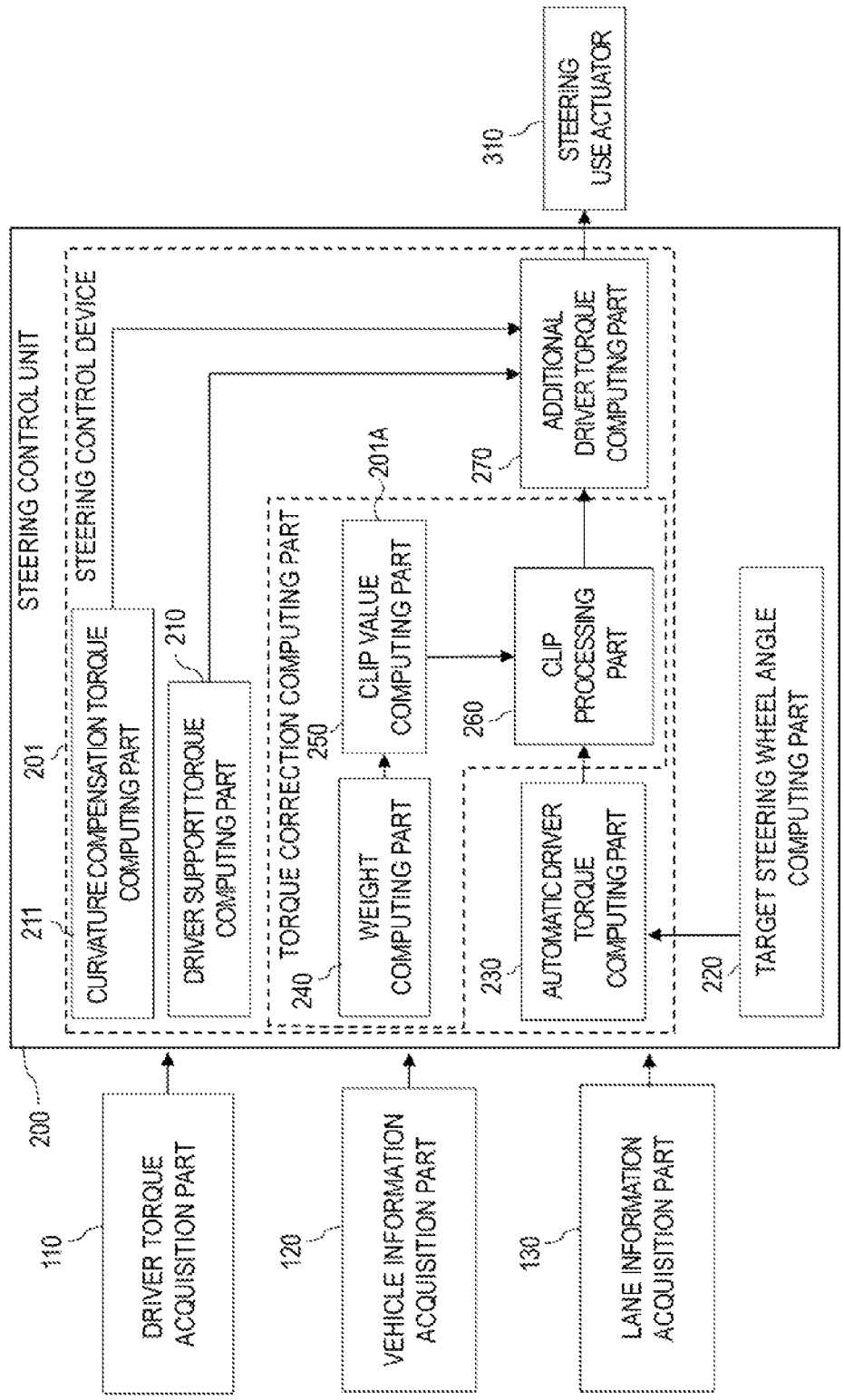
FIG. 39 is a block diagram which shows the constitution of the Embodiment 11.

FIG. 39 is a block diagram which shows the schematic constitution of the steering control system of the Embodiment 11. Explanation about portions which are common to FIG. 1 will be omitted.

In this Embodiment 10, a curvature compensation torque computing part 211 is provided. This curvature compensation torque computing part 211 computes a curvature compensation torque which is required in order to make a steady circular turn at the speed of a host vehicle and at the curvature of the driving lane of the host vehicle, based on the curvature of the driving lane of a host vehicle, and the speed of the host vehicle.

The additional driver torque computing part 270 computes an additional driver torque, based on the driver support torque, the automatic driver torque, and the curvature compensation torque. And, the steering control device controls so that the steering use actuator 310 may generate the additional driver torque.

Figure 40:
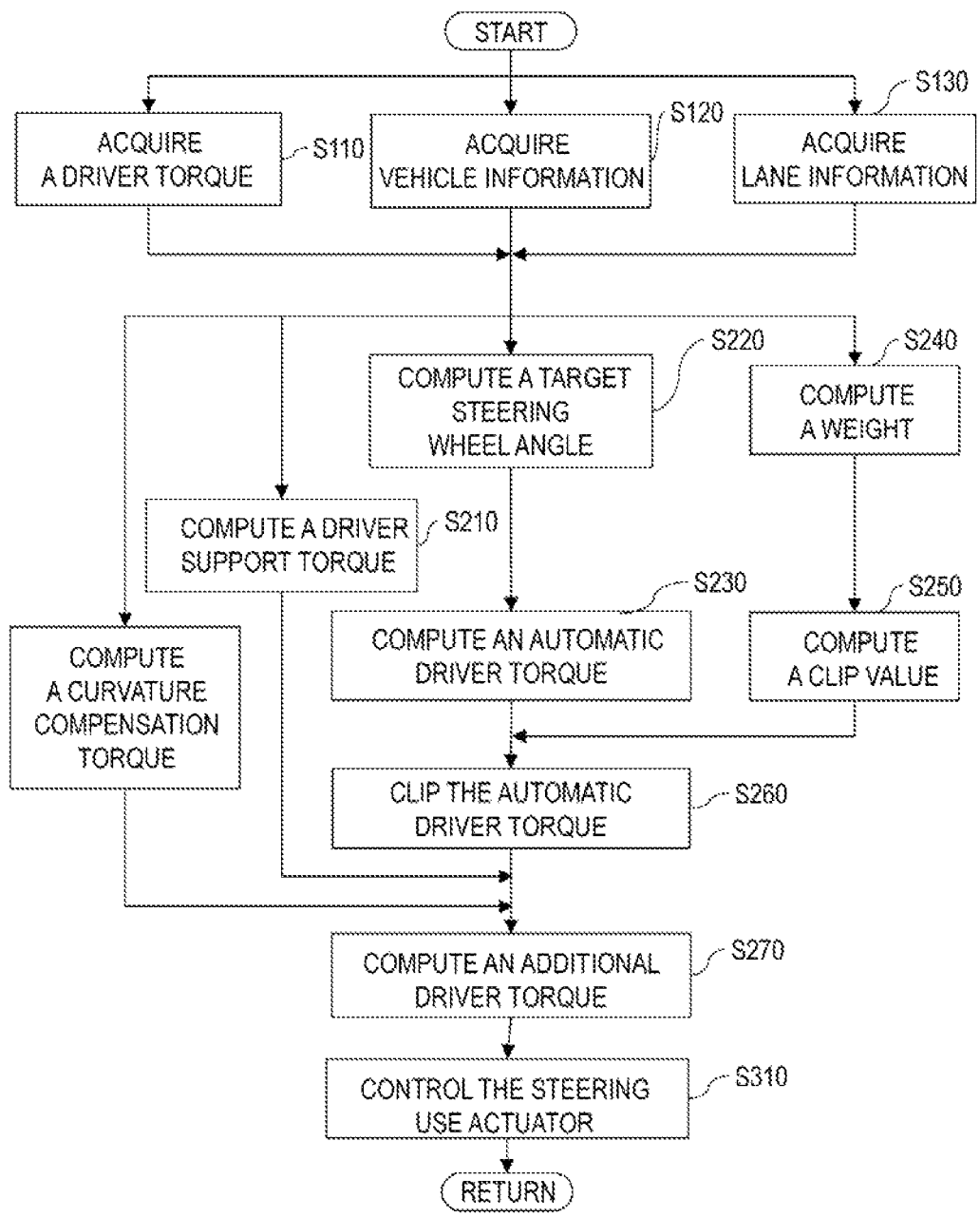
FIG. 40 is a flow chart which shows the operation of the Embodiment 11.

FIG. 40 is a flow chart which shows the procedure of the steering control device of the Embodiment 11. Explanation about portions which are common to FIG. 5 will be omitted.

In FIG. 40, the difference from FIG. 5 is that a curvature compensation torque $T_{CC}$ is computed in Step S211. This step S211 indicates that, in the curvature compensation torque computing part 211, computed is the curvature compensation torque $T_{CC}$ which is required in order to make a steady circular turn at the speed of a host vehicle and at the curvature of the driving lane of the host vehicle.

It is worth noticing that, the curvature compensation torque $T_{CC}$ is computed as follows, for example.

[Equation 22]

Eq. 22

$$T_{SA} = -mV^2 \xi \frac{l_r}{l} \kappa \quad (22)$$

[Equation 23]

Eq. 23

$$T_{CC} = -T_{SA} \quad (23)$$

Here, the symbol $T_{SA}$ is a self aligning torque the generation of which is predicted, when a host vehicle makes a steady circular turn at the speed of the host vehicle and in addition, at the curvature of the driving lane of the host vehicle. Moreover, the symbol m, the symbol V, the symbol ε, the symbol l, and the symbol $l_r$ are respectively the mass of a host vehicle, speed, trail, wheel base, and a distance between the center of the gravity and a rear wheel axle. The symbol k is the curvature of the driving lane of a host vehicle.

Next, Step S270 of FIG. 40 shows that an additional driver torque $T_{EPS}$ is computed in the additional driver torque computing part 270. For example, the additional driver torque $T_{EPS}$ is computed, as follows, as the sum of the automatic driver torque $T_{Auto}$, and the driver support torque $T_{Assist}$ and the curvature compensation torque $T_{CC}$.

[Equation 24]

Eq. 24

$$T_{EPS} = T_{Auto} + T_{Assist} + T_{CC} \quad (24)$$

Or, since there is an error in predicting the self aligning torque of the Equation 21, it is allowed to compute the additional driver torque $T_{EPS}$, after multiplying a correction coefficient by the curvature compensation torque $T_{CC}$, so that the curvature compensation torque may not become excessive.

Figure 41:
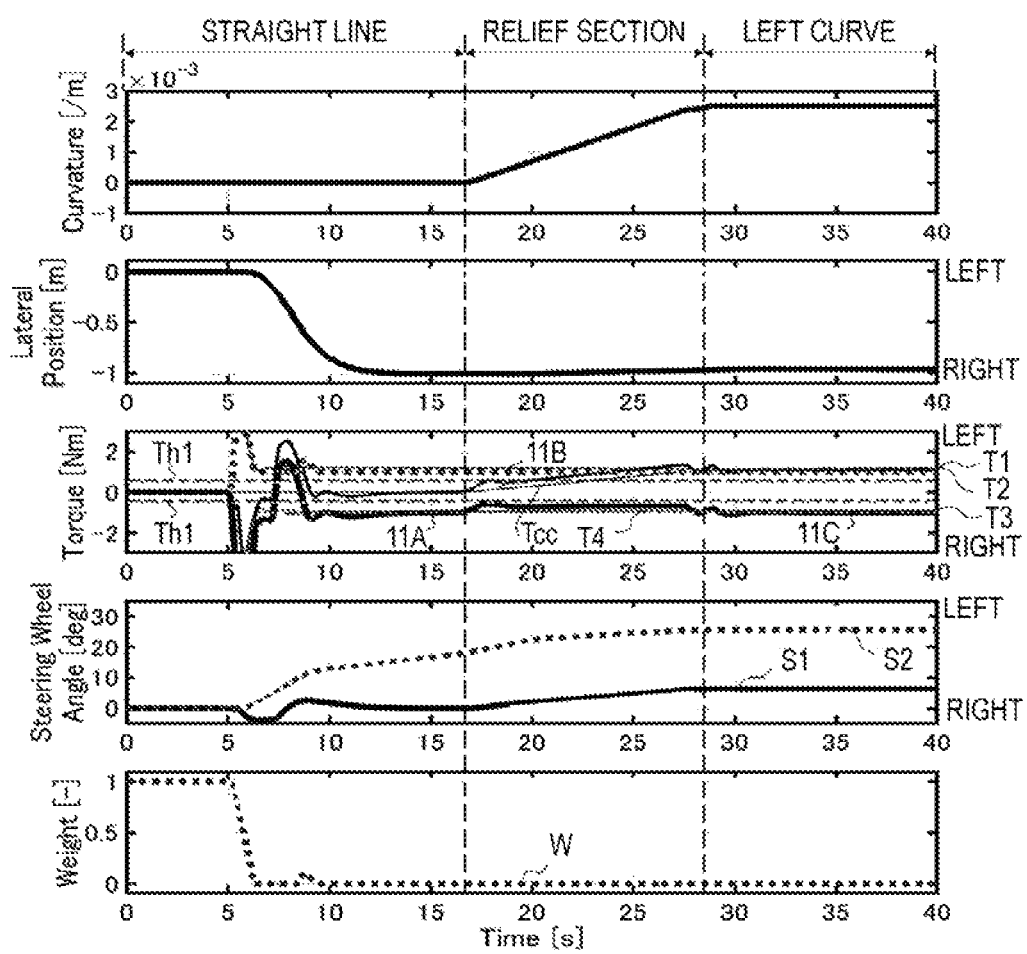
FIG. 41 is an explanatory diagram which shows that, when the curvature of a driving lane is constant in the Embodiment 11, the reaction force which is applied to a driver can be made constant, regardless of the curvature.

FIG. 41 is a schematic view which shows that, in the same scene settings as FIG. 13, when the additional driver torque $T_{EPS}$ is computed, by adding the curvature compensation torque, and if the curvature of a driving lane is constant, the reaction force which is applied to a driver becomes constant, regardless of the curvature. For confirmation, it is set that, like FIG. 13, the predetermined first threshold θ w=0.5 Nm, the LKAS torque clip value $T_{Clip,\ LKAS}$=20 Nm, and the override torque clip value $T_{Clip,\ OVR}$=1.0 Nm.

It is worth noticing that, in the drawing showing the relationship of torques, the dashed line T1 shows an automatic driver torque, the solid line T2 shows an input torque, the solid line T3 shows a driver torque by a driver, the fine dashed line Th1 shows a first threshold θ w, and the fie solid line $T_{CC}$ shows a curvature compensation torque $T_{CC}$. Moreover, in the drawing showing steering wheel angles, the solid line S1 shows a steering wheel angle, and the dashed line S2 shows a target steering wheel angle. Moreover, in the drawing showing the weight, the dashed line W represents the change state of the weight.

In the drawing which shows the torque of FIG. 41, the driver torque is converged to an override torque clip value, as shown as the symbol 11A. In FIG. 13, since the automatic driver torque is increased in the relief section, the input torque is increased. On the other hand, in this Embodiment 11, as shown as the symbol 11B in FIG. 41, the input torque is increased because the curvature compensation torque is increased. And, since the driver torque is always over the predetermined first threshold θ w, the weight remains converged to 0, and there is no change in the automatic driver torque clip value and the automatic driver torque. At the left curve, the driver torque is, in FIG. 13, converged to the predetermined first threshold θ w. In contrast, in FIG. 41, as shown as the symbol 11C, the driver torque is converged to the minimum value of the automatic driver torque clip value, that is, an override torque clip value. This is because, since the curvature compensation torque provides all of the self aligning torque, the magnitudes of the driver torque and the automatic driver torque become equal.

In this way, the curvature compensation torque $T_{CC}$ is added to compute the additional driver torque $T_{EPS}$. Thereby, when the curvature of the driving lane is constant, the reaction force which is applied to a driver can be made constant, regardless of the curvature. Moreover, not only the case where a vehicle conducts an offset toward an outer side at a curve, but also the case where a vehicle conducts an offset toward an inner side, the reaction force which is applied to a driver can be made constant, regardless of the curvature.

Moreover, even in a case where not the weight, but the gain is used, the same benefit will be obtained, like the Embodiment 5, if the curvature compensation torque $T_{CC}$ is added to compute the additional driver torque.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

EXPLANATION OF NUMERALS AND SYMBOLS

1 Vehicle; 2 Steering Wheel; 3 Steering Axis; 4 Steering Unit; 5 EPS Motor; 110 Driver Torque Acquisition Part; 111 Driver Torque Sensor; 120 Vehicle Information Acquisition Part; 121 Steering Wheel Angle Sensor; 122 Yaw Rate Sensor; 123 Speed Sensor; 124 Acceleration Sensor; 130 Lane Information Acquisition Part; 131 Front Camera; 132 GNSS Sensor; 133 Navigation Gear; 134 LiDAR; 135 LiDAR Use Map; 200 Steering Control Unit; 201 Steering Control Device; 201A and 201B; Torque Correction Computing Part; 210 Driver Support Torque Computing Part; 211 Curvature Compensation Torque Computing Part; 220 Target Steering Wheel Angle Computing Part; 230 Automatic Driver Torque Computing Part; 240 Weight Computing Part; 241 First Threshold Computing Part; 250 Clip Value Computing Part; 260 Clip Processing Part; 270 Additional Driver Torque Computing Part; 280 Gain Computing Part; 281 Second Threshold Computing Part; 290 Gain Processing Part

What is claimed is:

1. A steering control device, comprising:
   a driver support torque computer which computes a driver support torque according to a driver torque,
   an automatic driver torque computer which computes an automatic driver torque according to road condition, and p1 an additional driver torque computer which computes an additional driver torque according to the driver support torque and the automatic driver torque,
   wherein the additional driver torque computer receives an output from at least one of a first torque correction computer and a second torque correction computer;
   wherein the first torque correction computer includes:
   a weight computer which computes an increment of weight based on a magnitude of the driver torque, and accumulates the increment of weight to generate a weight,
   a clip value computer which computes an automatic driver torque clip value according to the weight, and
   a clip processor which clip processes the automatic driver torque with the automatic driver torque clip value, to limit an upper limit value and a lower limit value thereof, and outputs a clip processed automatic driver torque, to the additional driver torque computer and
   the second torque correction computer includes:
   a gain computer which computes an increment of gain according to the driver torque, and accumulates the increment of gain to generate a gain, and
   a gain processor which outputs an automatic driver torque multiplied by the gain, to the additional driver torque computer.

2. The steering control device according to claim 1, comprising the first torque correction computer,
   wherein, when the automatic driver torque clip value becomes smaller, as the weight is smaller,
   the weight computer computes an increment of weight as positive, if the magnitude of the driver torque is smaller than a first threshold, which is determined beforehand, and the weight computer computes the increment of weight as negative, if the magnitude of the driver torque is larger than the first threshold, and
   when the automatic driver torque clip value becomes smaller, as the weight is larger,
   the weight computer computes the increment of weight as negative, if the magnitude of the driver torque is smaller than the first threshold, and the weight computer computes the increment of weight as positive, if the magnitude of the driver torque is larger than the first threshold.

3. The steering control device according to claim 2,
   wherein, in the weight computer, a minimum value of the automatic driver torque clip value is set to be larger than a maximum value of the first threshold.

4. The steering control device according to claim 2,
   wherein, in the weight computer, a minimum value of the automatic driver torque clip value is set to be smaller than a minimum value of the first threshold.

5. The steering control device according to claim 4,
   wherein the weight computer includes a first threshold computer which computes the first threshold according to a degree of a first deviation from a driving lane of a host vehicle, and
   the first threshold is set according to the degree of the first deviation.

6. The steering control device according to claim 1, comprising the second torque correction computer,
   wherein the gain computer computes an increment of gain according to the driver torque, and accumulates the increment of gain to generate a gain,
   where the gain computer computes the increment of gain as negative, if the magnitude of the driver torque is larger than a second threshold which is determined beforehand, and the gain computer computes the increment of gain as positive, if the magnitude of the driver torque is smaller than the second threshold.

7. The steering control device according to claim 6, comprising the second torque correction computer,
   wherein, in the gain computer, a minimum value of the gain and a minimum value of the second threshold is set, so that a product of a maximum value of the automatic driver torque and a minimum value of the gain may become smaller than a minimum value of the second threshold.

8. The steering control device according to claim 7,
   wherein the gain computer includes a second threshold computer which computes the second threshold according to a degree of a first deviation from a driving lane of a host vehicle, and the second threshold is set according to the degree of the first deviation.

9. The steering control device according to claim 1, comprising the first torque correction computer and the second torque correction computer,
wherein the gain processor multiplies the clip processed automatic driver torque by the gain.

10. The steering control device according to claim 9,
wherein, in the gain processor, a minimum value of the automatic driver torque clip value, a minimum value of the gain, a minimum value of a first threshold, and a minimum value of a second threshold is set, so that a product of a minimum value of the automatic driver torque clip value and a minimum value of the gain may become smaller than the minimum value of the first threshold and the minimum value of the second threshold.

11. The steering control device according to claim 10, comprising a first threshold computer which computes the first threshold according to a degree of a first deviation from a driving lane of a host vehicle, and a second threshold computer which computes the second threshold according to a degree of a second deviation from a driving lane of a host vehicle,
wherein the first threshold and the second threshold are set according to the degree of the first deviation.

12. The steering control device according to claim 5,
wherein a distance from a center of a driving lane of a host vehicle to the host vehicle is set as the degree of the first deviation.

13. The steering control device according to claim 1,
wherein the weight computer changes the increment of weight according to a degree of a second deviation from a driving lane of a host vehicle.

14. The steering control device according to claim 1,
wherein the gain computer changes the increment of gain according to a degree of a second deviation from a driving lane of a host vehicle.

15. The steering control device according to claim 13,
wherein, in the weight computer, a distance from a center of the driving lane to a look-ahead distance, or a speed of the host vehicle in a direction perpendicular to a direction of the driving lane is set as the degree of the second deviation.

16. The steering control device according to claim 14,
wherein, in the gain computer, a distance from a center of the driving lane to a look-ahead distance, or a speed of the host vehicle in a direction perpendicular to a direction of the driving lane is set as the degree of the second deviation.

17. The steering control device according to claim 1,
wherein, when a direction of the automatic driver torque and a direction of the driver torque are the same, or, when a direction of a difference between a target steering wheel angle and a real steering wheel angle and a direction of the driver torque are the same,
the weight computer computes the increment of weight so that the automatic driver torque clip value may increase.

18. The steering control device according to claim 1,
wherein, when a direction of the automatic driver torque and a direction of the driver torque are the same, or, when a direction of a difference between a target steering wheel angle and a real steering wheel angle and a direction of the driver torque are the same,
the gain computer computes the increment of gain so that the increment of gain may increase.

19. The steering control device according to claim 1, further comprising a curvature compensation torque computer which computes a curvature compensation torque, based on a curvature of a driving lane of a host vehicle and a speed of the host vehicle, for making a steady circular turn at the speed and in addition at the curvature,
wherein the additional driver torque is computed based on the driver support torque, the automatic driver torque, and the curvature compensation torque.

* * * * *